US010355266B2

United States Patent
Zhu et al.

(10) Patent No.: US 10,355,266 B2
(45) Date of Patent: *Jul. 16, 2019

(54) SILICON NANOSTRUCTURE ACTIVE MATERIALS FOR LITHIUM ION BATTERIES AND PROCESSES, COMPOSITIONS, COMPONENTS AND DEVICES RELATED THERETO

(71) Applicant: OneD Material LLC, Palo Alto, CA (US)

(72) Inventors: Yimin Zhu, Union City, CA (US); Chunsheng Du, Fremont, CA (US); Joon Shin, San Jose, CA (US)

(73) Assignee: OneD Material LLC, Palo Alto, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/805,037

(22) Filed: Nov. 6, 2017

(65) Prior Publication Data

US 2018/0062153 A1   Mar. 1, 2018

Related U.S. Application Data

(63) Continuation of application No. 14/349,922, filed as application No. PCT/US2012/058418 on Oct. 2, 2012, now Pat. No. 9,812,699.
(Continued)

(51) Int. Cl.
*H01M 4/04* (2006.01)
*H01M 4/134* (2010.01)
(Continued)

(52) U.S. Cl.
CPC ......... *H01M 4/045* (2013.01); *H01M 4/0407* (2013.01); *H01M 4/0452* (2013.01);
(Continued)

(58) Field of Classification Search
CPC ........... H01M 10/052; H01M 10/0525; H01M 10/0566; H01M 2004/021; H01M 4/0407;
(Continued)

(56) References Cited

U.S. PATENT DOCUMENTS 5,478,676 A   12/1995   Turi et al.
5,677,082 A   10/1997   Greinke et al.
(Continued)

FOREIGN PATENT DOCUMENTS

EP   0997543 A1   5/2000
JP   2006-73480   3/2006
(Continued)

OTHER PUBLICATIONS

International Search Report directed to Related International Application No. PCT/US2012/058418, dated Mar. 19, 2013; 5 pages.
(Continued)

*Primary Examiner* — Carlos Barcena
(74) *Attorney, Agent, or Firm* — Nixon Peabody LLP

(57) ABSTRACT

The present invention relates to nanostructured materials for use in rechargeable energy storage devices such as lithium batteries, particularly rechargeable secondary lithium batteries, or lithium-ion batteries (LIBs). The present invention includes materials, components, and devices, including nanostructured materials for use as battery active materials, and lithium ion battery (LIB) electrodes comprising such nanostructured materials, as well as manufacturing methods related thereto. Exemplary nanostructured materials include silicon-based nanostructures such as silicon nanowires and coated silicon nanowires, nanostructures disposed on substrates comprising active materials or current collectors such as silicon nanowires disposed on graphite particles or copper electrode plates, and LIB anode composites comprising
(Continued)

high-capacity active material nanostructures formed on a porous copper and/or graphite powder substrate.

37 Claims, 43 Drawing Sheets

Related U.S. Application Data

(60) Provisional application No. 61/543,791, filed on Oct. 5, 2011.

(51) Int. Cl.
| | |
|---|---|
| H01M 4/139 | (2010.01) |
| H01M 4/1395 | (2010.01) |
| H01M 4/38 | (2006.01) |
| H01M 4/66 | (2006.01) |
| H01M 4/74 | (2006.01) |
| H01M 4/62 | (2006.01) |
| H01M 4/02 | (2006.01) |
| H01M 10/0566 | (2010.01) |
| H01M 10/052 | (2010.01) |
| H01M 10/0525 | (2010.01) |

(52) U.S. Cl.
CPC ........... *H01M 4/134* (2013.01); *H01M 4/139* (2013.01); *H01M 4/1395* (2013.01); *H01M 4/386* (2013.01); *H01M 4/387* (2013.01); *H01M 10/052* (2013.01); *H01M 10/0525* (2013.01); *H01M 10/0566* (2013.01); *H01M 4/622* (2013.01); *H01M 4/623* (2013.01); *H01M 4/661* (2013.01); *H01M 4/663* (2013.01); *H01M 4/74* (2013.01); *H01M 2004/021* (2013.01)

(58) Field of Classification Search
CPC .... H01M 4/045; H01M 4/0452; H01M 4/134; H01M 4/139; H01M 4/1395; H01M 4/386; H01M 4/387; H01M 4/622; H01M 4/623; H01M 4/661; H01M 4/663; H01M 4/74

See application file for complete search history.

(56) References Cited

U.S. PATENT DOCUMENTS

| | | | |
|---|---|---|---|
| 6,303,266 | B1 | 10/2001 | Okino et al. |
| 6,432,585 | B1 | 8/2002 | Kawakami et al. |
| 6,479,030 | B1 | 11/2002 | Firsich |
| 7,419,747 | B2 | 9/2008 | Utsugi et al. |
| 7,776,760 | B2 | 8/2010 | Taylor |
| 7,842,432 | B2 | 11/2010 | Niu et al. |
| 8,623,288 | B1 | 1/2014 | Dubrow et al. |
| 2007/0026313 | A1 | 2/2007 | Sano |
| 2009/0305135 | A1 | 12/2009 | Shi et al. |
| 2010/0035153 | A1 | 2/2010 | Thackeray et al. |
| 2010/0193365 | A1 | 8/2010 | Lopatin et al. |
| 2010/0297502 | A1 | 11/2010 | Zhu et al. |
| 2010/0310941 | A1 | 12/2010 | Kumta et al. |
| 2011/0097628 | A1 | 4/2011 | Lopatin et al. |
| 2011/0117446 | A1 | 5/2011 | Lucht et al. |
| 2011/0183205 | A1 | 7/2011 | Graczek et al. |
| 2014/0248543 | A1 | 9/2014 | Zhu et al. |
| 2017/0309900 | A1 | 10/2017 | Green et al. |

FOREIGN PATENT DOCUMENTS

| | | |
|---|---|---|
| JP | 2008-293883 | 12/2008 |
| JP | 2009-181827 | 8/2009 |
| JP | 2010-165670 | 7/2010 |
| JP | 2011082179 A | 4/2011 |
| KR | 2011-0069747 A | 6/2011 |
| KR | 2008-0091883 A | 10/2018 |
| WO | WO-2009112714 A2 | 9/2009 |

OTHER PUBLICATIONS

Written Opinion of the International Search Authority directed to related International Application No. PCT/US2012/058418, dated Mar. 19, 2013; 9 pages.

Supplementary European Search Report for European Application No. 12837889.0 dated Apr. 10, 2015.

Communication Pursuant to Article 94(3) in European Application No. 12837889.0, dated Feb. 8, 2018.

Communication Pursuant to Article 94(3) in European Application No. 12837889.0, dated Dec. 3, 2018.

Japanese Office Action for Japanese Application No. 2014-534634 dated Sep. 12, 2016.

Japanese Office Action for Japanese Application No. 2014-534634 dated Jul. 31, 2017.

Notice of Allowance in Japanese Application No. 2014-534634 dated Jul. 9, 2018.

Korean Notice of Preliminary Rejection Application No. 10-2014-7012081 dated Oct. 29, 2018.

Besenhard et al., "Will advances lithium-alloy anodes have a chance in lithium-ion batteries?" Journal of Power Sources, vol. 68, 1997, pp. 87-90.

Chan, C. K., et al., "High-performance lithium battery anodes using silicon nanowires", nature nanotechnology, vol. 3, Jan. 2008, pp. 31-35; 2008 Nature Publishing Group, Published online: Dec. 16, 2007.

Chen et al., "A Patterned 3D Silicon Anode Fabricated by Electrodeposition on a Virus-Structured Current Collector", Advanced Functional Materials, 2011, pp. 380-387, 21. 2011 Wiley-VCH Verlag GmbH & Co. KGaA, Germany. Save, Weinheim.

Holzapfel, M., et al., "A new type of nano-sized silicon/carbon composite electrode for reversible lithium insertion", Chem. Commun., Jan. 26, 2005; pp. 1566-1568; The Royal Society of Chemistry 2005.

Huang R. et al., "Carbon-Coated Silicon Nanowire Array Films for High-Performance Lithium-Ion Battery Anodes" Applied Physics Letters, vol. 95, Issue 13, Oct. 2009, pp. 133119-1-133119-3.

Kolasinski, K. W., "Catalytic growth of nanowires: Vapor-liquid-solid, vapor-solid-solid, solution-liquid-solid and solid-liquid-solid-growth", Current Opinion in Solid State and Materials Science, vol. 10, Issues 3-4, Jun.-Aug. 2006, pp. 182-191; Elsevier.

Li, H., et al., "The crystal structural evolution of nano-Si anode caused by lithium insertion and extraction at room temperature", Solid State Ionics, vol. 135, Issues 1-4, Nov. 2000, pp. 181-191; NH Elsevier.

Liu, Y., et al., "Novel negative electrode materials with high capacity density for further rechargeable lithium ion batteries", Res. Rep. Fac. Eng. Mie Univ., vol. 29, Oct. 20, 2004; pp. 65-72.

Yang, J., et al., "Si/C Composites for High Capacity Lithium Storage Materials", Electrochemical and Solid-State Letters, vol. 6, Issue 8, Aug. 1, 2003; pp. A154-A156.

Zuo, P., et al., Electrochemical stability of silicon/carbon composite anode for lithium ion batteries, Electrochimica Acta, vol. 52, Issue 15, Apr. 20, 2007; pp. 4878-4883.

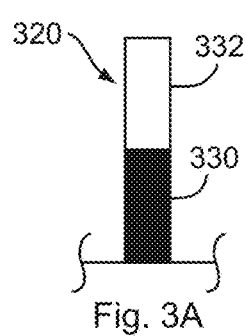
Fig. 3A
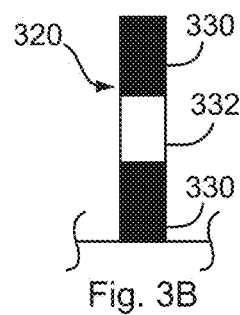
Fig. 3B
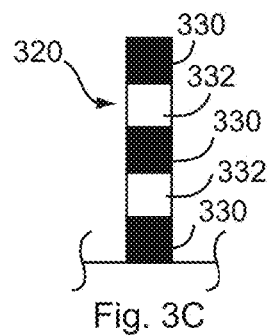
Fig. 3C
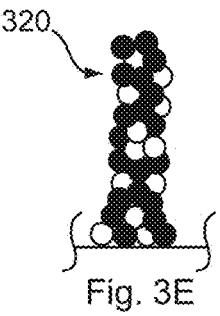
Fig. 3D
Fig. 3E
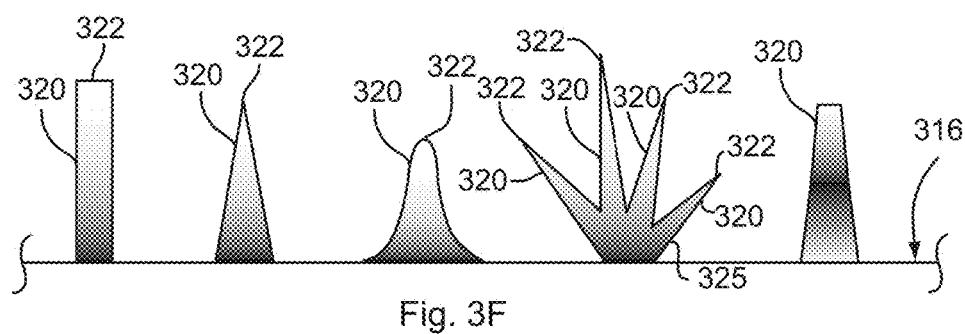
Fig. 3F
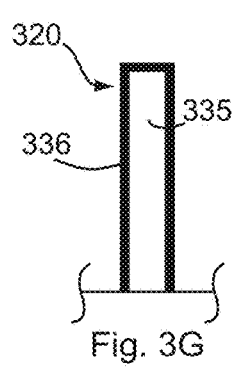
Fig. 3G
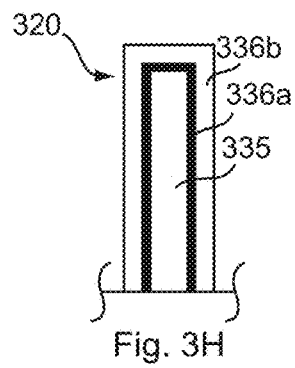
Fig. 3H
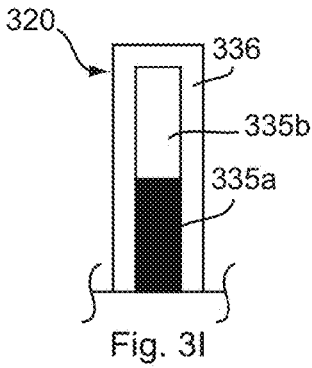
Fig. 3I

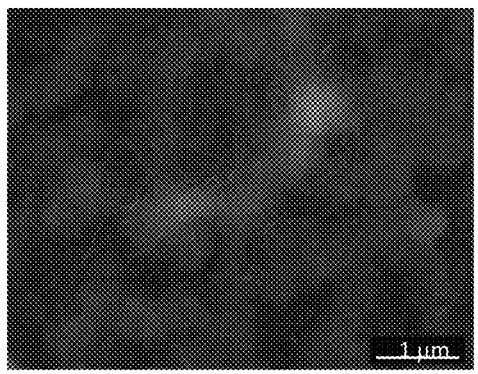
Fig 6A
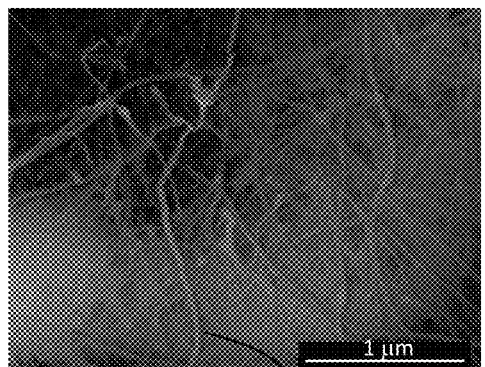
Fig 6B — 520
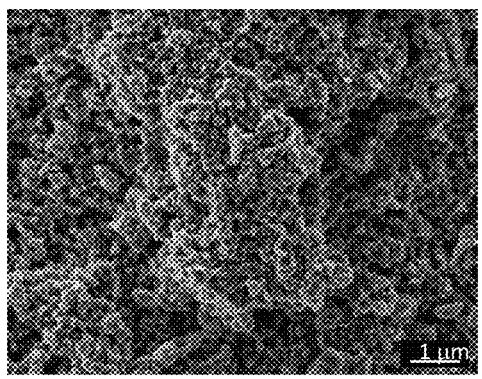
Fig 7A
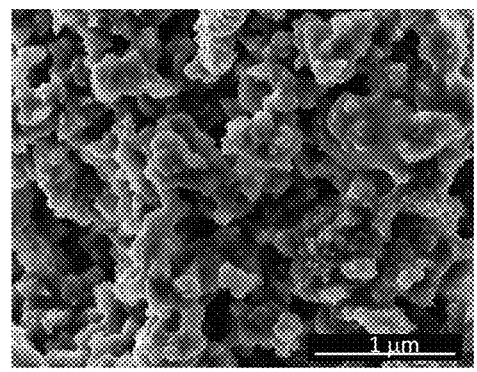
Fig 7B
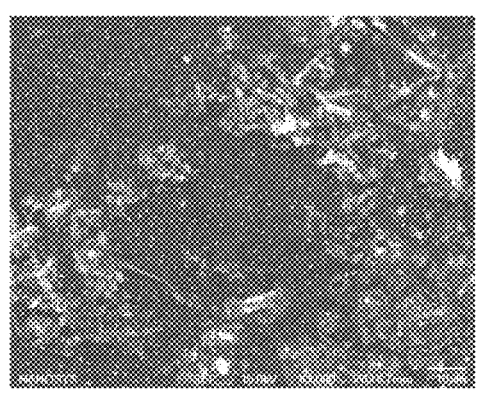
Fig. 8A
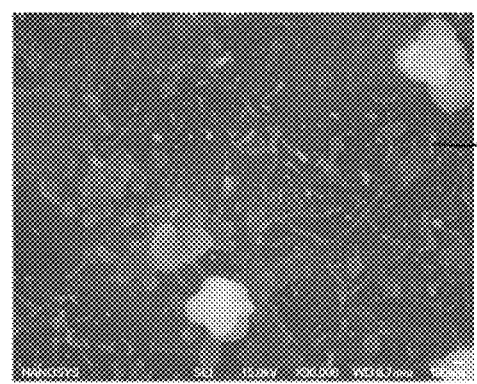
Fig. 8B — 520

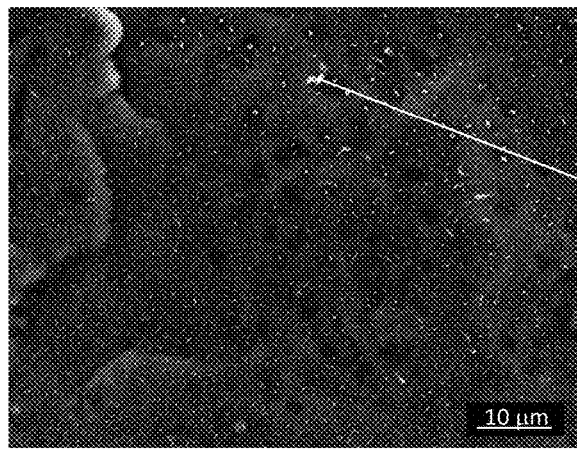
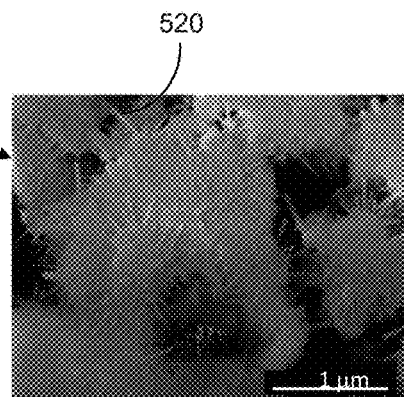
Fig 12A					Fig 12B
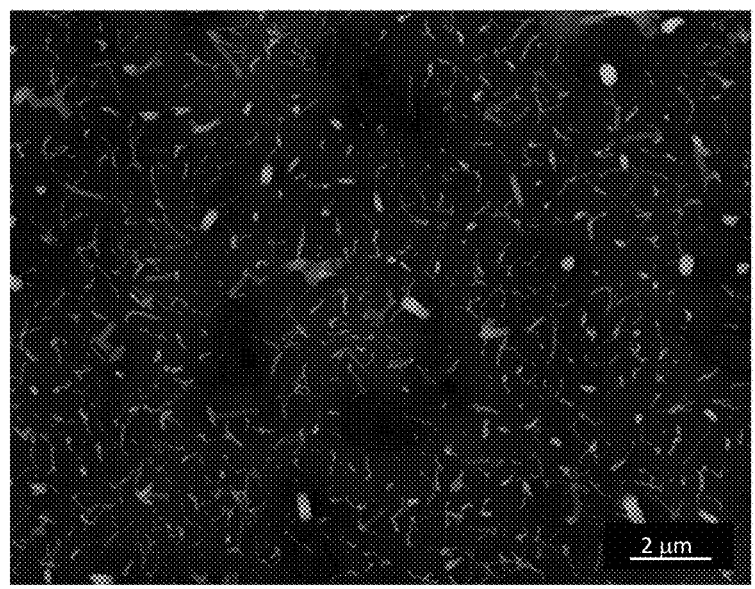
Fig 12C

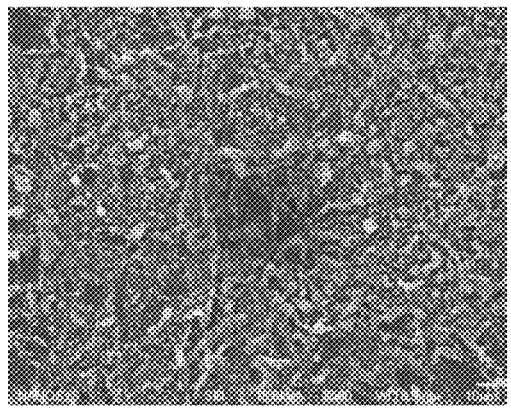 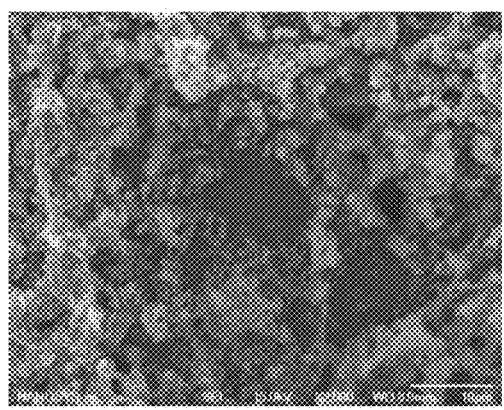
Fig. 19A        Fig. 19B
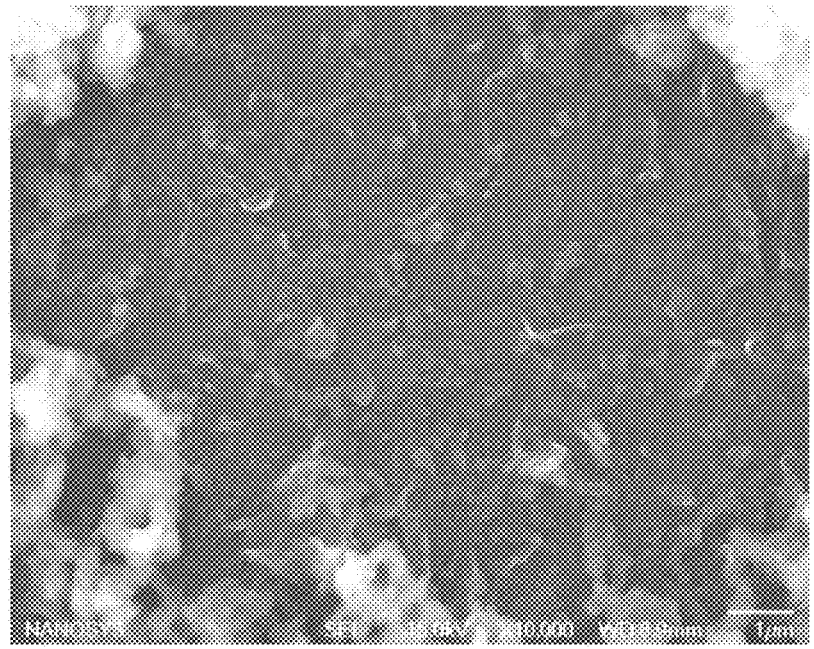
Fig. 19C

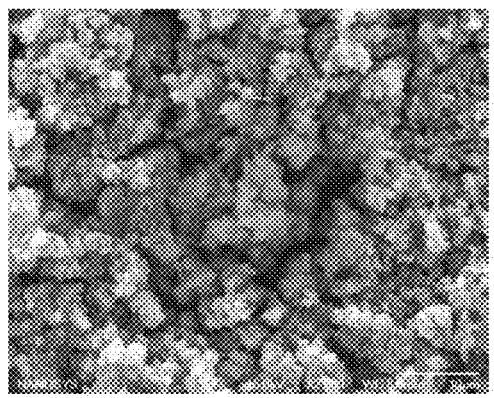 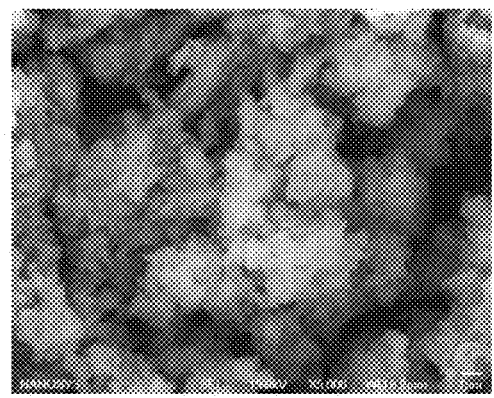
Fig. 20A  Fig. 20B
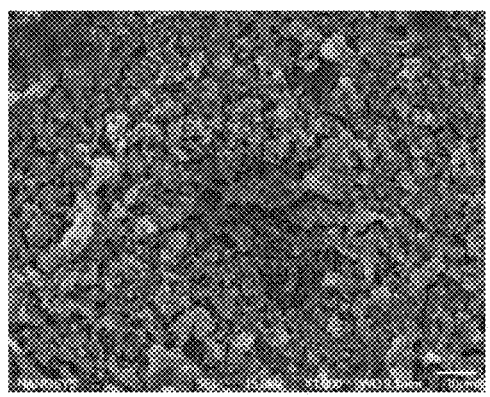 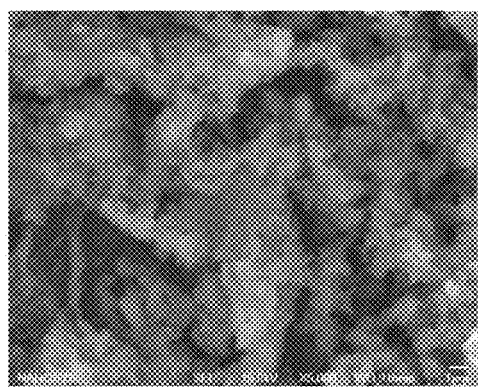
Fig. 21A  Fig. 21B
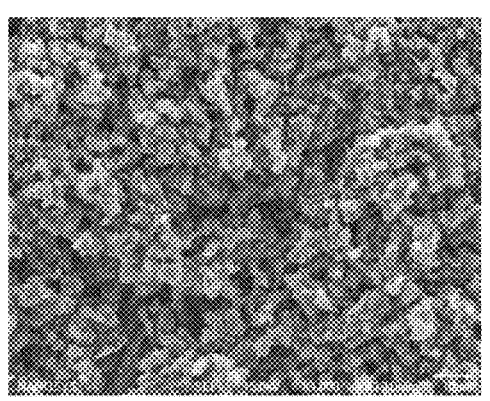 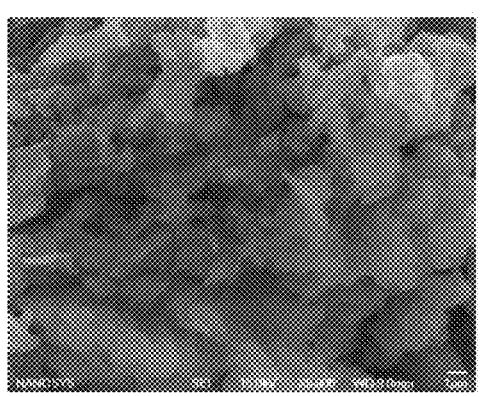
Fig. 22A  Fig. 22B 2415b

SILICON NANOSTRUCTURE ACTIVE MATERIALS FOR LITHIUM ION BATTERIES AND PROCESSES, COMPOSITIONS, COMPONENTS AND DEVICES RELATED THERETO

CROSS REFERENCE TO RELATED APPLICATIONS

This patent application is a continuation of U.S. patent application Ser. No. 14/349,922, titled SILICON NANOSTRUCTURE ACTIVE MATERIALS FOR LITHIUM ION BATTERIES AND PROCESSES, COMPOSITIONS, COMPONENTS AND DEVICES RELATED THERETO, filed Apr. 4, 2014, which is a United States National Stage Application filed under 35 U.S.C. § 371 of International Application No. PCT/US2012/058418, entitled "SILICON NANOSTRUCTURE ACTIVE MATERIALS FOR LITHIUM ION BATTERIES AND PROCESSES, COMPOSITIONS, COMPONENTS, AND DEVICES RELATED THERETO" which was filed on Oct. 2, 2012 which claims the benefit of, and priority to, U.S. Provisional Patent Application Ser. No. 61/543,791 filed on Oct. 5, 2011, the disclosures of which are hereby incorporated by reference in their entirety.

BACKGROUND OF THE INVENTION

Field of the Invention

The present invention relates to nanostructured materials for use in rechargeable energy storage devices such as lithium batteries, particularly rechargeable secondary lithium batteries, or lithium-ion batteries (LIBs). The present invention includes materials, components, and devices, including nanostructured materials for use as battery active materials, and lithium ion battery (LIB) electrodes comprising such nanostructured materials, as well as manufacturing methods related thereto. Exemplary nanostructured materials include silicon-based nanostructures such as silicon nanowires and coated silicon nanowires, nanostructures disposed on substrates comprising active materials or current collectors such as silicon nanowires disposed on graphite particles or copper electrode plates, and LIB anode composites comprising high-capacity active material nanostructures formed on a porous copper and/or graphite powder substrate. The present invention includes active material nanostructures and methods of manufacturing related to nanostructure processing, including electrochemical deposition (ECD) of silicon nanostructures on LIB anode active materials and current collectors. The present invention also relates to LIB materials including binders, electrolytes, electrolyte additives, and solid electrolyte interfaces (SEIs) suitable for use in LIB anodes comprising silicon and graphite materials, as well as components, devices, and methods of manufacturing related thereto.

Background of the Invention

Conventional LIBs suffer from poor capacity, energy density, and cycle life. Silicon (Si) has been studied extensively as an active material in LIBs due to its appealing characteristics, including its high theoretical specific capacity of ~4200 mAh/g for lithium (Li) and its low discharge potential. Si has slightly higher voltage plateau than that of graphite, so it has attractive safety characteristics. Si is abundant and inexpensive material, and lithiated Si is more stable in typical lithium-ion battery electrolytes than lithiated graphite.

Despite the attractive characteristics of silicon, commercialization attempts to utilize Si as an active material have been unsuccessful. Several factors contribute to this lack of success, including the lack of suitable methods available for mass producing high-quality Si-based anodic materials, the lack of solutions to address the detrimental consequences of the high volumetric expansion and contraction of Si during lithiation and delithiation, and the lack of solutions to address the low intrinsic conductivity of Si. There exists a need for high-quality, cost-effective Si-based anodic materials for LIBs; materials, composites, and LIB components for use in Si-based LIBs; methods for producing and utilizing such materials, and related LIB devices and components and methods related thereto.

Traditional lithium batteries, including lithium-ion batteries (LIBs), typically comprise an anode, a cathode, a separator material separating the cathode and anode, and an electrolyte. The anode of most commercially available LIBs generally includes a copper foil current collector coated with a mixture of graphite powder and a binder material. The cathode of most commercially available LIBs generally includes an aluminum foil current collector coated with a lithium transition metal oxide based cathode material. Traditional LIB anodes include intercalation-based active materials, such as graphite, which have limited charge capacity and cannot meet the rising demands of higher energy density, higher power density, and longer battery lifespan. Extensive research and development efforts have been dedicated to lithium (Li) alloying active materials for LIBs, such as silicon (Si), which has a theoretical charge capacity of ~4200 mAh/g. However, several issues have prevented commercialization of silicon-based LIBs.

Thin film Si active materials have been the subject of recent investigation for use in LIBs, but thin film Si lacks the high surface area of nanostructures and is susceptible to pulverization upon high volumetric flux. Low-temperature methods for producing Si nanomaterials have included ball-milling Si to produce Si powder active materials, but such methods result in low-quality Si particles having large, inconsistent particle sizes and low crystallinity.

Production of high-grade silicon nanostructures for LIB active materials typically involves chemical vapor deposition (CVD) or wet chemistry techniques, including high-temperature catalyzed growth of silicon nanostructures such as silicon nanowires. For example, such methods are disclosed in U.S. Pat. Nos. 7,842,432 and 7,776,760, U.S. patent application Ser. Nos. 12/824,485 and 12/783,243, and U.S. Provisional Patent Application Ser. No. 61/511,826, the disclosures of each of which are herein incorporated by reference in their entireties. Typical methods of manufacturing silicon-based nanostructures include using gold (Au) as a catalyst material for catalyzed growth of silicon nanostructures at high temperatures. Gold is widely used as a catalyst material due to its high chemical stability, but since gold is expensive, it is not an ideal material for use in mass production of silicon-based materials. Copper catalyst materials have been proposed as an alternative to gold for catalyzed growth of silicon nanostructures for LIB active materials, as disclosed in U.S. Provisional Patent Application Ser. No. 61/511,826, the disclosure of which is incorporated by reference herein in its entirety.

There exists a need for cost-effective methods of mass-producing high-quality silicon-based materials suitable for use in LIBs, particularly for use as active materials in LIB anodes. Further, there exists a need for low-temperature processes which do not require the use of catalyst materials for production of such silicon nanostructures. Further, there exists a need for improved control over the physical and chemical characteristics of such silicon nanostructures during production to ensure proper device performance. Further, there exists a need for high quality silicon active materials having improved bond strength with the substrate to which the silicon is attached.

Additionally, there exists a need for materials, components, devices, and methods which accommodate the high volumetric expansion and contraction of silicon which occurs during lithiation and delithiation. Problems associated with the high volumetric changes of silicon include active material degradation, unpredictable changes to the active material structure, exfoliation of anodic materials from the current collector, loss of conductivity, SEI degradation, inadequate or excess SEI formation, and undesirable side reactions due to excess silicon active sites. These side effects contribute to unpredictable changes in the battery materials and system, thereby causing large hysteresis in the battery system's operation characteristics.

The present invention provides solutions to these and other problems, including solutions which provide control over the battery material and component characteristics both during production and throughout the multiple charge cycles and in the various conditions to which the battery is exposed. There exists a need for LIB binder materials, electrolyte materials, and SEI materials or layers suitable for use in LIB anode materials comprising Si active materials, particularly Si and graphite active materials.

BRIEF SUMMARY OF THE INVENTION

The present invention includes novel, cost-effective methods for producing high-quality, silicon-based materials for use in LIB components and devices, particularly silicon-based LIB anodes. The present invention allows for highly controllable, low-temperature processes for producing such silicon materials, particularly silicon nanostructures. Further, the present invention includes uncatalyzed production of such silicon materials, whereby catalyst materials and high temperature processes are not required. These processes of the present invention allow for the production of high-quality materials whose physical and chemical characteristics can be highly controlled to meet specific requirements consistently. These high-quality materials provide consistency and predictability of battery system performance and allow for control over changes to these materials and battery devices throughout the multiple charge cycles and various conditions to which they are subjected. The high-quality materials of the present invention prevent irreversible, undesired side effects which contribute to unpredictable and detrimental changes in LIB devices and cause large hysteresis in battery operation characteristics.

The present invention includes methods for directly depositing discrete nanostructures comprising at least one high-capacity LIB active material onto a substrate via electrochemical deposition, as well as compositions, devices, and components related thereto. In preferred embodiments, Si is electrochemically deposited directly onto one or more active material and/or the current collector structures to form a Si-based LIB anode. In one example embodiment, Si is electrochemically deposited onto a copper (Cu) current collector, such as a Cu plate, mesh, or sponge, which can be used as a LIB anode material. In another example embodiment, Si is electrochemically deposited onto graphite particles to form a Si-graphite composite LIB anode material. This approach allows for low temperature, catalyst-free, and growth template-free production of active material nanostructures suitable for use in LIB anodes. This approach allows for production of highly-crystalline Si nanostructures at low growth temperatures and improved control over Si deposition and the physical and chemical characteristics of Si. Further, this approach allows for improved adhesion between Si nanostructure active materials and the current collector and/or active materials.

The present invention further includes binders, electrolytes and electrolyte additives, and SEI materials and layers suitable for Si-based LIB anode active materials, including Si and graphite composite anodic materials. These materials provide improved interaction with Si-based materials compared to traditional LIB materials which are not designed to interact with Si materials and cannot handle the volumetric expansion of high-capacity active materials during lithiation.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed. It should be appreciated that the particular implementations shown and described herein are examples of the invention and are not intended to otherwise limit the scope of the present invention in any way. Indeed, for the sake of brevity, conventional electronics, manufacturing, devices, nanostructures, other functional aspects of the systems, components of the individual operating components of the systems, and methods related thereto, may not be described in detail herein.

For the sake of brevity, each and every possible combination of materials, crystal structures, crystallinity, morphology, shape, and size for the active materials, substrates, substrate-active material composites, binders, electrolyte materials, and SEI layers and materials may not be explicitly described herein. However, the present invention includes any combination of the individual features described herein with respect to the active material nanostructures, substrates, substrate-active material composites, binders, electrolyte materials, SEI layers and materials and additional compositions, structures, and device components. Further, although each possible variation of the related processes of the present invention may not be described in explicit detail herein, the methods of the present invention include combinations of the individual process parameters, and the modifications and variations thereof, described herein. As will be understood by persons of ordinary skill in the art, the individual features of each embodiment of the present invention can be modified to achieve the desired result. Such modifications are included in the scope of the present invention.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 3A-3I show nanostructures having different or varying material compositions throughout different spatial regions of the individual nanostructures.

FIGS. 6A-22B show SEM images of discrete Si active material nanostructures formed on a graphite foil substrate according to various ECD methods of the present invention.

Figure 1A:
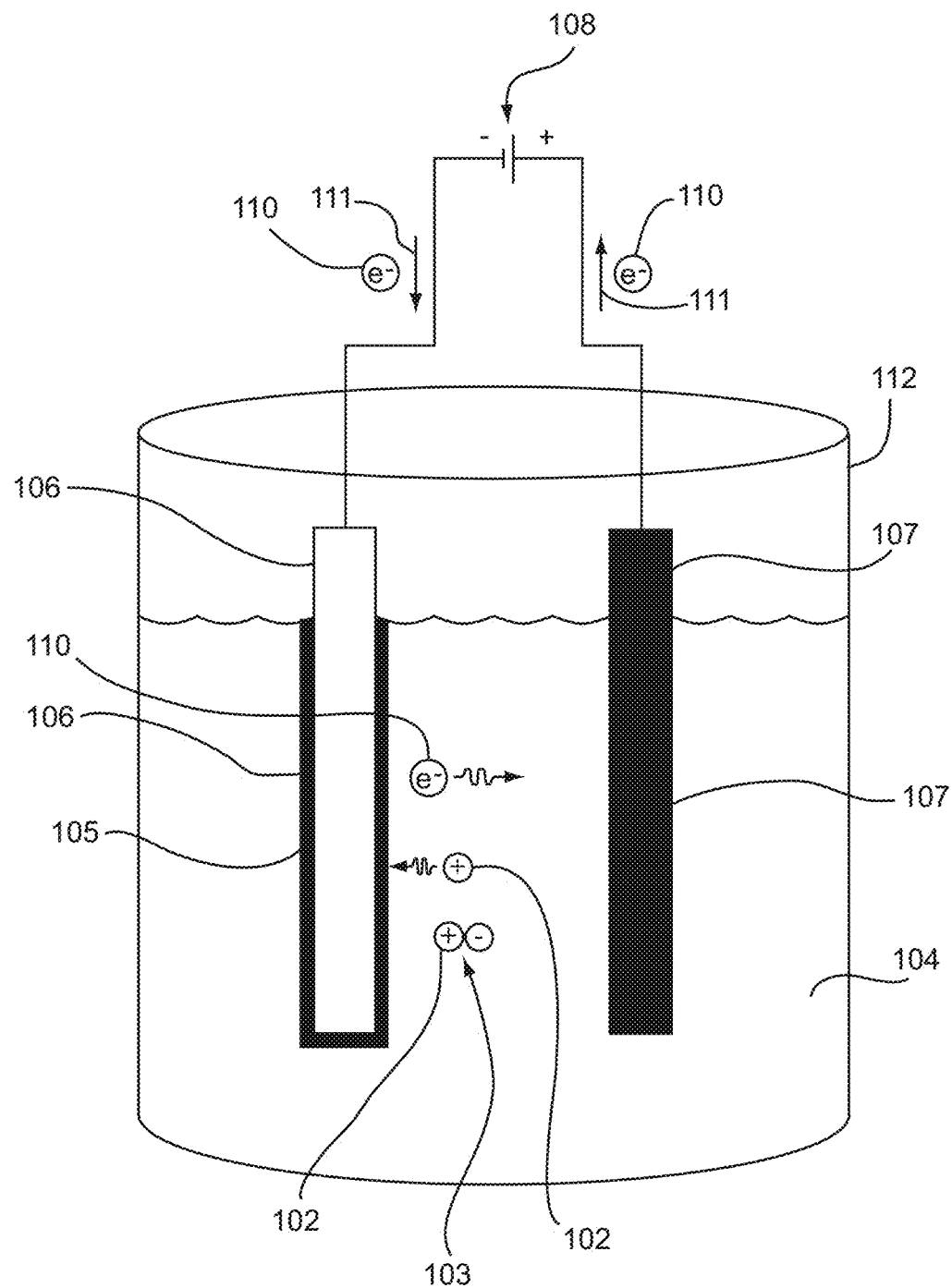
FIGS. 1A and 1B show electrolytic cells for conventional electrochemical deposition (ECD) techniques.

Although the nanostructures of the present invention are shown or described as individual nanostructures in certain figures or descriptions herein, the present invention also includes pluralities of such nanostructures having features similar to the individual nanostructures depicted herein. As will be understood by persons of ordinary skill in the art, the schematic drawings and elements represented in the figures may not be proportionate in scale to the actual elements of the present invention.

The present invention will now be described with reference to the accompanying drawings. In the drawings, like reference numbers indicate identical or functionally similar elements.

DEFINITIONS

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by +/−10% of the value, or optionally +/−5% of the value, or in some embodiments, by +/−1% of the value so described.

A "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include spherical nanostructures, nanowires, nanospikes, tapered nanowires, nanorods, nanotubes, nanowhiskers, nanoribbons, nanodots, nanoparticles, nanofibers, branched nanostructures, nanotetrapods, nanotripods, nanobipods, nanocrystals, nanodots, quantum dots, nanoparticles, and the like. Nanostructures can be, e.g., substantially crystalline, substantially monocrystalline, polycrystalline, amorphous, or a combination thereof. In one aspect, each of the three dimensions of the nanostructure has a dimension of less than about 500 nm, e.g., less than about 200 nm, less than about 100 nm, less than about 50 nm, or even less than about 20 nm.

An "aspect ratio" is the length of a first axis of a nanostructure divided by the average of the lengths of the second and third axes of the nanostructure, where the second and third axes are the two axes whose lengths are most nearly equal each other. For example, the aspect ratio for a perfect rod would be the length of its long axis divided by the diameter of a cross-section perpendicular to (normal to) the long axis.

As used herein, the "width" or "diameter" of a nanostructure refers to the width or diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the width or diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

Preferably, the nanostructures formed according to methods of the present invention comprise highly crystalline nanostructures, e.g., highly monocrystalline nanostructures, e.g., highly monocrystalline Si nanowires or other nanostructures. In preferred embodiments, the nanostructures are substantially monocrystalline and substantially free of polycrystalline and amorphous materials upon formation. Preferably, the nanostructures are free of polycrystalline and amorphous materials upon formation. Highly crystalline nanostructures can be formed by ECD processes of the present invention, and active material nanostructures having a high degree of crystallinity upon formation are preferred for the LIB active material nanostructures of the present invention.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide coating or other coating, including a shell or coating of the same material as the core of the nanostructure but having a different crystal structure than the core of the nanostructure, or the nanostructure can be comprised of a core and at least one shell. In such instances it will be appreciated that the oxide, shell(s), or other coating need not exhibit such long-range ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). Unless otherwise specified or distinguished, the general terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm, e.g., less than about 200 nm, less than about 100 nm, less than about 50 nm, or even less than about 20 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In one aspect, each of the three dimensions of the nanocrystal has a dimension of less than about 500 nm, e.g., less than about 200 nm, less than about 100 nm, less than about 50 nm, or even less than about 20 nm. Examples of nanocrystals include, but are not limited to, substantially spherical nanocrystals, branched nanocrystals, and substantially monocrystalline nanowires, nanorods, nanospikes, tapered nanowires, nanotubes, nanowhiskers, nanoribbons, nanodots, nanoparticles, quantum dots, nanotetrapods, nanotripods, nanobipods, and branched nanotetrapods (e.g., inorganic dendrimers).

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. (A shell can but need not completely cover the adjacent materials to be considered a shell or for the nanostructure to be considered a heterostructure; for example, a nanocrystal characterized by a core of one material covered with small islands of a second material is a heterostructure.) In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

A "nanoparticle" is a nanostructure in which each dimension (e.g., each of the nanostructure's three dimensions) is less than about 500 nm, e.g., less than about 200 nm, less than about 100 nm, less than about 50 nm, or even less than about 20 nm. Nanoparticles can be of any shape, and include, for example, nanocrystals, substantially spherical particles (having an aspect ratio of about 0.8 to about 1.2), and irregularly shaped particles. Nanoparticles optionally have an aspect ratio less than about 1.5. Nanoparticles can be amorphous, crystalline, monocrystalline, partially crystalline, polycrystalline, or otherwise. Nanoparticles can be substantially homogeneous in material properties, or in certain embodiments can be heterogeneous (e.g., heterostructures). Nanoparticles can be fabricated from essentially any convenient material or materials, e.g., the nanoparticles can comprise "pure" materials, substantially pure materials, doped materials and the like.

A "nanowire" is a nanostructure that has one principle axis that is longer than the other two principle axes. Consequently, the nanowire has an aspect ratio greater than one; nanowires of this invention typically have an aspect ratio greater than about 1.5 or greater than about 2. Short nanowires, sometimes referred to as nanorods, typically have an aspect ratio between about 1.5 and about 10. Longer nanowires have an aspect ratio greater than about 10, greater than about 20, greater than about 50, or greater than about 100, or even greater than about 10,000. The diameter of a nanowire is typically less than about 500 nm, preferably less than about 200 nm, more preferably less than about 150 nm, and most preferably less than about 100 nm, about 50 nm, or about 25 nm, or even less than about 10 nm or about 5 nm. The nanowires of this invention can be substantially homogeneous in material properties, or in certain embodiments can be heterogeneous (e.g., nanowire heterostructures). The nanowires can be fabricated from essentially any convenient material or materials. The nanowires can comprise "pure" materials, substantially pure materials, doped materials and the like, and can include insulators, conductors, and semiconductors. Nanowires are typically substantially crystalline and/or substantially monocrystalline, but can be, e.g., polycrystalline or amorphous. In some instances, a nanowire can bear an oxide or other coating, or can be comprised of a core and at least one shell. In such instances it will be appreciated that the oxide, shell(s), or other coating need not exhibit such ordering (e.g. it can be amorphous, polycrystalline, or otherwise). Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g., over the central 20%, 40%, 50%, or 80% of the nanowire). A nanowire can be straight or can be, e.g., curved or bent, over the entire length of its long axis or a portion thereof. In certain embodiments, a nanowire or a portion thereof can exhibit two- or three-dimensional quantum confinement. Nanowires according to this invention can expressly exclude carbon nanotubes, and, in certain embodiments, exclude "whiskers" or "nanowhiskers", particularly whiskers having a diameter greater than 100 nm, or greater than about 200 nm.

A "substantially spherical nanoparticle" is a nanoparticle with an aspect ratio between about 0.8 and about 1.2. Similarly, a "substantially spherical nanocrystal" is a nanocrystal with an aspect ratio between about 0.8 and about 1.2.

An "active material" or "LIB active material," as discussed herein, refers to one or more battery active materials—particularly LIB active materials capable of being lithiated with Li ions and suitable for use as active materials in a LIB anode active material. The active materials can include any suitable LIB active materials known in the art, including those mentioned herein.

As referred to herein, "inactive material" or "inactive materials" refers to materials which are either incapable of lithium insertion or have negligible lithium insertion capacity compared to the counterpart active material(s) in the LIB component formed according to the methods of the present invention. Whether a material is active or inactive will depend on characteristics of the LIB system in which the material is included. Inactive materials may be useful for purposes other than providing lithium capacity, such as to provide increased conductivity, to improve adhesion between the active material and the substrate, or to achieve certain characteristics of the active material during or after the electrochemical deposition process, as discussed in further detail below. The inactive materials may include inactive materials known in the art, including those mentioned herein.

As used herein, a "current collector," "current collector material," "current collector structure," or "LIB current collector" refers to a conductive material or structure which collects electrons released during charge or discharge (i.e., lithiation or delithiation) in a LIB and transmits such electrons to or from the external circuitry connected to the LIB from an external device. The current collector can include any current collectors known in the art, including those mentioned herein.

As used herein, a "binder" or "binder material" refers to nonreactive, adhesive LIB components used to adhere one or more components together. For example, a binder material can be added to a substrate comprising graphite powder in order to adhere the graphite powder together to coat the powder onto a substrate and form the LIB device or an ECD substrate.

In preferred embodiments, the one or more active materials formed via direct ECD comprise discrete nanostructures rather than a continuous active material structure such as a continuous film comprising the active material. By "discrete" structures, as such terminology is used herein with respect to active material nanostructures, it is meant that the structures include multiple independent and discontinuous domains of the material which forms the nanostructures, although such structures need not be entirely contiguous—i.e., "discrete" structures may physically contact one another unless otherwise specified. The nanostructures can include essentially any desired type of nanostructures, including, but not limited to, nanowires. The nanostructures can comprise nanowires, nanorods, nanospikes, tapered nanowires, nanotubes, nanowhiskers, nanoribbons, nanoparticles, nanofibers, nanocrystals, branched nanostructures, nanodots, quantum dots, spherical nanostructures, or other nanostructures, or any combination thereof. Preferably, the nanostructures comprise one-dimensional, elongated, or high aspect ratio nanostructures. For example, the nanostructures can include nanowires, nanorods, nanospikes, tapered nanowires, nanotubes, nanowhiskers, nanoribbons, branched nanostructures, or other one-dimensional, elongated, or high aspect ratio nanostructures, or any combination thereof. In preferred embodiments, the nanostructures comprise Si, e.g., Si nanowires. More preferably, the nanostructures comprise monocrystalline Si nanostructures, e.g., monocrystalline Si nanowires.

In certain embodiments, the ECD substrate surface can include discrete surface features to provide a modified substrate surface. By "discrete" substrate surface features or substrate structures, as such terminology is used herein with respect to the ECD substrate and the ECD substrate surface, it is meant that the structures include multiple distinct regions or domains exhibiting the surface modification or surface features, or multiple distinct regions or domains exhibiting the surface modification or surface features to a greater extent than one or more adjacent locations on the substrate surface. However, such modified regions on the surface or surface features need not be entirely contiguous—i.e., "discrete" surface features may physically contact one another unless otherwise specified, so long as the discrete surface features provide regions at the substrate surface having distinguishable characteristics.

A "compound" or "chemical compound" is a chemical substance consisting of two or more different chemical elements and having a unique and defined chemical structure, including, e.g., molecular compounds held together by covalent bonds, salts held together by ionic bonds, intermetallic compounds held together by metallic bonds, and complexes held together by coordinate covalent bonds.

An "alloy" is a metallic solid solution (complete or partial) composed of two or more elements. A complete solid solution alloy has a single solid phase microstructure, while a partial solution alloy has two or more phases that may or may not be homogeneous in distribution.

A "porous" substrate contains pores or voids. In certain embodiments, a porous substrate can be an array or population of particles, e.g., a random close pack particle population or a dispersed particle population. The particles can be of essentially any desired size and/or shape, e.g., spherical, elongated, oval/oblong, plate-like (e.g., plates, flakes, or sheets), or the like. The individual particles can themselves be nonporous or can be porous (e.g., include a capillary network through their structure). When employed for nanostructure growth, the particles can be but typically are not cross-linked. In other embodiments, a porous substrate can be a mesh, fabric, or sponge.

A "carbon-based substrate" refers to a substrate that comprises at least about 50% carbon by mass. Suitably, a carbon-based substrate comprises at least about 60% carbon, 70% carbon, 80% carbon, 90% carbon, 95% carbon, or about 100% carbon by mass, including 100% carbon. Preferably, the carbon-based substrate is highly pure carbon, e.g., greater than 98% or 99% carbon by mass. Most preferably, the carbon-based substrate is 100% carbon by mass. Exemplary carbon-based substrates that can be used in the practice of the present invention include, but are not limited to, graphite, graphene, natural graphite, artificial graphite, highly-ordered pyrolitic graphite (HOPG), activated carbon, petroleum coke carbon, mesophase carbon, hard carbon, soft carbon, carbon black, desulfulized carbon black, porous carbon, fullerenes, fullerene soot, carbon film or foil, carbon sheets, carbon paper, carbon powder, porous carbon powder, carbon fibers, carbon particles, carbon microbeads, mesocarbon microbeads (MCMB), carbon nanotubes, carbon nanoparticles; graphene fibers, particles, or powder; graphite fibers, particles, or powder; graphene foil, graphite foil, or other carbon-based structures, as well as combinations thereof. As used throughout, "carbon black" refers to the material produced by the incomplete combustion of petroleum products. Carbon black is a form of amorphous carbon that has an extremely high surface area to volume ratio. "Graphene" refers to a single atomic layer of carbon formed as a sheet, and can be prepared as graphene powders. See, e.g., U.S. Pat. Nos. 5,677,082, 6,303,266 and 6,479,030, the disclosures of each of which are incorporated by reference herein in their entireties. Carbon-based substrates specifically exclude metallic materials, such as steel, including stainless steel. Carbon-based substrates can be in the form of sheets or separate particles, as well as cross-linked structures.

A "catalyst," "catalyst material," "catalyst particle," or "nanostructure catalyst" is a material that facilitates the formation or growth of a nanostructure. Such terms are used herein as they are commonly used in the art relevant to nanostructure growth; thus, use of the word "catalyst" does not necessarily imply that the chemical composition of the catalyst particle as initially supplied in a nanostructure growth reaction is identical to that involved in the active growth process of the nanostructure and/or recovered when growth is halted. For example, as explained in U.S. patent application Ser. No. 12/824,485, the disclosure of which is incorporated by reference herein in its entirety, when gold nanoparticles are used as catalyst particles for silicon nanowire growth, particles of elemental gold are disposed on a substrate and elemental gold is present at the tip of the nanowire after synthesis, though during synthesis the gold exists as a eutectic phase with silicon. Contrasting examples are disclosed in U.S. Provisional Patent Application Ser. No. 61/511,826, the disclosure of which is incorporated by reference herein in its entirety. For example, when copper nanoparticles are used for VLS or VSS nanowire growth, particles of elemental copper are disposed on a substrate, and copper silicide may be present at the tip of the nanowire during and after synthesis. As another example, when copper oxide nanoparticles are used as catalyst particles for silicon nanowire growth, copper oxide particles are disposed on a substrate, but they may be reduced to elemental copper in a reducing atmosphere employed for nanowire growth and copper silicide may be present at the tip of the nanowire during and after nanowire synthesis. Both types of situations—i.e., situations in which the catalyst material maintains the identical chemical composition and situations in which the catalyst material changes in chemical composition, are explicitly included by use of the terms "catalyst," "catalyst material," "catalyst particle," or "nanostructure catalyst" herein. Catalyst particles are typically nanoparticles, particularly discrete nanoparticles. As such terms are used herein, "catalyst materials," "catalyst particles," or "nanostructure catalysts" are distinct from "precursors" or "precursor materials" employed during nanostructure growth, in that precursors serve as a source for at least one type of atom that is incorporated throughout the nanostructure (or throughout a core, shell, or other region of a nanostructure heterostructure), whereas a catalyst merely provides a diffusion site for nanostructure precursor materials and does not typically comprise a source material for the nanostructure.

With the direct electrochemical deposition methods of the present invention, LIB active materials can be simultaneously formed and deposited onto the substrate. By "direct deposition" or "direct electrochemical deposition" of active materials, or active materials "deposited directly" or "electrochemically deposited directly," as those terms are used herein, it is meant that the LIB active materials are grown or formed by reduction of precursor materials directly on the desired substrate surface via an electrochemical deposition process. As used herein with respect to material deposition or nanostructure formation, these terms indicate that the active material is reduced directly onto the relative substrate, such that the active material is formed in direct physical contact with the substrate.

DETAILED DESCRIPTION OF THE INVENTION

Electrochemical Deposition of LIB Active Materials and Structures

Figure 1B:
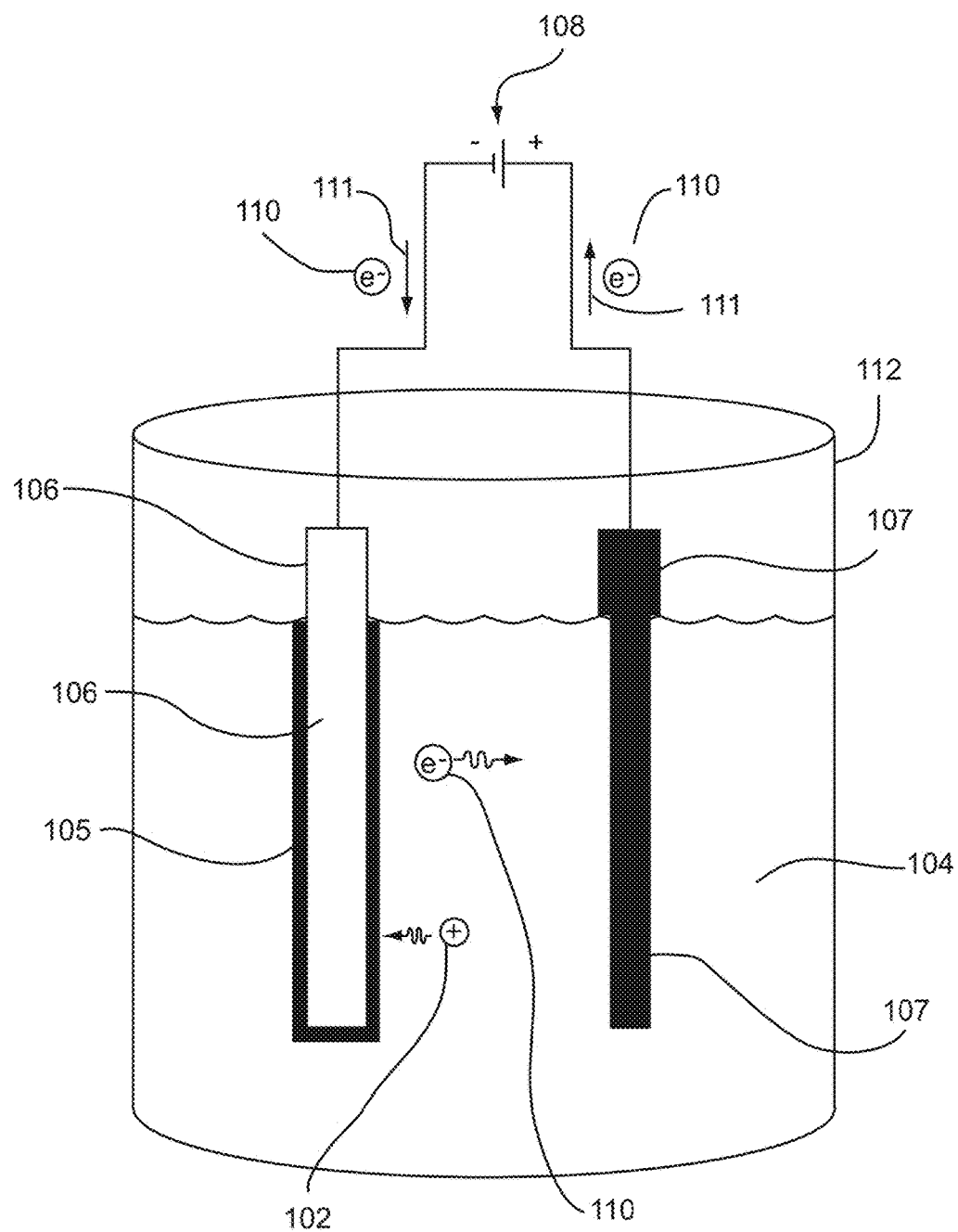

Electrochemical deposition is a well-known process in the art for metal plating. As illustrated by FIGS. 1A and 1B, conventional processes of electrochemical deposition generally involve use of an electric field to transport metal ions 102 in a bath (or solution) 104 onto a cathode substrate 106. A power supply 108 supplies a direct current 111 from the cathode 106 to the anode 107, whereby electrons 110 are transported from the cathode 106 toward the anode 107. In one conventional technique, as shown in FIG. 1A, a solution 104 is provided in a container 112. The solution 104 is an electrolyte solution 104 containing one or more dissolved metal salts 103 and other ions that permit the flow of electricity through the solution 104. Dissolution or solvation of the metal salt creates metal ions 102 which can be reduced at the surface of the cathode 106 to coat the cathode surface with a solid layer 105 of the metal on the cathode surface. The positively charged metal ions 102 in the solution 104 are moved toward the cathode 106 by an electric field created by the direction flow of electrical charge through the solution (i.e., the direct current applied to the system). Ions of the metal to be plated must be periodically replenished in the bath 104 as they are drawn out of the solution 104 via the coating process. In another conventional technique for electrochemical deposition, as shown in FIG. 1B, the process includes use of a consumable anode 107, whereby the anode 107 comprises the metal to be coated onto the cathode 106. This process is similar to that shown in FIG. 1A, except that the metal ions 102 are provided by the metal anode source material. The direct current applied to the system forces electrons 110 to escape from the anode 107, leaving the anode with a net positive charge. In order to establish equilibrium, positive metal ions 102 are forced from the anode surface into the solution 104. The metal ions 102 are moved by the electric field through the solution 104 toward the cathode 106, and the metal ions deposit onto the cathode surface to form a solid metal layer 105. This process depletes the consumable anode 107, as illustrated in FIG. 1B.

For the sake of brevity, conventional electrochemical deposition (ECD) techniques, processes, materials, systems, and system components may not be described in detail herein. However, the fundamentals of conventional ECD known in the art are included in the present invention, as will be understood by persons of ordinary skill in the art. Conventional concepts of ECD can be found in the Literature, e.g., Allen J. Bard & Larry R. Faulkner, *Electrochemical Methods: Fundamentals and Applications* (2d ed. 2006), and Frank Endres, Douglas MacFarlane, & Andrew Abbott, *Electrodeposition in Ionic Liquids* (2008), each of which is incorporated herein by reference in its entirety.

The present invention includes methods for directly depositing nanostructures comprising at least one LIB active material onto a substrate via electrochemical deposition, as well as compositions, devices, and components related thereto, and methods and processes for forming such compositions, devices, and components.

With the direct electrochemical deposition methods of the present invention, LIB active materials can be simultaneously formed and deposited onto the substrate. By "direct deposition" or "direct electrochemical deposition" of active materials, or active materials "deposited directly" or "electrochemically deposited directly," as those terms are used herein, it is meant that the LIB active materials are grown or formed by reduction of precursor materials directly on the desired substrate surface via an electrochemical deposition process. The active material is reduced directly onto the substrate such that the active material is formed in direct physical contact with the substrate.

The "active material" or "active materials," as discussed herein, refers to one or more battery active materials—particularly LIB active materials capable of being lithiated with Li ions and suitable for use as active materials in a LIB anode active material. The active materials can include any suitable LIB active materials known in the art, including silicon (Si), graphite, carbon (C), tin (Sn), germanium (Ge), titanium (Ti), lead (Pb), indium (In), aluminum (Al), bismuth (Bi), antimony (Sb), lithium (Li), cobalt (Co), zinc (Zn) or other active materials, as well as combinations, mixtures, intermetallic compounds, and alloys thereof. As referred to herein, "inactive material" or "inactive materials" refers to materials which are either incapable of lithium insertion or have negligible lithium insertion capacity compared to the counterpart active material(s) in the LIB component formed according to the methods of the present invention. Inactive materials may be useful for purposes other than providing lithium capacity, such as to provide increased conductivity, to improve adhesion between the active material and the substrate, or to achieve certain characteristics of the active material during or after the electrochemical deposition process, as discussed in further detail below. Inactive materials may include, e.g., copper (Cu), carbon (C), nickel (Ni), silver (Ag), aluminum (Al), gold (Au), or other inactive materials, as well as combinations, mixtures, and alloys thereof.

In preferred embodiments, an LIB active material is electrochemically deposited directly onto the substrate surface. The electrochemically deposited material can include a single active material; a mixture, composition, or alloy comprising multiple different active materials; one or more inactive materials; a mixture, composition or alloy comprising multiple inactive materials; or a mixture, composition, or alloy comprising one or more active materials and one or more inactive materials. Additionally or alternatively, one or more active materials and/or one or more inactive materials can be formed or deposited on the substrate via any suitable known methods, e.g., coating, chemical binding, adsorption, binder material adhesion, lithography, sputtering, chemical vapor deposition (CVD), evaporation, electroless deposition, or other methods, as will be understood by persons of ordinary skill in the art.

In preferred embodiments, the one or more active materials formed via direct ECD includes silicon—preferably discrete silicon nanostructures, e.g., Si nanowires or Si nanospikes. Preferably, the silicon active material is electrochemically deposited directly onto one or more LIB active materials and/or one or more conductive current collectors to form a silicon-based composite structure for use in a LIB anode.

In one preferred class of embodiments, one or more active materials, preferably one or more active materials comprising silicon, is electrochemically deposited onto one or more conductive current collector structures which can be used as a current collector in a LIB anode. Preferably, the current collector comprises one or more copper structures, e.g., a copper sheet, film, plate, foil, mesh, foam, sponge; powder or plurality of particles/fibers/sheets/flakes/wires which can Unless clearly indicated otherwise, ranges listed herein are inclusive. A variety of additional terms are defined or otherwise characterized herein.

be packed, interwoven, adhered, or otherwise associated with one another; or any combination thereof. In preferred embodiments, silicon is electrochemically deposited directly onto a copper current collector, and the Cu—Si composite material can form a LIB anode material, wherein the copper is a conductive current collector and the silicon is an active material for lithiation and delithiation during LIB charge and discharge cycling.

In another preferred class of embodiments, a first active material is electrochemically deposited directly onto at least a second active material to form a composite active material comprising the first and second active materials, suitable for use as a LIB anode active material. In preferred embodiments, a first active material comprising silicon is electrochemically deposited directly onto at least a second active material, wherein the second active material comprises one or more graphite structures to form a silicon-graphite composite LIB anode material. The one or more graphite structures can include one or more of a graphite sheet, film, plate, foil, powder, particles, or fibers; sheet, film, plate, mesh, foam, sponge; powder or plurality of particles/fibers/sheets/flakes which can be packed, interwoven adhered, or otherwise associated with one another; or any combination thereof.

In one class of embodiments, a first active material is electrochemically deposited directly onto one or more substrates comprising at least one conductive current collector and/or at least one second active material. Preferably, the first active material comprises silicon. Preferably, the first active material comprises nanostructures, e.g., nanowires. Each of the current collectors and second active materials can include any suitable materials and structures described herein, including one or more of a sheet, film, plate, foil, mesh, foam, sponge; powder or plurality of particles/fibers/sheets/flakes/wires which can be packed, interwoven, adhered, or otherwise associated with one another; or any combination thereof. Preferably, the one or more substrates includes a current collector comprising one or more copper structures and/or a second active material comprising one or more graphite structures. In one embodiment, a first active material is electrochemically deposited directly onto at least one structure comprising at least a second active material, wherein the at least one structure comprising the second material is associated with at least one current collector. The first active material can also be deposited directly onto the at least one current collector via electrochemical deposition. The current collector and second active material can be combined or associated with one another using any suitable processes known to those of ordinary skill in the art. For example, the conductive current collector material(s) and the second (or more) active material can be mechanically bound, mixed, stacked, layered, pressed, interwoven, chemically bound, adsorbed, alloyed, or adhered using one or more adhesive binder materials; or the materials can be combined using ablation techniques, chemical deposition techniques such as ECD or CVD, evaporation, electroless deposition, adsorption, spraying, coating, lithography, sputtering, dipping, bonding, or other techniques. The current collector and second active material can be combined or associated with one another prior to the electrochemical deposition of the first active material, during the electrochemical deposition process, after the first active material is electrochemically deposited onto the desired substrate, or any combination thereof.

LIB Active Materials

As mentioned above, the present invention includes methods for directly depositing nanostructures comprising at least one LIB active material onto a substrate via electrochemical deposition, as well as compositions, devices, and components related thereto, and methods and processes for forming such compositions, devices, and components. As mentioned above, the one or more active materials formed via direct ECD preferably includes silicon, but is not limited thereto. Although embodiments of the present invention are described herein in detail with respect to silicon active materials deposited via direct ECD, additional and alternative active materials are included in the compositions, methods, components, and devices of present invention, as will be understood by persons of ordinary skill in the art. For example, the one or more active materials formed via direct ECD can include Si, Cu, Ni, Sn, Ge, Ti, Pb, In, Al, Bi, Sb, Li, Co, Zn, or other active materials, as well as compositions, mixtures, intermetallic compounds, alloys, or combinations thereof.

In preferred embodiments, a LIB active material is electrochemically deposited directly onto the substrate surface. The electrochemically deposited material can include a single active material; a mixture, composition, or alloy comprising multiple different active materials; one or more inactive materials; a mixture, composition or alloy comprising multiple inactive materials; or a mixture, composition, or alloy comprising one or more active materials and one or more inactive materials. Additional materials, including one or more active materials and/or one or more inactive materials, can be formed on or associated with the substrate via any suitable method, including suitable methods available in the art (e.g., mechanical or chemical binding, mixing, stacking, layering, pressing, interweaving, adsorption, alloying, adhesive binding, chemical deposition such as ECD or CVD, lithography, spraying, coating, sputtering, evaporating, dipping, bonding, or other methods).

In certain embodiments, the electrochemically deposited material can comprise multiple different materials, e.g., multiple different active materials, multiple different inactive materials, or a combination of one or more active materials and one or more inactive materials. For example, the electrochemically deposited materials can include Si and Cu, Si and Sn, Si and C, Si and graphite, Si and Li, Si and one or more titanates, Si and Pb, Si and In, Si and Al, Si and Bi, Si and Sb, Sn and Cu, Sn and C, Sn and graphite, Sn and Li, Sn and one or more titanates, Sn and Pb, Sn and In, Sn and Al, Sn and Bi, Sn and Sb, Cu and C, Cu and graphite, Cu and Li, Cu and one or more titanates, Cu and Pb, Cu and In, Cu and Al, Cu and Bi, Cu and Sb, C and Cu, non-graphitic C and graphite, C and Li, C and one or more titanates, C and Pb, C and In, C and Al, C and Bi, C and Sb; Si, Cu, and Sn; Si, Cu, and C; Si, Cu, and graphite; Si, Cu, and Li; Si, Cu, and one or more titanates; Si, Cu, and Pb; Si, Cu, and In; Si, Cu, and Al; Si, Cu, and Bi; Si, Cu, and Sb; Si, C, and Sn; Si, C, and Cu; Si, C, and graphite; Si, C, and Li; Si, C, and one or more titanates; Si, C, and Pb; Si, C, and In; Si, C, and Al; Si, C, and Bi; Si, C, and Sb; Cu, C, and graphite; Cu, C, and Li; Cu, C, and one or more titanates; Cu, C, and Pb; Cu, C, and In; Cu, C, and Al; Cu, C, and Bi; Cu, C, and Sb; Si and Ni, Si and steel, Ni and steel, Ni and C, C and steel, Sn and steel, Sn and Ni; Si, Sn, and Ni; Si, Sn, and steel; or compositions, mixtures, intermetallic compounds, alloys, or combinations thereof.

In certain embodiments, nanostructures can be formed by ECD of one or more alloy materials, co-deposition of multiple different materials using ECD (e.g., from the same EC electrolyte solution), or separate ECD of multiple different materials (e.g., alternating deposition of multiple different materials), as well as any combination thereof. Related processes and process parameters are described in further detail below.

Much to their surprise, the inventors of the present invention discovered that the low-temperature, template-free, and catalyst-free ECD processes of the present invention could be used to achieve epitaxial growth of discrete active material nanostructures directly on one or more LIB components. Further, the inventors unexpectedly discovered that such ECD processes could be adjusted to finely control and/or modify the physical and chemical characteristics of the electrochemically deposited nanostructures during the ECD growth process, including the composition, crystal structure, morphology, size, and/or shape of the active material nanostructures. ECD processes, materials, and additional parameters are explored in further detail below.

In preferred embodiments, the one or more active materials formed via direct ECD comprise discrete nanostructures rather than a continuous active material structure such as a continuous film comprising the active material. By "discrete" structures, as such terminology is used herein, it is meant that the structures include multiple independent and discontinuous domains of the material which forms, although such structures need not be entirely contiguous—i.e., "discrete" structures may physically contact one another unless otherwise specified. The nanostructures can include essentially any desired type of nanostructures, including, but not limited to, nanowires. The nanostructures can comprise nanowires, nanorods, nanospikes, tapered nanowires, nanotubes, nanowhiskers, nanoribbons, nanoparticles, nanofibers, nanocrystals, branched nanostructures, nanodots, quantum dots, spherical nanostructures, or other nanostructures, or any combination thereof. Preferably, the nanostructures comprise one-dimensional, elongated, or high aspect ratio nanostructures. For example, the nanostructures can include nanowires, nanorods, nanospikes, tapered nanowires, nanotubes, nanowhiskers, nanoribbons, branched nanostructures, or other one-dimensional, elongated, or high aspect ratio nanostructures, or any combination thereof. In preferred embodiments, the nanostructures comprise Si, e.g., Si nanowires. More preferably, the nanostructures comprise monocrystalline Si nanostructures, e.g., monocrystalline Si nanowires.

Preferably, the nanowires or other nanostructures of the present invention are formed as highly crystalline (e.g., highly monocrystalline) nanostructures during the process of direct electrochemical deposition, such that no further processing is necessary to crystallize the nanostructures. For example, the nanowires or other nanostructures preferably comprise monocrystalline Si and have a high degree of crystallinity upon formation. The methods of the present invention allow for production of nanostructures which exhibit a high degree of crystallinity upon formation during the ECD process. Such immediate crystallinity of the nanostructures upon deposition and formation eliminates the need for additional crystallization procedures such as high-temperature annealing. Thus, the entire process of forming the active material nanostructures can be achieved using the low-temperature, e.g., room temperature, ECD processes of the present invention.

Preferably, the nanowires or other nanostructures of the present invention are formed via ECD directly onto the desired substrate without the use of a template. Such template-free deposition allows for highly crystalline formation of the active material structures, whereas porous template-based growth procedures disrupt continuous crystalline formation, thereby resulting in amorphous material formation. In template-based methods, the electrochemically deposited material is confined to the physical pores of the porous template, and the walls of the template pores prevent atoms of the material from depositing beyond the pore boundaries, thereby preventing crystalline formation of the material. Thus, template-free ECD methods are preferred for forming the active material nanostructures of the present invention. Template-free deposition procedures of the present invention allow for the formation of active material nanostructures exhibiting a high degree of crystallinity, e.g., a high degree of monocrystallinity, a high degree of polycrystallinity, or a high degree of mixed monocrystallinity and polycrystallinity. As each successive atom of the active material is deposited onto the substrate during preferred ECD processes of the present invention, nanostructures comprising the active material are formed epitaxially, according to the natural crystal structure of the material. In these preferred embodiments, the nanostructures exhibit a high degree of monocrystallinity without grain boundaries or other crystal defects. In preferred embodiments, the present invention includes highly crystalline Si nanostructures, e.g., highly crystalline Si nanowires, and methods for forming such highly crystalline Si nanostructures. Advantageously, the ECD methods of the present invention allow for growth of crystalline active material nanostructures such as Si nanowires without the use of a growth template. Although the crystalline nanostructures may become amorphous or less crystalline upon charge cycling in a LIB, the initial crystallinity of these nanostructures allows for the one-dimensional structure of elongated nanostructures to be maintained throughout the LIB cycling. Further, the highly crystalline active material nanostructures of the present invention exhibit high tolerance for fast charge-discharge rates, meaning that the crystalline nanostructures can undergo fast charge cycling while maintaining high capacity. In other words, LIB cells with the highly crystalline nanostructures of the present invention (e.g., crystalline Si nanowires) have a higher power density than amorphous or polycrystalline active material nanostructures. Thus, the crystalline nanostructures of the present invention are highly advantageous for use in LIBs for high power applications.

Preferably, the nanostructures formed according to methods of the present invention comprise highly crystalline nanostructures, e.g., highly monocrystalline nanostructures, e.g., highly monocrystalline Si nanowires or other nanostructures. In preferred embodiments, the nanostructures are substantially monocrystalline and substantially free of polycrystalline and amorphous materials upon formation. Preferably, the nanostructures are free of polycrystalline and amorphous materials upon formation. Highly crystalline nanostructures can be formed by ECD processes of the present invention, and active material nanostructures having a high degree of crystallinity upon formation are preferred for the LIB active material nanostructures of the present invention. For example, the active material nanostructures of the present invention can exhibit 100% crystallinity upon formation, at least 99% crystallinity upon formation, at least 98% crystallinity upon formation, at least 97% crystallinity upon formation, at least 96% crystallinity upon formation, at least 95% crystallinity upon formation, at least 90% crystallinity upon formation, at least 85% crystallinity upon formation, at least 80% crystallinity upon formation, or at least 75% crystallinity upon formation; e.g., 100% monocrystallinity upon formation, at least 99% monocrystallinity upon formation, at least 98% monocrystallinity upon formation, at least 97% monocrystallinity upon formation, at least 96% monocrystallinity upon formation, at least 95% monocrystallinity upon formation, at least 90% monocrystallinity upon formation, at least 85% monocrystallinity upon formation, at least 80% monocrystallinity upon formation, or at least 75% monocrystallinity upon formation; 100% polycrystallinity upon formation, at least 99% polycrystallinity upon formation, at least 98% polycrystallinity upon formation, at least 97% polycrystallinity upon formation, at least 96% polycrystallinity upon formation, at least 95% polycrystallinity upon formation, at least 90% polycrystallinity upon formation, at least 85% polycrystallinity upon formation, at least 80% polycrystallinity upon formation, or at least 75% polycrystallinity upon formation; or a high degree of crystallinity comprising mixed monocrystallinity and polycrystallinity. Although crystalline nanostructures are preferred, the active material nanostructures of the present invention can comprise amorphous materials, a mixture of amorphous and polycrystalline materials, a mixture of amorphous and monocrystalline materials, or a mixture of amorphous, polycrystalline, and monocrystalline materials.

The nanowires or other nanostructures can be produced from any suitable material, including, but not limited to, silicon. In embodiments in which the nanostructures comprise silicon, the nanostructures can comprise monocrystalline silicon, polycrystalline Si, amorphous Si, or a combination thereof. Thus, in one class of embodiments, the nanostructures comprise a monocrystalline core and a shell layer, wherein the shell layer comprises amorphous Si, polycrystalline Si, or a combination thereof. In one aspect, the nanostructures are Si nanowires.

The present invention includes low-temperature, e.g., room-temperature, ECD methods for producing active material nanostructures without the use of high-temperature CVD processes. Conventional methods for producing nanowires or other nanostructures, such as high-temperature catalyzed growth via CVD, require metal catalyst materials such as metal catalyst particles, whereby the metal catalyst is heated to a eutectic temperature to allow diffusion of the precursor material through the metal catalyst. Since the precursor diffuses through the metal catalyst material and is not consumed in the reaction, these conventional methods yield nanostructures attached or strongly bonded to the metal catalyst, requiring further processing to remove the metal catalyst. Unlike such conventional methods, production methods of the present invention do not require the use of catalysts such as metal catalyst particles. The catalyst-free production methods of the present invention allow for production of active material nanostructures and LIB active material composite structures which are free of catalyst materials and impurities associated therewith, eliminating the need for further processing to remove catalyst materials or impurities from the nanostructures. These catalyst-free active material structures allow for LIBs and LIB components having a reduced amount of inactive materials and thus, increased capacity and reduced weight and reduced volume.

In preferred methods, the ECD processes of the present invention include template-free formation of active material nanostructures, e.g., Si nanowires, directly on LIB anode composite materials such as one or more LIB current collectors and/or LIB active materials, e.g., one or more copper current collectors and/or graphite active materials. Such processes eliminate the need for a separate growth substrate and a non-conductive growth template, as well as the requirement of harvesting the active material by dissolving or otherwise removing the growth substrate and template. Since the active material nanostructures are formed directly on LIB components or materials, the substrate and active material composite can be used as a LIB component without the need to remove the growth substrate or a growth template. Thus, the production process is simplified. Further, impurities introduced by one or more of the separate growth substrate and template are eliminated.

In preferred embodiments, the active material nanostructures are free or substantially free of impurities, e.g., oxygen, including impurities introduced by catalyst materials, growth templates, extraneous growth substrates, and procedures or materials used to remove such substances from the active material nanostructures or composite structures comprising the active material nanostructures. For example, the active material nanostructure composition includes less than 10% impurities, less than 9% impurities, less than 8% impurities, less than 7% impurities, less than 6% impurities, less than 5% impurities, less than 4% impurities, less than 3% impurities, or less than 2% impurities; preferably less than 1% impurities, e.g., less than 0.5% impurities, less than 0.25% impurities, less than 0.1% impurities. Most preferably, the active material nanostructure composition is entirely free of impurities. Since neither high-temperature catalysis nor post-deposition annealing are required to form crystalline active material nanostructures according to embodiments of the present invention, the invention allows for epitaxial formation of highly crystalline active material nanostructures, wherein the entire formation process occurs at low temperatures, e.g., room temperature.

The nanowires or other nanostructures of the present invention, e.g., Si nanowires, can be of essentially any desired size. For example, the nanowires or other nanostructures can have a diameter of about 10 nm to about 500 nm, or about 20 nm to about 400 nm, about 20 nm to about 300 nm, about 20 nm to about 200 nm, about 20 nm to about 100 nm, about 30 nm to about 100 nm, or about 40 nm to about 100 nm. Preferably, the nanowires or other nanostructures have an average diameter less than about 150 nm, e.g., between about 10 nm and about 100 nm, e.g., between about 30 nm and about 50 nm, e.g., between about 40 nm and about 45 nm. Preferably, the nanowires or other nanostructures have an average length less than about 100 µm, e.g., less than about 50 µm, less than about 10 µm, about 100 nm to about 100 µm, or about 1 µm to about 75 µm, about 1 µm to about 50 µm, or about 1 µm to about 20 µm in length. The aspect ratios of the nanowires are optionally up to about 2000:1 or about 1000:1. For example, the nanowires or other nanostructures can have a diameter of about 20 nm to about 200 nm and a length of about 0.1 µm to about 50 µm.

As mentioned above, the discrete nanostructures formed by the ECD methods of the present invention can include essentially any desired type of nanostructures, including, but not limited to, nanowires. The nanostructures can comprise nanowires, nanorods, nanospikes, tapered nanowires, nanotubes, nanowhiskers, nanoribbons, nanoparticles, nanofibers, nanocrystals, branched nanostructures, nanodots, quantum dots, spherical nanostructures, or other nanostructures, or any combination thereof. Preferably, the nanostructures comprise one-dimensional, elongated, or high aspect ratio nanostructures. For example, the nanostructures can include nanowires, nanorods, nanospikes, tapered nanowires, nanotubes, nanowhiskers, nanoribbons, branched nanostructures, or other one-dimensional, elongated, or high aspect ratio nanostructures, or any combination thereof. In preferred embodiments, the nanostructures comprise Si, e.g., Si nanowires, Si nanospikes, or tapered Si nanowires. More preferably, the nanostructures comprise monocrystalline Si nanostructures, e.g., monocrystalline Si nanowires.

As explained in further detail below, the methods of the present invention allow for fine control and/or modification of physical and chemical characteristics of the electrochemically deposited nanostructures during the ECD growth process, including the composition, crystal structure, morphology, size, and shape of the active material nanostructures.

In certain embodiments, the electrochemically deposited nanostructures have a porous structure. The porous structure can be achieved with lithiation-delithiation cycling, including pre-lithiation/delithiation (i.e., prior to LIB formation), as explained in detail below.

According to embodiments of the present invention, the physical and/or chemical characteristics of the nanostructures can be controlled, as well as the interaction between the substrate surface and the nanostructures comprising at least one active material.

In preferred embodiments, the electrochemically deposited nanostructures have a sufficiently high bond strength with the underlying substrate to which the nanostructures are attached, whereby the bond between the substrate and nanostructures remains in tact during LIB charge and discharge cycles. In preferred embodiments, the nanostructures are directly bound to the underlying substrate without a binder material positioned therebetween. In certain embodiments, a LIB anode includes a current collector and active material composite which does not include a binder material. For example, active material nanostructures (e.g., Si nanowires) can be formed directly on a LIB current collector structure (e.g., graphite foil or Cu film or mesh) via direct electrochemical deposition, whereby the current collector-active material composite does not include a binder material. The high bond strength between the substrate and the active material nanostructures eliminates the need for a binder. However, certain embodiments of the present invention can include a binder material between one or more active material structures and/or inactive material structures.

Figure 2A:
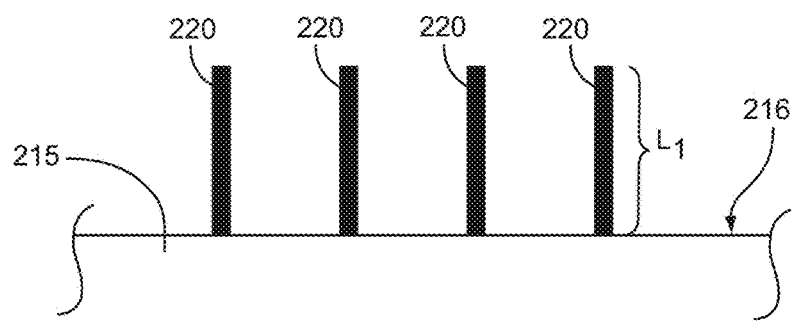
FIGS. 2A-2K show nanostructures comprising at least one LIB active material deposited on a substrate using one or more ECD techniques of the present invention.
Figure 2B:
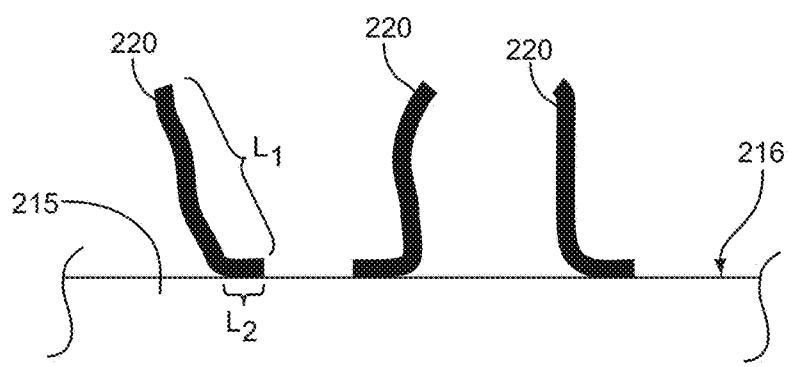
Figure 2C:
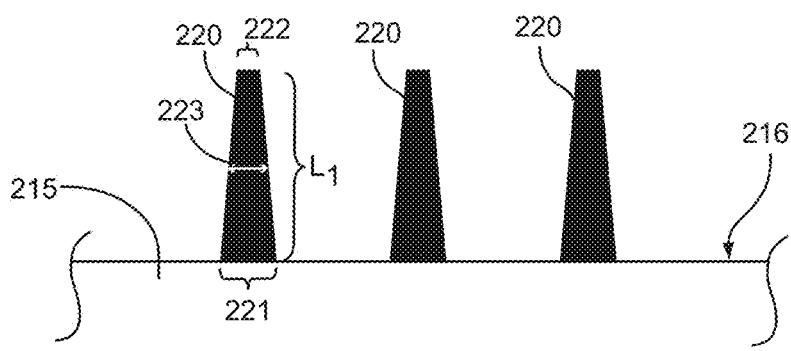
Figure 2D:
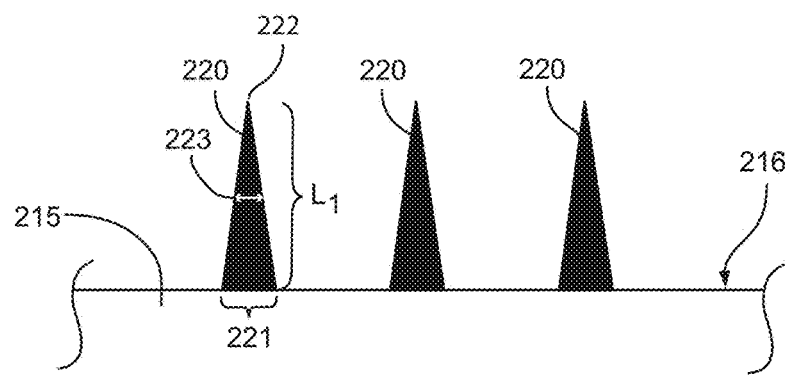
Figure 2E:
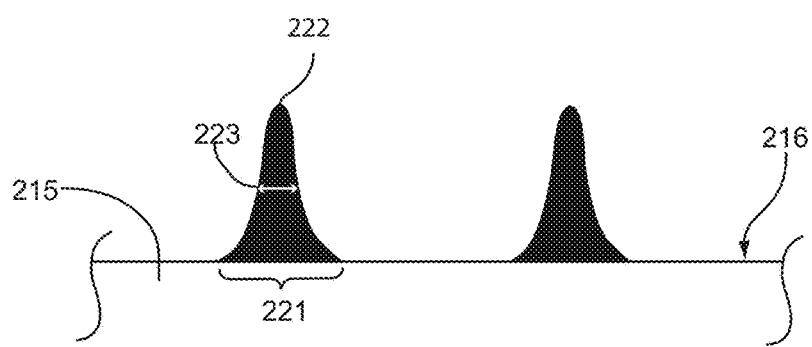
Figure 2F:
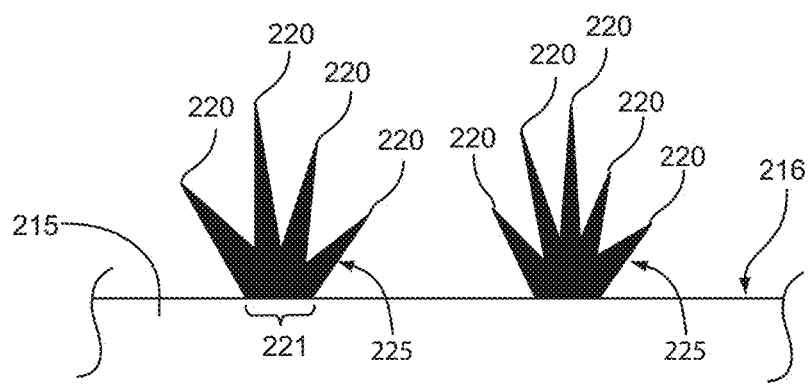

In certain embodiments, as shown in FIGS. 2A-2F, elongated nanostructures 220, e.g., nanowires or nanospikes, are formed via direct ECD on a surface 216 of a substrate 215. Preferably, nanostructures comprising Si, e.g., Si nanowires or Si nanospikes, are formed directly on one or more of a current collector or another active material structure, e.g., a planar Cu current collector, a graphite film, or a graphite particle. The elongated nanostructures 220 can have a length, $L_1$, which represents the overall length taken along the long axis of the nanostructure. For example, the elongated nanostructures can include nanowires as shown in FIGS. 2A-2C, tapered nanowires as shown in FIG. 2C, or nanospikes as shown in FIGS. 2D and 2F.

In preferred embodiments, the nanostructures exhibit both a high surface area for lithiation and a high surface area bound to the substrate. In certain embodiments, as depicted in FIG. 2B, the elongated nanostructures 220 are in direct physical contact with the substrate surface 216 along a length, $L_2$, which is a portion of the overall length, $L_1$, whereby $L_2$ is less than $L_1$. In certain embodiments, as shown in FIGS. 2A and 2C-2F, the nanostructures 220 are in direct physical contact with the substrate surface 216 along the end or base surface 216 of the nanostructures. As shown in FIGS. 2C, 2D, and 2E, the nanostructures can have a base width, $W_1$, measured at the nanostructure base 221 of the nanostructure 220 at the interface between the nanostructure 220 and the substrate 215; a center width, $W_2$, measured at a location 223 along the length of the long axis of the nanostructure which is approximately equidistant from the base end 221 and the distal end 222 of the nanostructure; and a distal width $W_3$ measured at the distal end 222 of the nanostructure which is opposite the base end 221. In embodiments where the nanostructures have a circular cross-section (e.g., tapered nanowires or nanospikes), the aforementioned widths can represent the diameters of the nanostructure at the different respective locations along the long axis of the nanostructure. The base width, $W_1$, can be larger than the center width, $W_2$, larger than the distal width, $W_3$, or larger than both the center width and the distal width. As shown in FIGS. 2D and 2E, the base width, W1, can be substantially larger than the center width, $W_2$, and the distal width, $W_3$.

In certain embodiments, the discrete nanostructures comprising at least one active material can comprise a plurality or cluster of nanostructures, e.g., a cluster of elongated nanostructures such as nanowires or nanospikes. Each cluster can comprises a plurality of elongated nanostructures conjoined at the base end of the cluster at the interface between the cluster and the substrate surface. As shown in the example embodiment of FIG. 2F, the discrete nanostructures include clusters 225 of nanospikes 220, wherein each cluster 225 comprises a plurality of nanospikes 220 conjoined at the base end 221 of the cluster at the interface between the cluster 225 and the substrate surface 216.

Figure 2G:
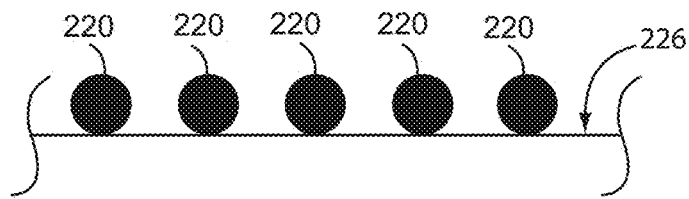
Figure 2H:
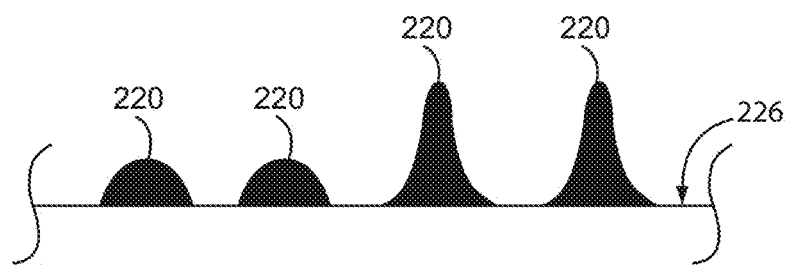
Figure 2I:
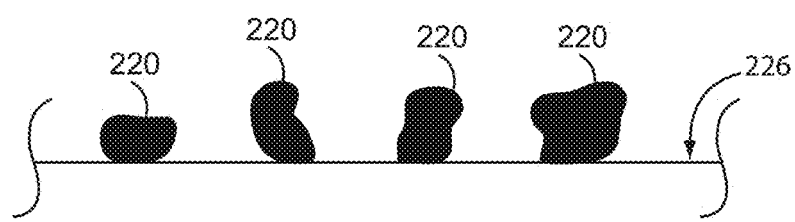
Figure 2J:
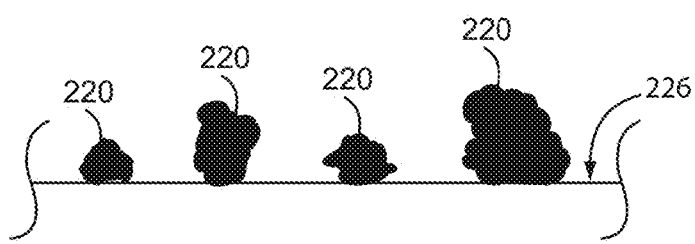
Figure 2K:
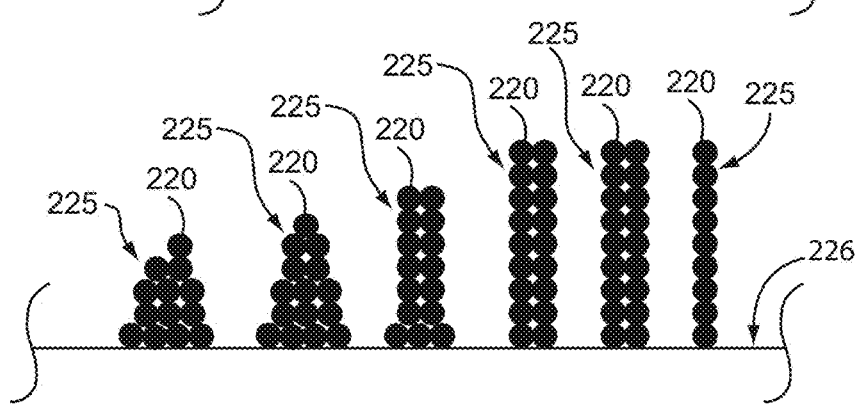
Figure 4A:
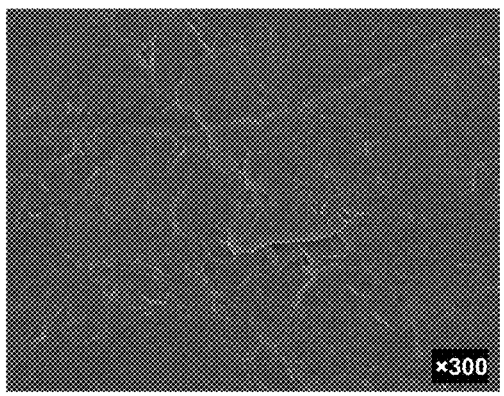
FIGS. 4A-4D show scanning electron microscope (SEM) images of a graphite foil substrate.
Figure 4B:
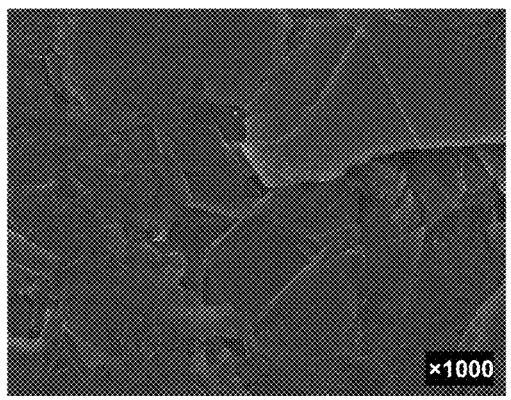
Figure 4C:
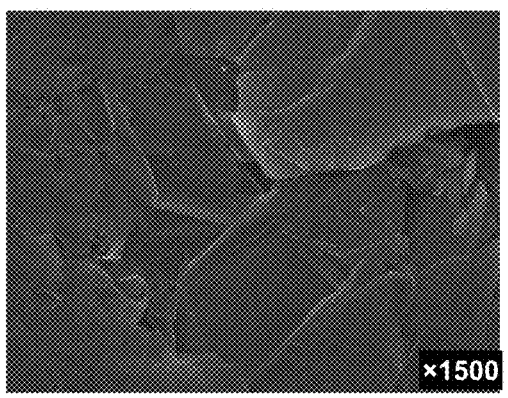
Figure 4D:

In certain embodiments, the discrete nanostructures comprising at least one active material can have one or more rounded surfaces, as illustrated in the example embodiments of FIGS. 2G-2K. As shown in FIG. 2G, the nanostructures can comprise spherical nanostructures 220, e.g., nanodots or spherical nanocrystals. The nanostructures can also include ellipsoid-shaped nanostructures or any other nanostructures having one or more rounded surfaces. As shown in FIG. 2H, the nanostructures can include dome-shaped nanostructures 220 or hump-shaped nanostructures 220. As shown in FIGS. 2I-2K, the nanostructures 220 can include multiple rounded surfaces. As shown in FIGS. 2I and 2J, the nanostructures 220 can have a lumpy surface structure. As shown in FIG. 2K, the nanostructures 220 can be formed as discrete clusters 225, wherein each cluster 225 comprises multiple nanostructures 220 having one or more rounded surfaces.

As described above, the nanostructures comprising at least one active material can comprise a single material type or multiple different material types. The nanostructures can include one or more active materials, one or more inactive materials, or one or more conductive materials, including any of the material compositions mentioned herein, as well as mixtures, alloys, or combinations thereof. The electrochemically deposited nanostructures can comprise heterostructure nanostructures formed via one or more ECD processes of the present invention. In certain embodiments, these structures can be formed by ECD of one or more alloy materials, co-deposition of multiple different materials using ECD, or separate ECD of multiple different materials, as well as any combination thereof. Related processes and process parameters are described in further detail below.

The example nanostructure embodiments of FIGS. 3A-3I show nanostructures 320, each including different or varying material types throughout different portions (i.e., different spatial regions) of the nanostructure. As shown in FIG. 3A, the nanostructure 320 can comprise a first region 330 comprising a first material M1 and at least a second region 332 comprising a second material M2, wherein the first material M1 and the second material M2 are different. As explained above, each of the different materials can include a single material composition or a mixture, alloy, or combination of multiple material compositions. Each different material type can include an active material, an inactive material, a conductive material, or any combination thereof. For example, M1 can include a first active material such as Si, and M2 can include a second active material such as Sn or graphite. M1 can include an active material such as Si, and M2 can include a conductive material such as Cu, or vice versa. As shown in FIG. 3B, the nanostructure 220 can comprise multiple first regions 330 comprising a first material M1 and at least a second region 332 comprising at least a second material M2, wherein the first material M1 and the second material M2 are different, and wherein the second region 332 is disposed between the multiple first regions 330. As shown in FIGS. 3C-3E, each of the nanostructures 320 can comprise multiple first regions 330 comprising a first material M1 and multiple second regions 332 comprising a second material M2, wherein the first material M1 and the second material M2 are different. As shown in FIG. 3C, the first regions 330 and second regions 332 can have an orderly pattern, e.g., an alternating pattern. Additionally or alternatively, as shown in FIGS. 3D-3E, the first regions 330 and second regions 332 can have a random configuration. In certain embodiments, the nanostructures can each comprise multiple different materials, wherein the different materials, wherein the amount or concentration of one or more of the different materials varies gradually across one or more regions of the nanostructure. For example, as shown in FIG. 3F, the nanostructures 320 can include a first material, M1, and at least a second material, M2, wherein the amounts or concentrations of both M1 and M2 vary gradually across one or more regions of the nanostructure. For example, as shown in FIG. 3F, in the nanostructures 320, the amount or concentration of the first material M1 decreases gradually toward the distal end 322 of the nanostructure and increases gradually toward the substrate surface 316, the amount or concentration of the second material M2 increases gradually toward the distal end 322 of the nanostructure and decreases gradually toward the substrate surface 316. In the nanostructure 320, the amount or concentration of the first material M1 decreases gradually toward both the substrate surface 316 and the distal end 322, whereas the amount or concentration of the second material M2 increases gradually toward both the substrate surface 316 and the distal end 322.

As shown in FIGS. 3G-3I, the nanostructures can include at least one core and at least one coating or shell layer, wherein at least one core material differs from at least one coating material. For example, as shown in FIG. 3G, the nanostructure 320 comprises a core 335 comprising a first material M1 and at least one coating layer 336 comprising a second material M2, wherein M1 and M2 are different. As shown in FIG. 3H, the core 335 comprises a first material M1, and the nanostructure comprises multiple coatings or shell layers 336a, 336b. The nanostructure includes a first shell 336a comprising a second material M2 and at least a second shell 336b comprising a third material M3, wherein at least two of the materials M1, M2, and M3 are different. As shown in FIG. 3I, the nanostructure 320 comprises a core comprising a first region 335a comprising a first material M1 and a second region 335b comprising a second material M2, wherein M1 and M2 are different materials. The nanostructure 320 includes a shell 336 comprising a third material M3, which can be the same as M1 or M2 or different than both materials M1 and M2.

In certain embodiments, the nanowires or other nanostructures can include one or more coatings or shell layers formed over the individual nanostructures. The coatings or shell layers can include materials having a different crystalline structure than the core, one or more SEI materials or layers, binder materials, a different active material than the core, a conductive material coating, or any other materials or coatings.

In preferred embodiments, the nanostructures and the one or more substrate materials are formed into a LIB anode composite. In certain embodiments, the composite anode structure can have one or more properties which vary over different spatial regions of the composite. For example, the porosity, composition, or one or more other characteristics can very over different spatial regions of the composite anode structure.

In preferred embodiments, the heterostructure nanostructures are formed by ECD onto the desired substrate. In certain embodiments, at least one portion of the nanostructures are formed via ECD and at least one portion of the nanostructures are formed using another method, e.g., coating, chemical binding, adsorption, binder material adhesion, lithography, sputtering, chemical vapor deposition (CVD), evaporation, electroless deposition, or other methods available in the art, as will be understood by persons of ordinary skill in the art. In one example embodiment, the discrete nanostructures comprise a first material, Mt, and at least a second material, M2, wherein the first material M1 is formed via ECD and the second material is formed by another method which is not ECD. Preferably, M1 is an active material (e.g., Si) and M2 can include an active material (e.g., graphite or Sn) or an active material which is less active or has a lower lithiation capacity than M1 (e.g., M1 comprises Si and M2 comprises graphite). M2 can include an inactive material such as a binder (e.g., carboxylmethyl cellulose (CMC), polyvinylidene fluoride (PVDF), or polyacrylic acid (PAA), or poly(acrylamide-co-diallyldimethylammonium) (PAADAA)), or an inactive conductive material (e.g., Cu).

Substrate Materials and Structures

As mentioned above, the present invention includes methods for directly depositing nanostructures comprising at least one LIB active material onto a substrate via electrochemical deposition, as well as compositions, devices, and components related thereto, and methods and processes for forming such compositions, devices, and components. With the direct electrochemical deposition methods of the present invention, LIB active materials can be simultaneously formed and deposited onto the substrate, whereby discrete nanostructures comprising one or more LIB active materials are grown by reduction of precursor materials directly on the desired substrate surface during the ECD process. The active material is reduced directly onto the substrate such that the active material nanostructures are in direct physical contact with the substrate. The discrete nanostructures can include any of the nanostructure characteristics described herein. In preferred embodiments, the discrete nanostructures comprise monocrystalline Si. Preferably, the discrete nanostructures include monocrystalline Si nanowires or nanospikes.

The substrate can include any conductive material. For example, the substrate can comprise one or more metals, copper (Cu), carbon (C), graphite, nickel (Ni), steel, aluminum (Al), platinum (Pt), gold (Au), tin (Sn), titanium (Ti), zinc (Zn), lithium (Li), inorganic semiconductor materials, one or more conductive polymers; one or more binder materials such as CMC, PVDF, PAA, or PAADAA; or other conductive materials, as well as any composition, mixture, intermetallic compound, alloy, or combination thereof. In certain embodiments, the substrate includes multiple materials, e.g., Cu and graphite, non-graphitic C and graphite, Ni and graphite, steel and graphite, Al and graphite, Pt and graphite, Cu and C, Cu and Sn, C and Sn, multiple forms of graphite, multiple forms of C; Cu, non-graphitic C, and graphite; graphite and one or more binder materials, or any composition, mixture, alloy, or combination thereof.

The one or more substrate materials can include any combination of materials, crystal structures, crystallinity, morphology, shape, and size. The substrate can include one or more of a conductive sheet, film, plate, foil, mesh, foam, sponge; or powder or plurality of particles/fibers/sheets/flakes/wires which can be packed, interwoven, adhered, or otherwise associated with one another; as well as any combination thereof. In one general class of preferred embodiments, the substrate includes at least one porous substrate structure. In another general class of preferred embodiments, the substrate includes at least one planar substrate structure. Preferably, the substrate includes at least one metal or conductive planar structure. For example, the substrate can include one or more film, sheet, foil, mesh, planar sponge, plurality of particles, wires, or fibers formed into a planar shape or structure, or other planar structures, or any combination thereof.

In one class of embodiments, a first active material is electrochemically deposited directly onto one or more substrates, wherein the substrate comprises at least one conductive LIB current collector structure and/or at least one second active material. Preferably, the first active material comprises silicon. Preferably, the first active material comprises nanostructures, e.g., nanowires. Each of the current collectors and second active materials can include any suitable materials and structures described herein, including one or more of a sheet, film, plate, foil, mesh, foam, sponge; powder or plurality of particles/fibers/sheets/flakes/wires which can be packed, interwoven, adhered, or otherwise associated with one another; or any combination thereof. Preferably, the one or more substrates includes a current collector comprising one or more copper structures and/or a second active material comprising one or more graphite structures. In one embodiment, a first active material is electrochemically deposited directly onto at least one structure comprising at least a second active material, wherein the at least one structure comprising the second material is associated with at least one current collector. The first active material can also be deposited directly onto the at least one current collector via electrochemical deposition. The current collector and second active material can be combined or associated with one another using any suitable processes known to those of ordinary skill in the art. For example, the conductive current collector material(s) and the second (or more) active material can be mechanically bound, mixed, stacked, layered, pressed, interwoven, chemically bound, adsorbed, alloyed, or adhered using one or more adhesive binder materials; or the materials can be combined using ablation techniques, chemical deposition techniques such as ECD or CVD, adsorption, spraying, coating, lithography, sputtering, dipping, bonding, or other techniques. The current collector and second active material can be combined or associated with one another prior to the electrochemical deposition of the first active material, during the electrochemical deposition process, after the first active material is electrochemically deposited onto the desired substrate, or any combination thereof.

In preferred embodiments, an LIB active material is electrochemically deposited directly onto the substrate surface. The electrochemically deposited material can include a single active material; a mixture, composition, or alloy comprising multiple different active materials; one or more inactive materials; a mixture, composition or alloy comprising multiple inactive materials; or a mixture, composition, or alloy comprising one or more active materials and one or more inactive materials. Additionally or alternatively, one or more active materials and/or one or more inactive materials can be formed or deposited on the substrate via any suitable known methods, e.g., coating, chemical binding, adsorption, binder material adhesion, lithography, sputtering, chemical vapor deposition (CVD), or other methods, as will be understood by persons of ordinary skill in the art. Exemplary substrates include one or more of the following: graphite foil or plate, polished graphite foil or plate, graphite flakes or particles, graphite flakes or particles and one or more binder materials such as CMC, PVDF, PAA, or PAADAA, graphite flakes or particles combined with one or more binder materials and coated on graphite foil or plate, Cu-coated graphite foil, Cu-coated graphite foil coated with graphite flakes or particles, graphite flakes or particles combined with one or more binder materials and coated on a Cu-coated graphite foil or plate, Cu-coated graphite foil or plate subjected to gas treatment, porous Cu mesh or foam, Cu wires, Cu fibers, Ni-coated Cu wires or fibers, patterned Cu wires, Ni-coated patterned Cu wires, carbon sheet, heat-treated carbon sheet, Cu foil or plate coated with graphite flakes or particles, graphite flakes or particles combined with one or more binder materials and coated on a Cu foil or plate, graphite flakes or particles disposed between or pocketed by porous Cu mesh sheets, graphite flakes or particles combined with one or more binder materials and disposed between or pocketed by porous Cu mesh sheets, one or more binder materials such as CMC, PVDF, PAA, or PAADAA, and combinations thereof. In certain embodiments, the substrate can be gas treated with one or more reductant gases to allow for increased reduction of metallic ions onto the substrate surface. In certain embodiments, the substrate surface can be heat-treated. For example, the substrate can comprise heat-treated carbon, wherein the heat treatment creates graphitic features on the surface of the carbon substrate structure.

In one general class of embodiments, the ECD substrate comprises carbon. The substrate can comprise one or more carbon structures. The carbon substrate structures can comprise any suitable form of carbon, including graphite, graphene, natural graphite, artificial graphite, highly-ordered pyrolitic graphite (HOPG), activated carbon, petroleum coke carbon, mesophase carbon, hard carbon, soft carbon, carbon black, porous carbon, fullerenes, heat-treated carbon, or other forms of carbon, as well as combinations thereof. The carbon substrate structures can comprise carbon film or foil, carbon sheets, carbon paper, carbon powder, porous carbon powder, carbon fibers, carbon particles, carbon microbeads, mesocarbon microbeads (MCMB), carbon nanotubes, carbon nanoparticles, graphite fibers, graphite particles or powder, graphite foil, or other carbon structures, as well as combinations thereof.

In another general class of embodiments, the ECD substrate comprises copper. The substrate can comprise one or more copper structures. For example, the substrate can include one or more copper film, foil, plate, or sheet; copper mesh, foam, or sponge; copper wires, interwoven copper wires, copper particles, copper flakes; one or more layers of copper coated on another substrate material such as a graphite foil, carbon paper, or graphite particles; or other copper structures, as well as combinations thereof.

In preferred embodiments, the substrate comprises one or more conductive current collector structures and/or one or more LIB active material structures, whereby the one or more substrate materials and the discrete nanostructures comprising at least one active material form a composite structure for use in a LIB anode. For example, the nanostructures can be formed directly on a current collector structure to form an anode current collector comprising the discrete active material nanostructures. The anode current collector structure can include an active material (e.g., graphite) and/or an inactive material (e.g., Cu).

In one general class of embodiments, the nanostructures comprising a first active material (e.g., Si) can be formed directly on one or more structures comprising a second active material (e.g., graphite), resulting in a composite active material structure comprising the first and second active material. The composite structure comprising the first and second active material can be associated with a current collector structure, e.g., a Cu current collector. For example, the composite structure comprising the first and second active material can be associated with the current collector material after formation of the composite structure. In other embodiments, the substrate structure comprising the second active material can be associated with a current collector substrate prior to the formation of the discrete nanostructures thereon. In other embodiments, the substrate structure comprising the second active material can be associated with a current collector substrate simultaneously with formation of the discrete nanostructures thereon. For example, the second active material and the discrete nanostructures comprising the first active material can be co-deposited onto the current collector substrate structure.

The one or more substrates can include a LIB anode active material, a LIB anode current collector, or both an active material and a current collector. Upon ECD of LIB active material nanostructures onto the LIB anode active material and/or current collector substrate structure(s), the resulting composite is preferably included as an anode component in a LIB. In preferred embodiments, the active material is electrochemically deposited onto one or more substrates including LIB current collectors and/or additional anode active materials. The current collector can comprise copper, a copper plate, copper mesh, copper sponge, carbon, or carbon paper. The active materials can include graphite, including graphite particles or graphite powder. In one class of preferred embodiments, the substrate includes a LIB current collector including carbon, copper, or a combination thereof. The substrate can include copper materials such as a copper plate, mesh, or sponge. Additionally or alternatively, the substrate can include carbon-based materials such as carbon paper or graphite, including graphite powder or a plurality of graphite particles. The substrate may also include a combination of materials such as copper and carbon, copper and graphite, or graphite and non-graphitic carbon. For example, the copper is electrochemically deposited onto graphite particles to form a silicon-graphite composite LIB anode material. In another class of preferred embodiments, the substrate includes LIB active materials including graphite, preferably a plurality of graphite particles, more preferably fine graphite powder or flakes.

In one preferred class of embodiments, one or more active materials—preferably one or more active materials comprising silicon, is electrochemically deposited onto one or more conductive current collector structures which can be used as a current collector in a LIB anode. Preferably, the current collector comprises one or more copper structures, e.g., a copper sheet, film, plate, foil, mesh, foam, sponge; powder or plurality of particles/fibers/sheets/flakes/wires which can be packed, interwoven, adhered, or otherwise associated with one another; or any combination thereof. In preferred embodiments, silicon is electrochemically deposited directly onto a copper current collector, and the Cu—Si composite material can form a LIB anode material, wherein the copper is a conductive current collector and the silicon is an active material for lithiation and delithiation during LIB charge and discharge cycling.

In another preferred class of embodiments, a first active material is electrochemically deposited directly onto at least a second active material to form a composite active material comprising the first and second active materials, wherein the composite active material structure is suitable for use as a LIB anode active material. In preferred embodiments, a first active material comprising silicon is electrochemically deposited directly onto at least a second active material, wherein the second active material comprises one or more graphite structures to form a silicon-graphite composite LIB anode material. The one or more graphite structures can include one or more of a graphite sheet, film, plate, foil, powder, particles, or fibers; sheet, film, plate, mesh, foam, sponge; powder or plurality of particles/fibers/sheets/flakes which can be packed, interwoven adhered, or otherwise associated with one another; or any combination thereof.

In one general class of embodiments, silicon nanostructures, e.g., Si nanowires, are formed via direct electrochemical deposition on a plurality of graphite particles, preferably graphite microparticles. The graphite particles comprising silicon nanoparticles deposited thereon are combined to form a porous, three-dimensional silicon-graphite composite anode active material. In another general class of embodiments, silicon nanostructures, Si nanowires, are formed via direct electrochemical deposition on a plurality of distinct, individual current collectors. For example, the current collectors can include a plurality of carbon and/or copper sheets, preferably porous sheets comprising copper, such as mesh sheets or sponge sheets. The plurality of current collectors can be combined to form a LIB component, preferably a current collector and active material composite anode component. The plurality of current collectors can be combined in any suitable manner to form the component, and the configuration of the current collectors can be tailored to meet the structural requirements of any particular battery system, as will be understood by persons of ordinary skill in the art. In one example class of embodiments, the LIB component comprises a stack of multiple sheets comprising the conductive material and active material composite. Preferably, one or more of the sheets in the stack are porous, e.g., conductive mesh or sponge sheets having the active material deposited thereon. One or more of the sheets in the stack can be non-porous or less porous than other sheets. For example, the sheets can have increasing porosity with increasing distance from a bottom anode current collector sheet.

In preferred embodiments, the substrate comprises at least one graphite structure, e.g., one or more graphite foil, film, or sheet structures; graphite powder, flakes, or particles; packed graphite powder/flakes/particles, interwoven graphite powder/flakes/particles, graphite powder/flakes/particles adhered together with one or more binder materials (e.g., CMC, PVDF, PAA, or PAADAA), other graphite structures, or any combination thereof. The one or more graphite structures can include natural graphite, synthetic graphite, MCMB, HOPG, graphite powder, porous graphite, porous graphite film or graphite felt, heat-treated carbon having a graphitic surface, or other forms of graphite. Preferably, the one or more graphite structures includes a natural graphite surface. In certain embodiments, a graphite layer can be formed on one or more other materials, e.g., non-graphitic carbon. In preferred embodiments, the substrate includes graphite foil or synthetic graphite (e.g., synthetic graphite powder) coated on graphite foil.

In embodiments of the present invention which include a graphite film or foil substrate structure, the graphite film or foil substrate can be used as a LIB anode active material, a LIB anode current collector, or both an active material and a current collector. The graphite film or foil substrate can be stacked on, adhered to, or otherwise combined with another current collector structure, e.g., a Cu foil or film structure. In embodiments of the present invention, the graphite film or foil substrate, or a portion or one or more layers thereof, can be removed from the composite structure formed via one or more ECD processes of the present invention. This allows for minimization of the thickness of the graphite layer while allowing the electrochemically deposited active material to remain in tact. The graphite foil substrate, or portions or one or more layers thereof, can be removed using methods available in the art, e.g., peeling, rubbing, etching, scraping, dissolving, or applying shear force to the graphite foil. In preferred embodiments, the graphite film or foil substrate has a thickness of about 1 μm to about 100 μm, preferably about 1 μm to about 50 μm, 1 μm to 50 μm, about 1 μm to about 25 μm, or 1 μm to 25 μm.

In one preferred class of embodiments, the ECD substrate comprises graphite powder including a plurality of graphite particles or flakes. The graphite particles preferably have an average size of about 1 μm to about 100 μm, 1 μm to 100 μm, about 1 μm to about 50 μm, 1 μm to 50 μm, about 1 μm to about 50 μm, 1 μm to 50 μm, or preferably about 5 μm to about 30 μm, or 5 μm to 30 μm.

Graphite powder or binder-graphite powder composite can be coated on, formed on, or otherwise associated with another substrate structure (e.g., graphite foil, Cu film, Cu mesh, Cu sponge). The graphite powder or binder-powder composite can be associated with a porous substrate. For example, the graphite powder can be packed into a pocket formed in or on the substrate structure. In another embodiment, the graphite is disposed between two or more structures, wherein at least one of the structures is porous or permeable so as to allow for the active material to pass therethrough and deposit onto the graphite powder during the ECD process.

The graphite powder or binder-graphite powder composite can be formed into a layer and optionally coated onto another substrate/scaffold structure. Preferably, the graphite-binder layer has a thickness of about 1 μm to about 200 μm, 1 μm to 200 μm, about 1 μm to about 100 μm, 1 μm to 100 μm, about 1 μm to about 50 μm, or 1 μm to 50 μm. Preferably, the graphite powder layer or binder-powder layer is a porous layer. Preferably, the graphite-binder layer has a porosity of about 10%-70%. The graphite powder or binder-powder layer can have a varied porosity or concentration over different spatial regions of the layer. For example, graphite powder layer can have lower porosity in the internal region of the layer and higher porosity near one or more external surfaces of the layer. When coated on an electrode, a current collector, or another structure, the graphite powder layer can have a lower porosity near the interface and increasing porosity with increasing distance from the interface between the graphite powder layer and the structure. Alternatively, the porosity can be higher at the interface and decrease with increasing distance from the interface. Other features of the graphite layer can also be varied over spatial regions of the graphite powder layer, including graphite particle size, graphite particle concentration, or binder concentration. For example, the binder concentration can be higher near an interface between the graphite powder layer and another structure, and the graphite powder layer can have decreasing binder concentration with increasing distance from the interface.

In one example embodiment, the substrate comprises graphite foil such as the bare graphite foil depicted in FIGS. 4A-4D, showing scanning electron microscope (SEM) images of the graphite foil surface at magnifications of 300×, 1000×, 1500×, and 3000×, respectively. The graphite foil substrate can be used as both a substrate for the active material nanostructures and/or a LIB current collector structure. In other embodiments, the graphite foil is a current collector and a substrate/scaffold for deposition of one or more ECD substrate materials (e.g., graphite powder or Cu).

In one general class of embodiments, LIB active material nanostructures (e.g., Si nanowires or other nanostructures) are formed directly on a graphite foil substrate according to one or more direct ECD methods of the present invention.

Figure 5A:
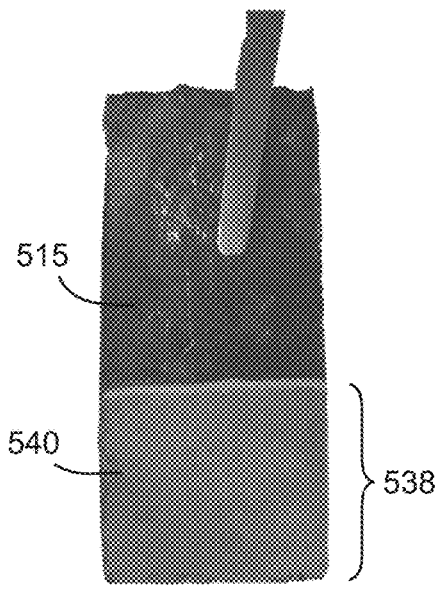
FIGS. 5A-5C show photographs of various composite LIB anode structures comprising a graphite foil current collector substrate and discrete Si nanostructures formed directly on the graphite foil according to one or more ECD methods of the present invention.
Figure 5B:
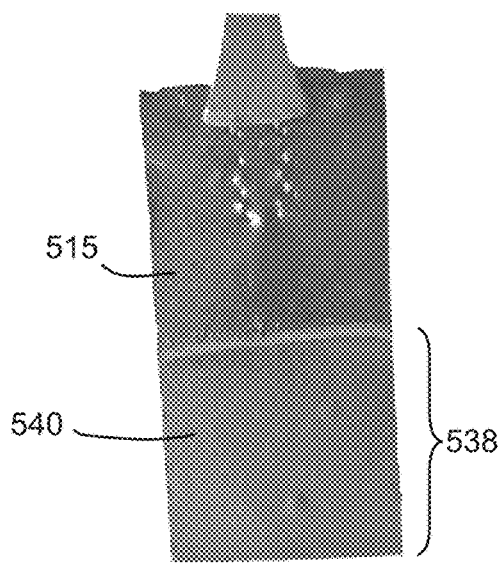
Figure 5C:
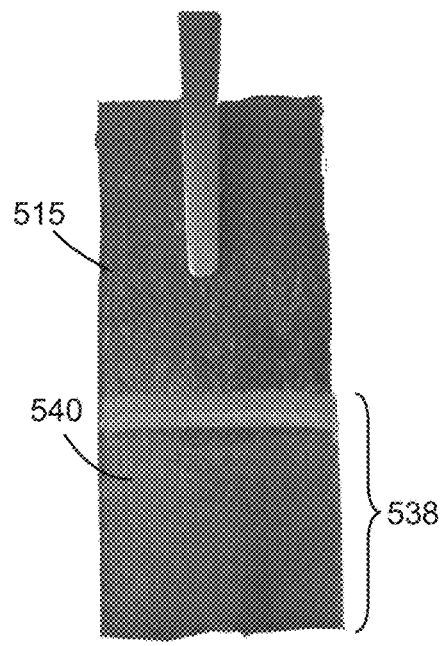

FIGS. 5A-5C show photographs of various composite LIB anode structures, each comprising a graphite foil current collector substrate 215 and discrete Si nanostructures formed directly on the graphite foil according to various ECD methods of the present invention. As can be seen in FIGS. 5A-5C the bottom portion 538 of the graphite foil 515 was subjected to an ECD process according to an embodiment of the present invention, resulting in the formation of at least one layer 540 comprising discrete Si nanostructures formed directly on the graphite foil substrate 515. Although FIGS. 5A-5C depict the layer 540 comprising discrete active material nanostructures formed only on the bottom portion 538 of the graphite foil substrate 515, the layer 540 can be formed over the entire surface or any select portion of the substrate surface. This general concept applies to each of the embodiments of the present invention described herein, e.g., the embodiments shown in FIGS. 5A-5C, 23, 26A-26B, 27A-27B, 38, 39, and 40. As can be seen in the SEM images of FIGS. 6-22, discrete Si active material nanostructures are formed on the graphite foil substrate. As explained in further detail below, the ECD process parameters will affect the characteristics of the electrochemically deposited material. The ECD processes corresponding to the example embodiments of FIGS. 6-22 are described in further detail below. In preferred embodiments, the composite LIB anode structure comprises elongated Si nanostructures formed via ECD directly on the substrate. For example, as shown in the example embodiments depicted in FIGS. 6A, 6B, 8A-12C, and 14A-14C, Si nanowires 520 can be deposited on the substrate according to various direct ECD methods of the present invention. Additional active material nanostructures are also included in the methods and compositions of the present invention, including the various active material nanostructures described herein. The discrete active material nanostructures preferably include crystalline Si, e.g., crystalline Si nanowires. However, active material nanostructures comprising additional forms of Si are also included in the present invention. For example, the active material nanostructures can include amorphous Si structures, polycrystalline Si structures, both amorphous and polycrystalline Si structures, or a nanostructures comprising a combination of crystalline Si and amorphous and/or polycrystalline Si.

In another general class of embodiments, LIB active material nanostructures (e.g., Si nanowires or other nanostructures) are formed directly on a first substrate comprising graphite powder, or a plurality of graphite particles, according to one or more direct ECD methods of the present invention. The ECD substrate comprising graphite powder, or a plurality of graphite particles, can be coated on or otherwise associated with a second substrate or scaffold structure such as a graphite foil structure, a Cu film or mesh structure, or a combination thereof. Preferably, the ECD substrate comprises graphite powder including a plurality of graphite particles, graphite flakes, rounded graphite particles, or spherical graphite particles. Discrete nanostructures comprising at least one active material can be electrochemically deposited on the graphite particles to form a composite LIB anode active material structure.

In certain embodiments, the graphite particles are not bound together during the ECD process. In other embodiments, the graphite powder substrate includes multiple groups of graphite particles bound together, wherein one or more of the groups of graphite particles form discrete groups of graphite particles—i.e., the groups are physically separated from another during the ECD process. In certain embodiments, the graphite particles are provided on another substrate structure such as a conductive plate, film, or sheet. For example, the first substrate material comprising individual graphite particles or discrete groups of graphite particles can be provided on a second substrate (e.g., a graphite foil, Cu film, or porous Cu substrate/scaffold), whereby the discrete graphite particles or the discrete groups of graphite particles form discrete protrusions or surface features on the surface of the second substrate structure. The discrete protrusions or surface features are spatially separated from one another such that collectively, the plurality of discrete surface features (each comprising at least one graphite particle) provide roughness on the second substrate surface.

In certain embodiments of the present invention, the graphite particles of the graphite powder substrate can be physically associated with one another (e.g., bound or adhered together). The graphite particles can be physically associated with one another before, after, or during the ECD process. In preferred embodiments, the graphite particles are bound together using one or more adhesive binder materials to form a graphite powder and binder composite structure. Preferably, the binder includes carboxylmethyl cellulose (CMC), polyvinylidene fluoride (PVDF), poly(acrylamide-co-diallyldimethylammonium) (PAADAA), or polyacrylic acid (PAA). The graphite powder/particles can be combined with one or more binder materials and coated onto a scaffold or substrate structure such as a planar conductive material structure, a graphite foil structure, a Cu film structure, a Cu mesh or sponge structure, or a combination thereof. The binder and graphite powder can be deposited onto the scaffold/substrate using any suitable coating or deposition method, including battery slurry coating methods available in the art, including those described in U.S. patent application Ser. No. 12/783,243, the entirety of which is incorporated herein by reference. Preferably, the planar scaffold/substrate comprises a porous layer comprising the graphite powder ECD substrate, a binder-graphite powder composite, a composite material comprising the graphite powder having the active material nanostructures formed thereon, or a composite material comprising the binder and the graphite powder having the discrete nanostructures formed thereon. In one class of embodiments, the graphite powder can be deposited on the scaffold/substrate prior to the ECD process, whereby the planar scaffold/substrate and the graphite powder form a composite substrate structure onto which the nanostructures are deposited via direct ECD. The discrete active material nanostructures can be directly deposited via ECD onto the graphite particles or onto both the graphite particles and the planar scaffold/substrate. In other embodiments, the discrete active material nanostructures are deposited onto the graphite powder/particles to form an active material composite, and the graphite powder/particles comprising the nanostructures can be subsequently bound together and coated onto the planar scaffold/substrate, e.g., using one or more adhesive binder materials. As will be understood by persons of ordinary skill in the art, the composite material can be coated onto the scaffold/substrate using conventional methods for coating a battery slurry composite onto a substrate.

Figure 23:
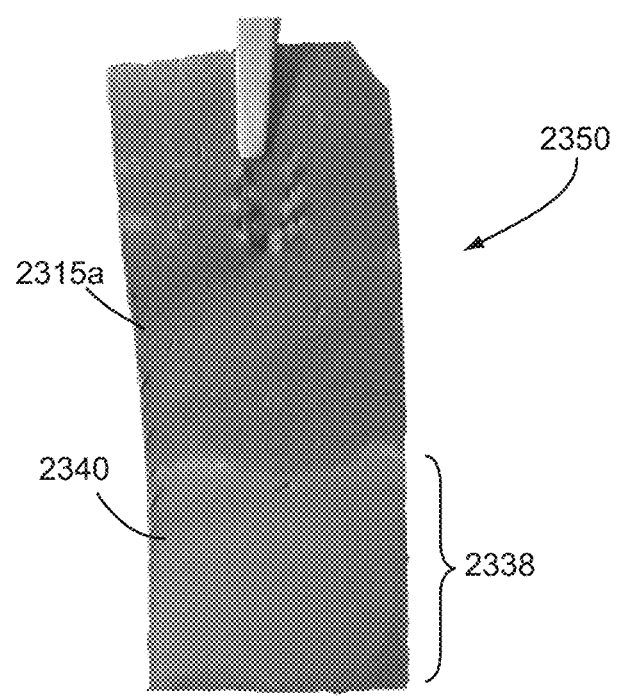
FIG. 23 shows a graphite foil substrate having a graphite powder substrate formed thereon.
Figure 24A:
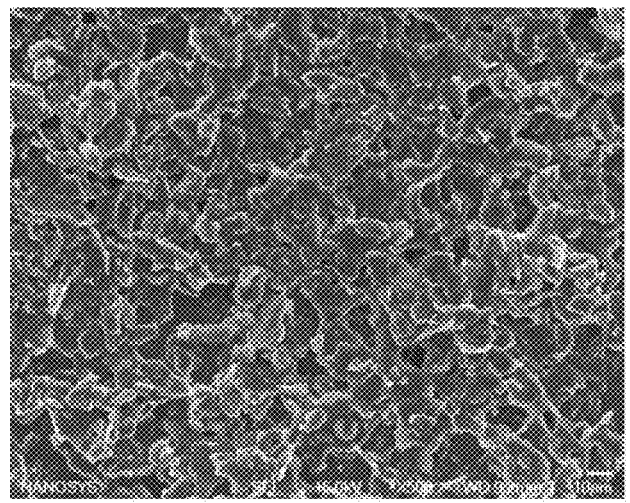
FIGS. 24A-24C show SEM images of the graphite powder layer of FIG. 23 prior to Si deposition using one or more ECD processes of the present invention.
Figure 24B:
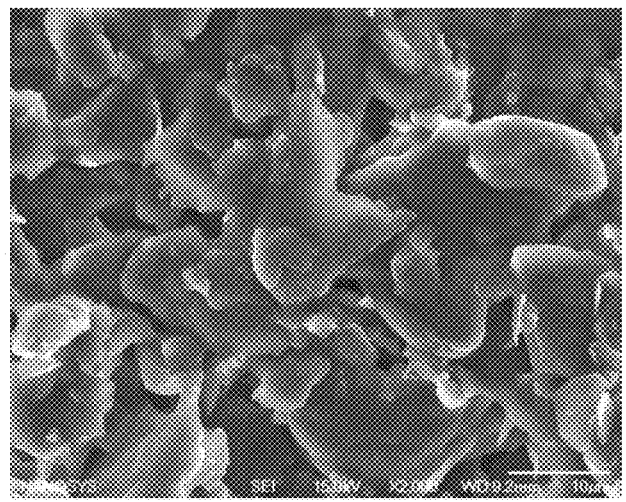
Figure 24C:
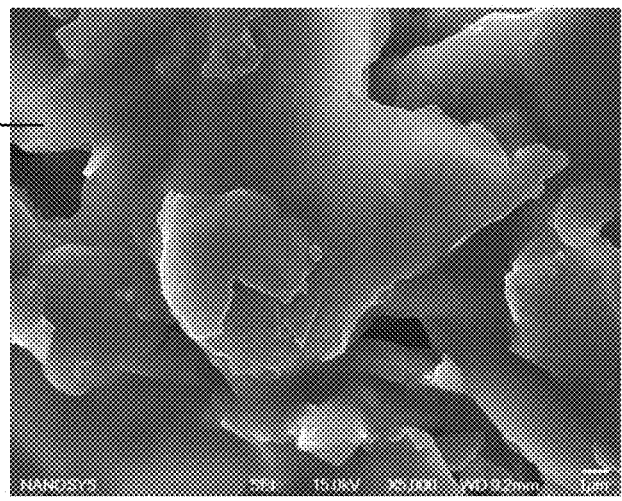
Figure 25A:
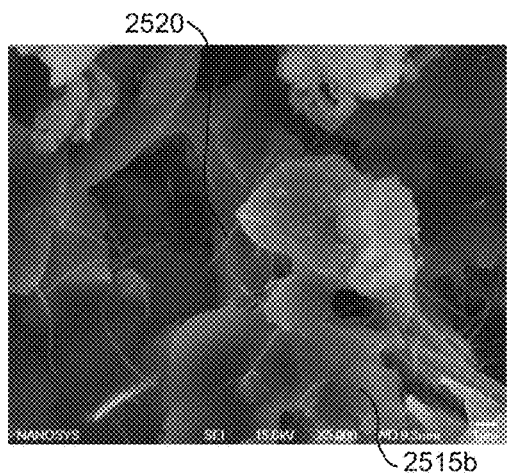
FIGS. 25A-25D show SEM images of a graphite powder layer having Si nanostructures formed thereon using one or more ECD processes of the present invention.
Figure 25B:
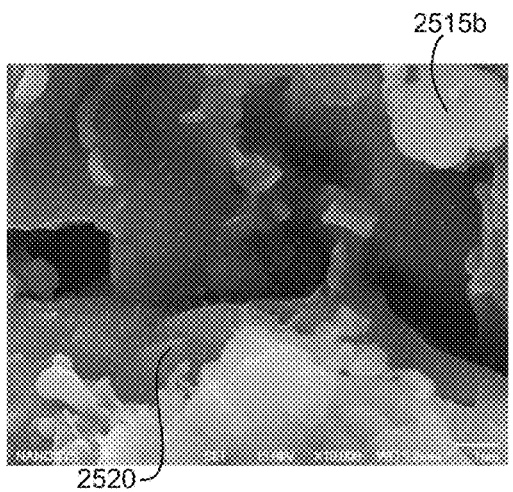
Figure 25C:
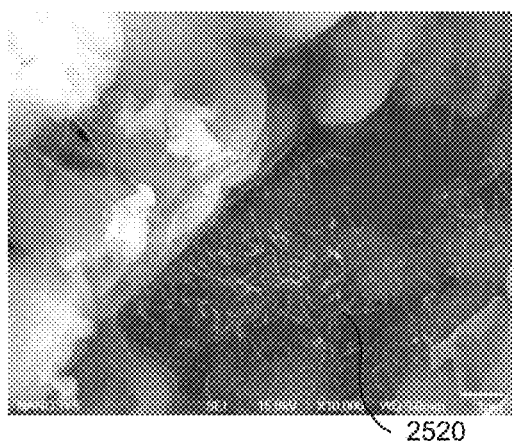
Figure 25D:
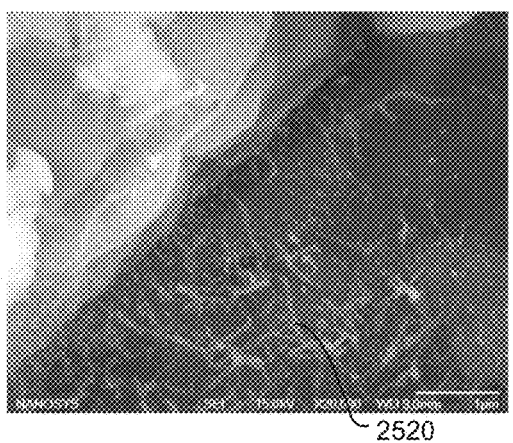
Figure 26A:
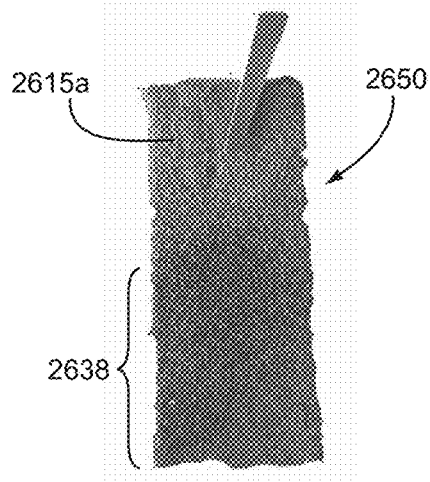
FIGS. 26A-27B show photographs of a porous copper (Cu) substrate having a graphite powder substrate material disposed therein.
Figure 26B:
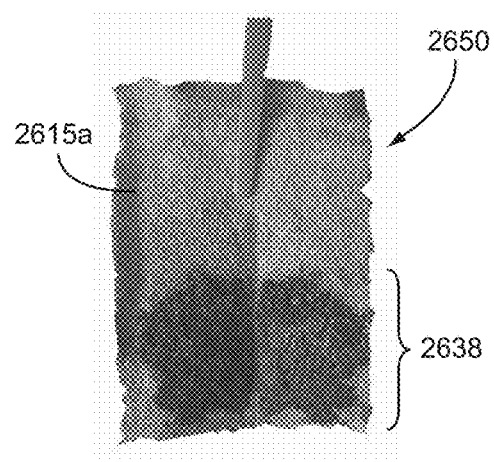
Figure 27A:
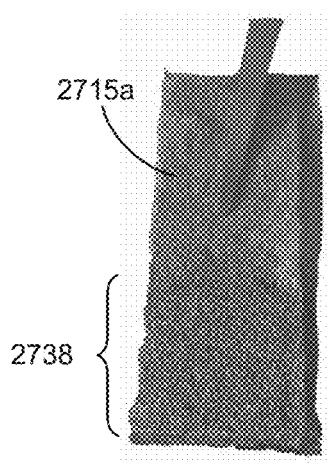
Figure 27B:
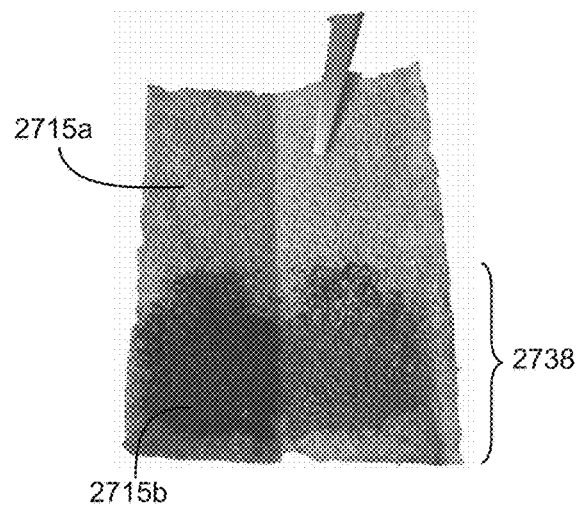

As can be seen in FIG. 23, the porous layer 2340 is formed on the lower portion 2338 of the graphite foil substrate 2315. However, according to the present invention, the layer 2340 can be formed over the entire surface or a select portion of the graphite foil 2315$a$. FIGS. 24A-24C include SEM images of the porous layer 2340 at magnifications of 500×, 2000×, and 5000×, respectively. In FIGS. 24A-24C, the porous layer 2340 is shown prior to the direct ECD process—i.e., before the discrete active material nanostructures are formed on the graphite particles 2415$b$. FIGS. 25A-25D include SEM images of a porous layer 2340 comprising graphite particles 2515$b$ after direct ECD of Si active material nanostructures 2520 onto the graphite particles 2515$b$. As can be seen in the images of FIGS. 25A-25D, discrete Si nanowires 2520 are formed directly on the graphite particles 2515$b$ via direct ECD according to methods of the present invention. The discrete active material nanostructures preferably include crystalline Si, e.g., crystalline Si nanowires. However, active material nanostructures comprising additional forms of Si are also included in the present invention. For example, the active material nanostructures can include amorphous Si structures, polycrystalline Si structures, both amorphous and polycrystalline Si structures, or a nanostructures comprising a combination of crystalline Si and amorphous and/or polycrystalline Si.

In one example embodiment, a porous layer comprising graphite powder/particles and an adhesive binder material is formed on a graphite foil substrate/scaffold structure, and discrete Si nanostructures are formed on the graphite particles according to one or more direct ECD methods of the present invention. The ECD process of this example embodiment is described in further detail below. The graphite powder substrate material 2315$b$ is coated on a graphite foil substrate structure 2315$a$ to create a composite graphite foil-graphite powder substrate for ECD of one or more active material nanostructures thereon. The graphite powder can be coated directly on the graphite foil. In certain embodiments, the graphite powder can be coated on the graphite foil or another substrate structure without the use of a binder material. In preferred embodiments, the graphite foil is combined with at least one binder material (preferably CMC) and coated on the graphite foil using conventional LIB slurry coating techniques. FIG. 23 shows a photograph of a composite anode structure 2350 comprising a graphite foil current collector 2315$a$ and a porous layer 2340 formed thereon, prior to Si deposition. After the ECD process wherein Si nanostructures are formed on the graphite powder, the porous layer 2340 comprises graphite powder, a CMC binder material, and discrete Si nanostructures formed on the graphite powder. As can be seen in FIG. 23, the porous layer 2340 is formed on the graphite foil 2315$a$ at the bottom portion 2338, which was subjected to the ECD process. FIGS. 24A-24C include SEM images of the porous layer 2340 at magnifications of 500×, 2000×, and 5000×, respectively. In FIGS. 24A-24C, the porous layer 2340 is shown prior to the direct ECD process—i.e., before the discrete active material nanostructures are formed on the graphite particles 2415$b$. FIGS. FIGS. 25A-25D include SEM images of a porous layer 2340 comprising graphite particles 2515*b* after direct ECD of Si active material nanostructures 2520 onto the graphite particles 2515*b*. As can be seen in the images of FIGS. FIGS. 25A-25D, discrete Si nanowires 2520 are formed directly on the graphite particles 2515*b* via direct ECD according to methods of the present invention. ECD processes of the present invention are described in further detail below. Upon formation of a LIB anode, the graphite foil 2515*a* and graphite powder 2515*b* coating can be used as current collector materials in a LIB, and the Si nanostructures can be used as the active materials in a LIB. The graphite foil can also contribute to the active material of the LIB.

In another class of embodiments, the ECD substrate includes graphite powder which is physically associated with a Cu substrate/scaffold structure, and discrete Si nanostructures are formed on the graphite particles according to one or more direct ECD methods of the present invention. Preferably, the Cu substrate structure includes a porous Cu structure such as a porous Cu film or a Cu mesh or sponge structure. Preferably, the Cu substrate structure, e.g., a planar Cu structure, is both a LIB current collector structure and a working electrode of the electrochemical cell used in the ECD process. The graphite particles can be deposited on one or more surfaces of the Cu structure, deposited within the pores of the porous Cu structure, disposed in a pocket formed by the Cu substrate, disposed between two or more sides of a folded Cu substrate structure, disposed or sandwiched between multiple Cu substrate structures, or any combination thereof. Preferably, the porous Cu substrate (e.g., porous Cu mesh or sponge) has a porosity of about 10-80%, about 10-50%, or about 10-30%, preferably about 30% or 30%. As described previously, the graphite particles can be deposited with or without a binder material, and the graphite powder can be arranged to provide protrusions or surface features on one or more surfaces of the Cu substrate.

Figure 28:
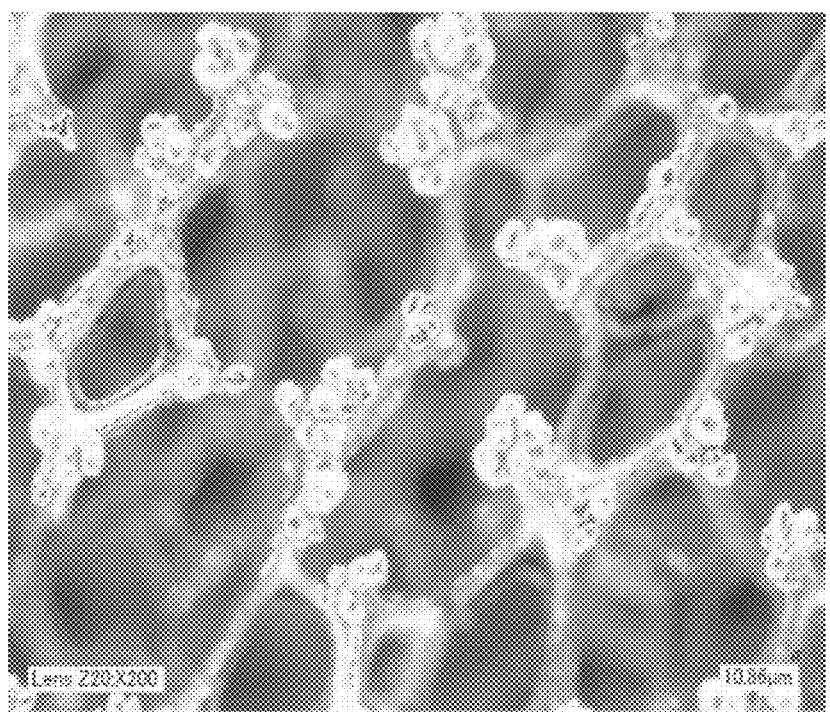
FIG. 28 shows an optical image of a porous Cu mesh substrate material prior to deposition of Si nanostructures thereon.
Figure 29:
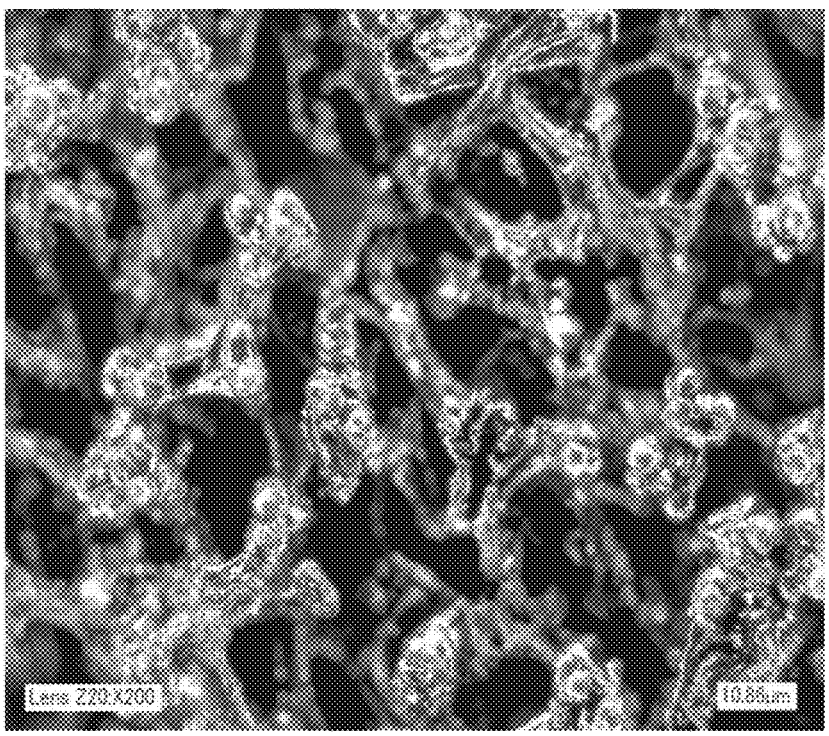
FIG. 29 shows an optical image of a porous Cu mesh substrate having Si nanostructures formed thereon according to one or more ECD processes of the present invention.
Figure 30A:
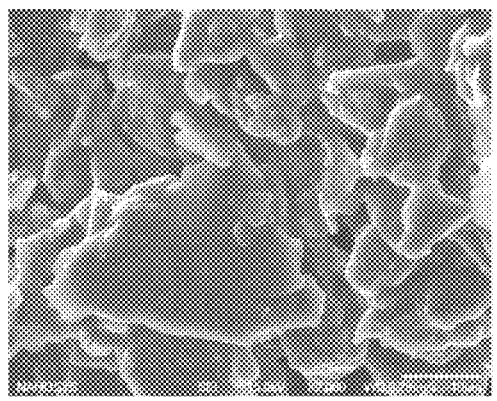
FIGS. 30A-31D show SEM images of Si nanostructures deposited on graphite powder which was disposed in a porous Cu mesh substrate scaffold according to one or more ECD processes of the present invention.
Figure 30B:
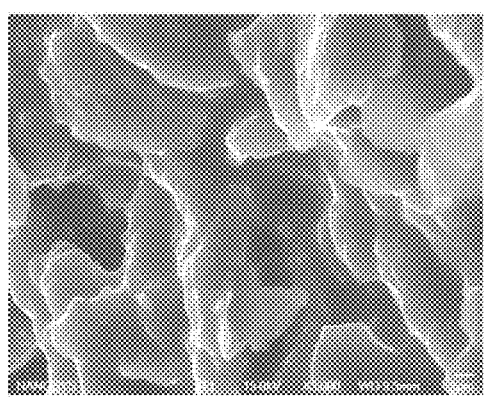
Figure 30C:
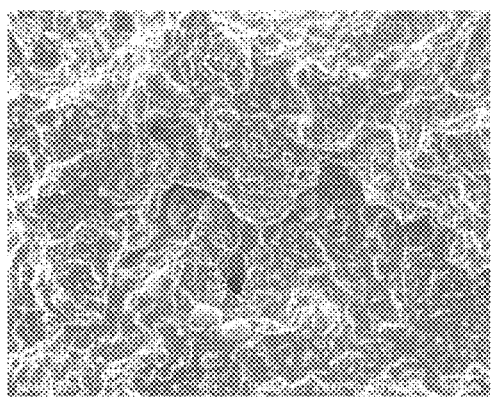
Figure 30D:
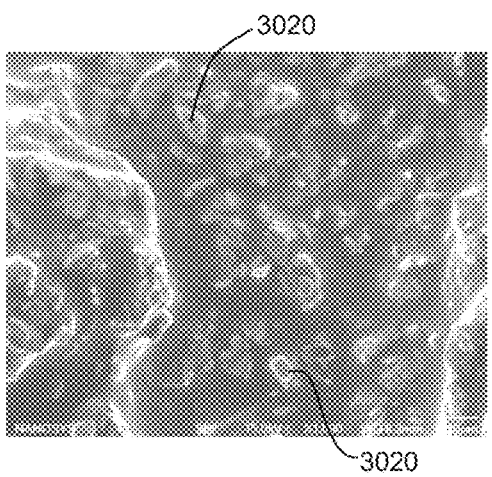
Figure 31A:
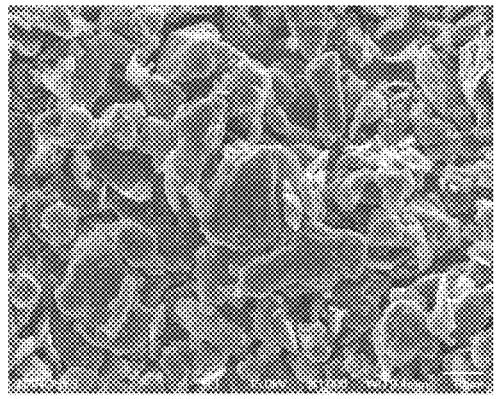
Figure 31B:
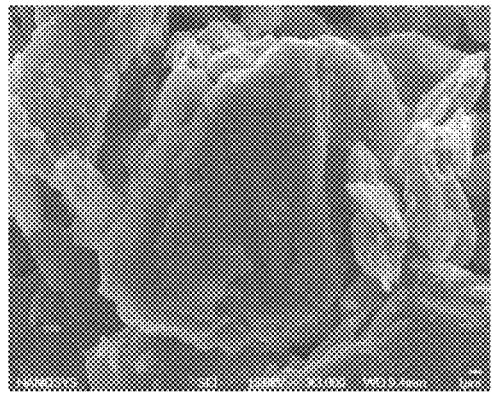
Figure 31C:
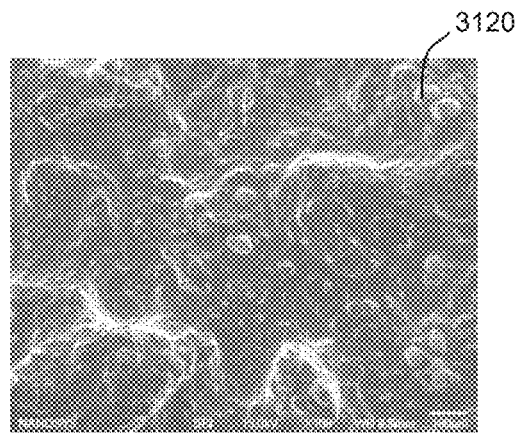
Figure 31D:
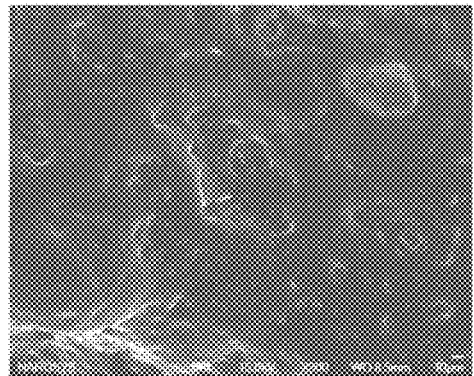
Figure 32A:
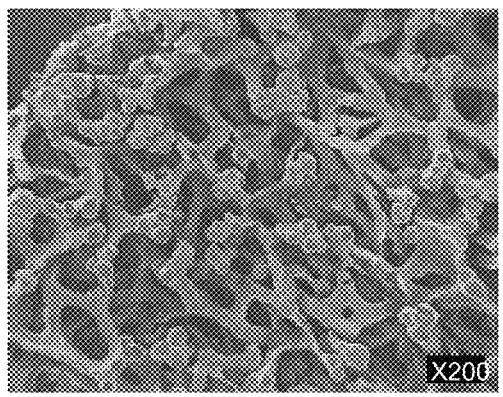
FIGS. 32A-32D show SEM images of Si nanostructures formed directly on a porous Cu mesh substrate according to one or more ECD processes of the present invention.
Figure 32B:
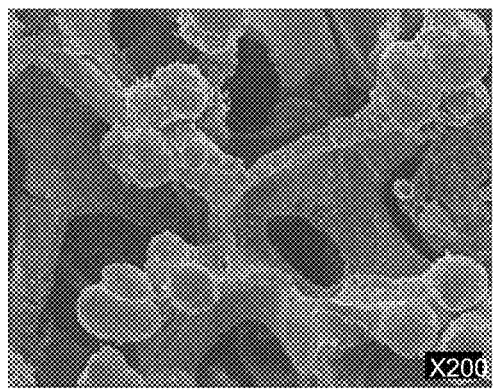
Figure 32C:
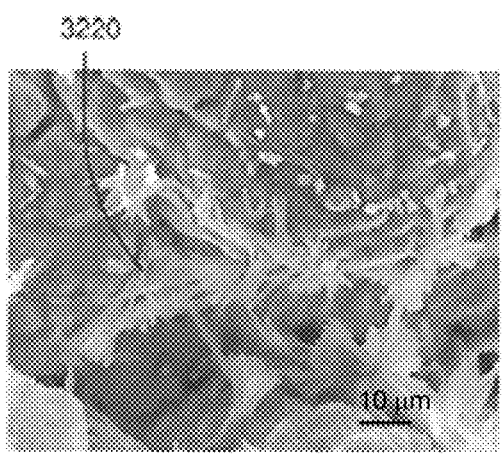
Figure 32D:
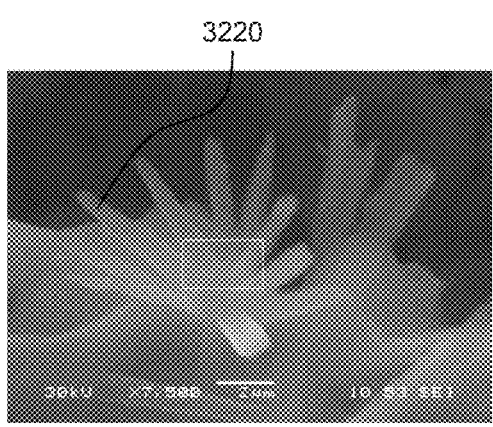

In one example embodiment, as shown in FIGS. 26A-27B, the ECD substrate includes graphite powder 2615*b*, 2715*b*. The graphite powder is physically associated with the porous Cu substrate/scaffold structure 2615*a*, 2715*a*, forming a graphite powder coating on at least one surface of the Cu structure, and discrete Si nanostructures are formed on the graphite particles according to one or more direct ECD methods of the present invention. In this example, the graphite powder was deposited without a binder material, although one or more binder materials can be included to adhere the graphite particles to one another or to the Cu substrate. An example of a porous Cu substrate/scaffold structure is shown in the optical microscope image of FIG. 28 which shows the porous Cu material before the addition of graphite or other materials. FIGS. 26A-27B include photographs of the resulting LIB anode composite structure 2650, 2750 comprising a porous Cu current collector, a graphite powder active material, and Si active material nanostructures on the graphite powder particles. FIGS. 30A-30D and 31A-31D show SEM photos of Si active material nanostructures 3020, 3120 deposited directly on the graphite particles disposed within the porous Cu substrate scaffold. During the direct ECD process of this example embodiment, the graphite powder substrate was disposed between two surfaces of a porous Cu mesh electrode structure. FIGS. 30A-30D show the Si-coated graphite particles which were disposed in the middle of the composite, while FIGS. 31A-31D show the Si-coated graphite particles which were disposed toward the outer surface of the composite (i.e., closer to the porous Cu substrate scaffold). Heavier Si deposition was achieved on the graphite particles on the outer region of the composite, as shown in FIGS. 31A-31D.

As can be seen in FIGS. 29 and 32A-32D, LIB active material nanostructures 3220 comprising Si were electrochemically deposited directly onto the porous graphite structure according to one or more ECD methods of the present invention. The ECD process of this example embodiment is described in further detail below.

Figure 33:
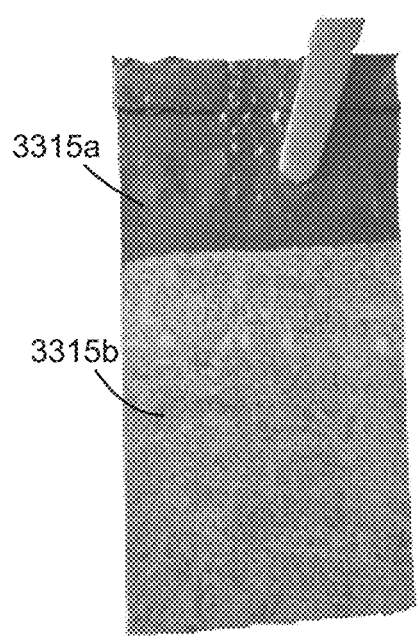
FIG. 33 shows a Cu substrate material electrochemically deposited on a graphite foil substrate structure.
Figure 34:
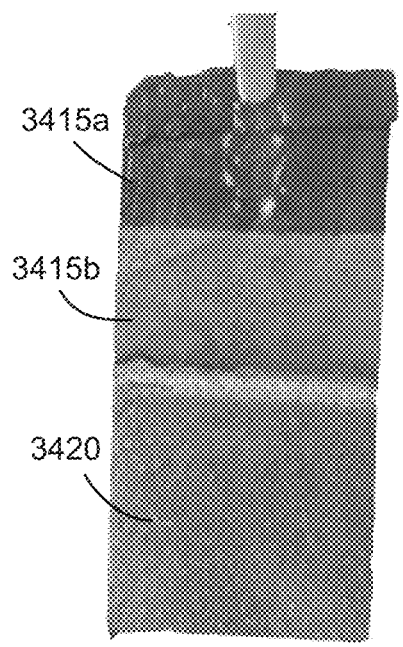
FIGS. 34 and 35 show the Cu-graphite substrate of FIG. 33 after deposition of Si nanostructures thereon using one or more ECD processes of the present invention.
Figure 35:
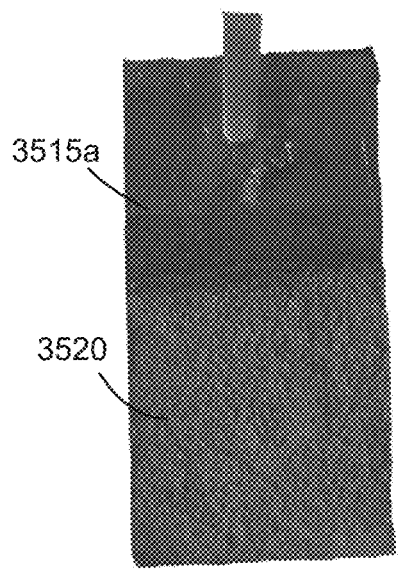
Figure 36A:
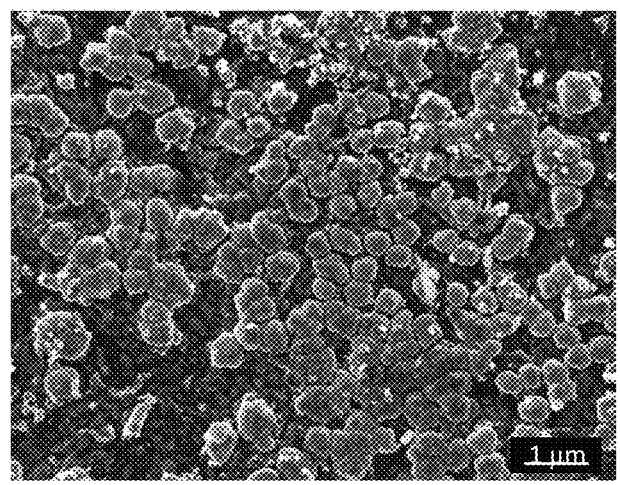
FIGS. 36A-36C show SEM images of the Si nanostructures formed on the Cu-graphite substrate shown in FIG. 34.
Figure 36B:
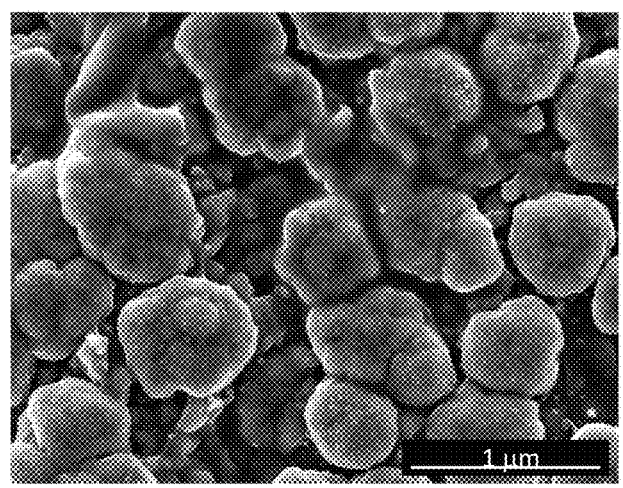
Figure 36C:
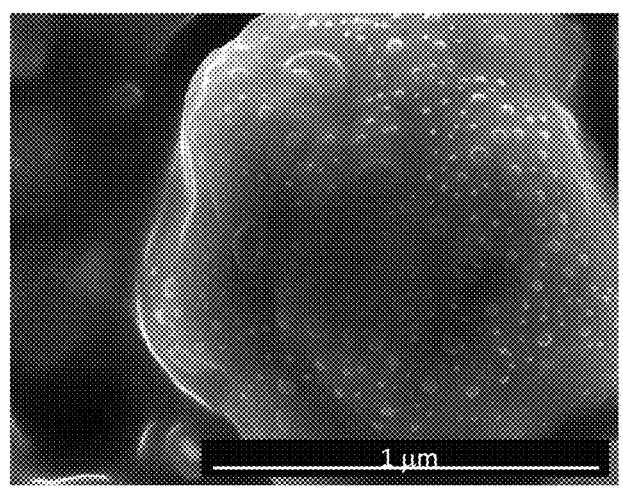
Figure 37A:
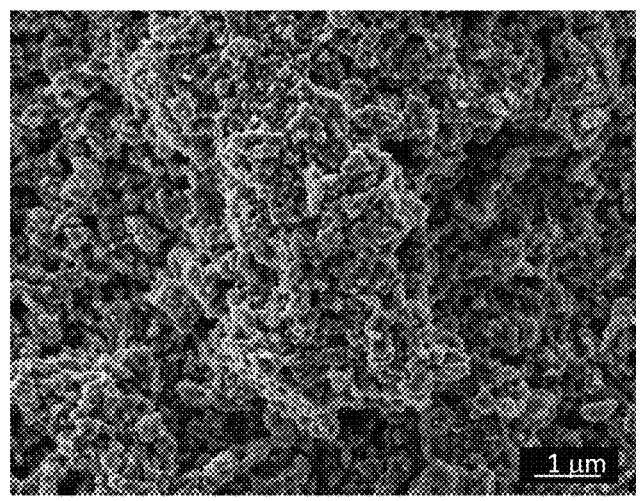
FIGS. 37A-37C show SEM images of the Si nanostructures formed on the Cu-graphite substrate shown in FIG. 35.
Figure 37B:
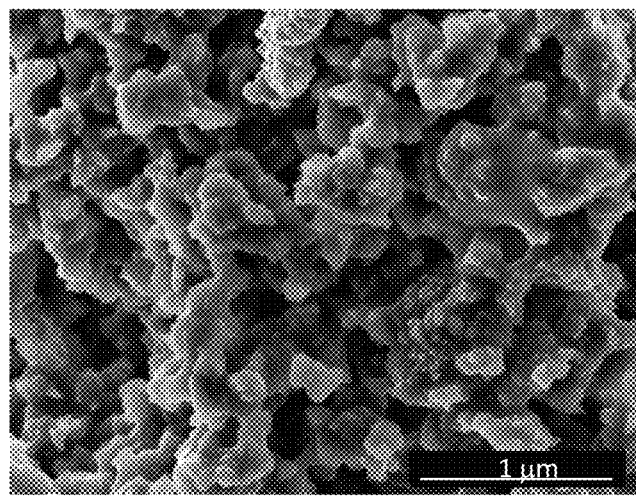
Figure 37C:
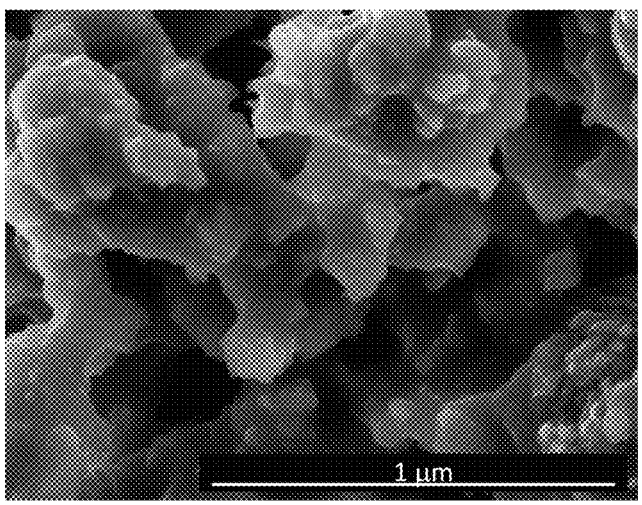

In yet another embodiment, as shown in FIG. 33, a Cu substrate material 3315*b* is coated on a graphite foil substrate structure 3315*a* to create a composite graphite foil-Cu substrate for ECD of one or more active material nanostructures thereon. The Cu can be coated directly on the graphite foil using conventional metal coating techniques such as ECD or evaporation. FIG. 33 shows the Cu-coated graphite foil substrate prior to Si deposition, and FIGS. 34 and 35 show two different samples of substrates similar to the substrate shown in FIG. 33, with Si nanostructures formed thereon using one or more ECD processes of the present invention. Upon formation of a LIB anode, the graphite foil 3315*a* and Cu coating 3315*b* can be used as current collector materials in a LIB, and the Si nanostructures can be used as the active materials in a LIB. The graphite foil can also contribute to the active material of the LIB. FIGS. 36A-36C show SEM photos of the Si-coated Cu of the structure shown in FIG. 34, and FIGS. 37A-37C show SEM photos of the Si-coated Cu of the structure shown in FIG. 35. The ECD process of this example embodiment is described in further detail below.

Multi-Material or Multi-Structure Substrates

In one general class of preferred embodiments of the present invention, a LIB anode comprises a multi-component or multi-material substrate having high-capacity active material nanostructures, e.g. Si nanostructures, formed on one or more of the multiple substrate components and/or materials.

In one class of embodiments, the LIB active materials are electrochemically deposited onto a first substrate, wherein the first substrate is physically associated with a second substrate, wherein the first substrate and the second substrate have comprise one or more different materials, shapes, sizes, morphologies, or other characteristics. The nanostructures can be electrochemically deposited on the first substrate before the first and second substrates are physically associated with one another, as well as afterward or simultaneously. A LIB anode component can be formed, wherein the anode component comprises the second substrate, the first substrate, and the active material nanostructures formed on the first substrate.

In another class of embodiments, the LIB active materials are electrochemically deposited onto a substrate, wherein the substrate comprises a first substrate component and a second substrate component, wherein the first and second components comprise one or more different materials, shapes, sizes, morphologies, or other characteristics. The active material nanostructures can be electrochemically deposited onto the first material only, the second material only, or both the first and the second material. A LIB anode component can be formed, wherein the anode component comprises the composite substrate and the active material nanostructures formed thereon.

Figure 38A:
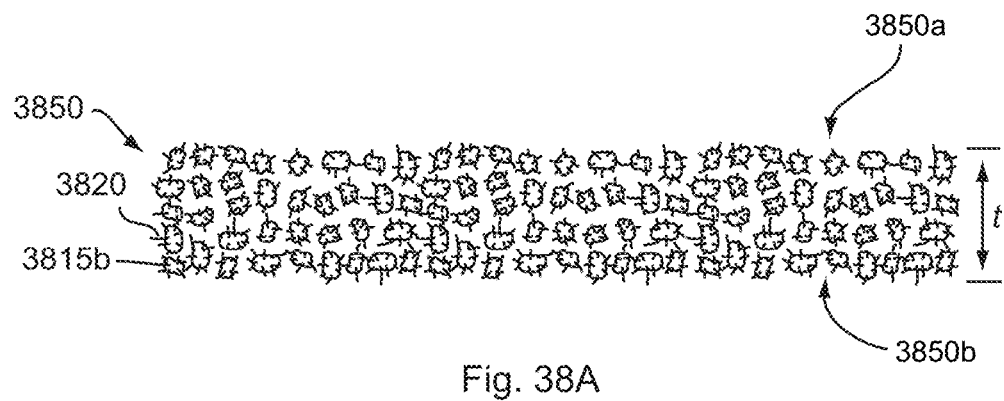
FIGS. 38A-38C show LIB anode composite structures comprising particle and/or layer substrate structures.
Figure 38B:
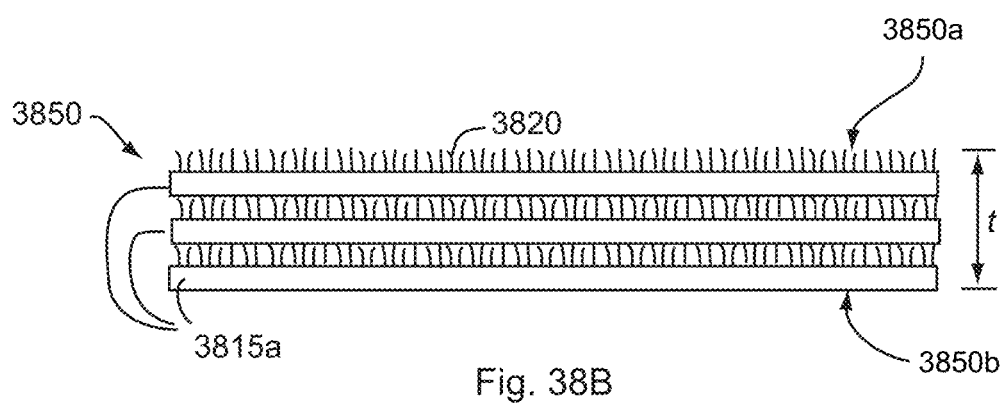
Figure 38C:
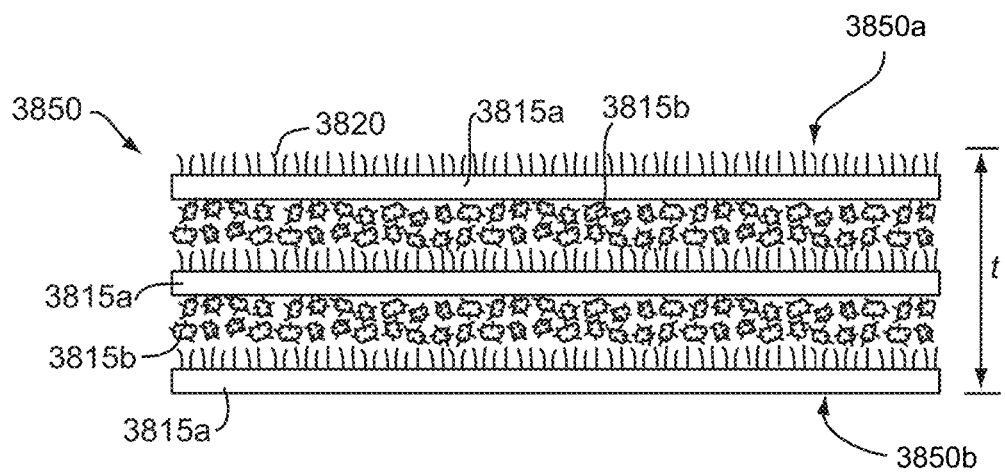

In another class of embodiments, active material nanostructures are electrochemically deposited on a plurality of substrates or a plurality of substrate layers to form a three-dimensional LIB anode composite structure. The plurality of substrates, or the plurality of substrate layers, and the active material nanostructures electrochemically deposited thereon are combined to form a three-dimensional LIB anode structure which includes a mixture of the substrates and the active material nanostructures throughout a majority of the LIB anode thickness, t. The substrates can be electrochemically deposited on the substrates before the plurality of substrates are combined, as well as afterward or simultaneously. By way of example only, the plurality of substrates can include a plurality of particle substrates, a plurality of fiber substrates, a plurality of flake substrates, a plurality of planar substrate layers, at least one planar substrate layer and a plurality of particles, graphite particles, one or more graphite foil layers, one or more Cu film layers, one or more porous Cu structures, one or more carbon sheets or foils, or a combination thereof. As shown in the example embodiment of FIG. 38A, the substrates include a plurality of particles 3815$b$ having active material nanostructures 3820 formed thereon. Preferably, the particles comprise graphite particles. The anode structure can have a porosity which decreases from the top 3850$a$ to the bottom 3850$b$ of the anode structure, thereby allowing for uniform flow of the LIB electrolyte throughout the thickness, t, of the LIB anode structure. For example, the size of the graphite particles 3815$b$ can decrease from top 3850$a$ to bottom 3850$b$ of the anode structure, and/or the particles 3815$b$ can be more closely packed toward the bottom 3850$b$ of the anode structure. As shown in the example embodiment of FIG. 38B, the LIB composite anode structure comprises a plurality of substrate layers 3815$a$ having active material nanostructures 3820 electrochemically deposited on one or more surfaces of each layer. The bottom substrate layer can be a solid conductive film or a porous structure. Preferably, the top substrate layers 3815$a$ each comprise a porous substrate layer. In one embodiment, the porosity of the layers 3815$a$ decreases from the top 3850$a$ of the anode structure to the bottom 3850$b$ of the anode structure—i.e., each of the top layers is more porous than the underlying substrate layers. As shown in FIG. 38C, the LIB composite anode structure comprises at least one layer plurality of graphite particle substrates 3815$b$ disposed between substrate layers 3815, wherein each of the particles 3815$b$ and layers 3815$a$ comprise active material nanostructures formed thereon. One or more of the layers 3815$a$ can comprise a porous structure. The porosity of the composite can decrease from top 3850$a$ to bottom 3850$b$ of the anode structure.

In preferred embodiments, the ECD substrate has an overall thickness of about 500 µm or less, 500 µm or less, about 300 µm or less, 300 µm or less, about 100 µm or less, preferably 100 µm or less or less than 100 µm. Most preferably, substrate has a thickness of about 5-300 µm, most preferably about 5-100 µm. In preferred embodiments, the substrate and active material nanostructures formed thereon comprise a composite LIB anode structure. Preferably, the composite LIB anode structure is thin enough to allow for easy and proper formation into a LIB device, e.g., a cylindrical LIB cell structures. Most preferably, the composite LIB anode structure, including the substrate and the active material nanostructures formed directly thereon, has an overall thickness of 100 µm or less, preferably less than 100 µm.

Substrate Surface Modification and Surface Features

The substrate surface can include one or more surface modifications to allow for control over the deposition of one or more materials during the ECD process, as well as control over the resulting characteristics of the electrochemically deposited nanostructures comprising at least one LIB active material. The ECD substrate surface modification can be achieved by modification of one or more physical or chemical characteristics of the substrate surface, e.g., the physical structure or chemical composition of the substrate surface. The physical or chemical characteristics of the substrate surface can be modified by one or more mechanical, chemical, electrical, or temperature-based surface modification techniques, as well as additional surface modification techniques available in the art. Modification of the substrate surface can be achieved by etching (e.g., chemical, mechanical, laser, or micro-etching), scratching, grinding, roughening, laser ablation, heat treatment, annealing, chemical treatment (e.g., acid treatment, gas treatment, foaming gas treatment, alloying, or doping) deposition of one or more materials on the substrate surface (e.g., by coating, chemical binding, adsorption, binder material adhesion, lithography, sputtering, ECD or CVD, evaporation, or electroless deposition), or other modification techniques available in the art, as well as combinations thereof. In preferred embodiments, the substrate surface is modified to create discrete spatial regions on the substrate surface which have one or more distinguishing characteristics compared to other regions of the substrate. Preferably, the discrete regions cause a difference in surface charge at the regions compared to other regions of the substrate, e.g., an opposite charge, increased charge, or decreased charge.

In one general class of embodiments, one or more discrete surface features, e.g., protrusions, can be formed on the substrate surface to allow for a rough substrate surface having increased activation energy at the discrete protrusions or other discrete surface features. In one aspect of the present invention, the protrusions at the substrate surface increase the flow of electrons through the substrate at the location of the protrusions compared to nearby locations on the substrate surface. In preferred embodiments, the counter electrode includes a uniform or substantially uniform structure, whereby the protrusions or other surface features have a decreased distance to the counter-electrode compared to nearby locations on the substrate which do not include a surface protrusion. Thus, the substrate surface features or protrusions can provide discrete, localized active sites for direct ECD of discrete active material nanostructures on the substrate. Add language to account for the mechanisms at work here. As will be understood by persons of ordinary skill in the art, the size, shape, morphology, pattern, and other characteristics of the discrete substrate surface regions and surface features can be adjusted to control the size, shape, morphology, and other characteristics of the nanostructures formed on the substrate surface. In preferred embodiments, the discrete surface regions have a height and/or width of 1 µm or less; more preferably 500 nm or less, 400 nm or less, or 300 nm or less; more preferably 250 nm or less, 200 nm or less, or 150 nm or less; most preferably 100 or less, 75 nm or less, 50 nm or less, 25 nm or less, 20 nm or less, 15 nm or less, or 10 nm or less. Preferably, the discrete surface regions having modified surface characteristics are separated from one another by a distance of at least 10 nm and less than 1 µm, e.g., the surface regions can be 10-750 nm apart, 10-500 nm apart, 10-250 nm apart, 10-100 nm apart, 10-75 nm apart, 10-50 nm apart, 10-20 nm apart, 20-750 nm apart, 20-500 nm apart, 20-250 nm apart, 20-100 nm apart, 20-75 nm apart, 20-50 nm apart, 50-750 nm apart, 50-500 nm apart, 50-250 nm apart, 50-200 nm apart, 50-150 nm apart, 50-100 nm apart, 75-250 nm apart, 75-200 nm apart, 75-150 nm apart, 75-100 nm apart, 100-500 nm apart, 100-250 nm apart, 100-200 nm apart, 150-250 nm apart, 150-200 nm apart, more preferably about 100 nm apart, about 75 nm apart, about 50 nm apart, about 25 nm apart, or about 20 nm apart. Most preferably, the distance between the center points of each surface region is about two times the width of the discrete surface regions.

Figure 39A:
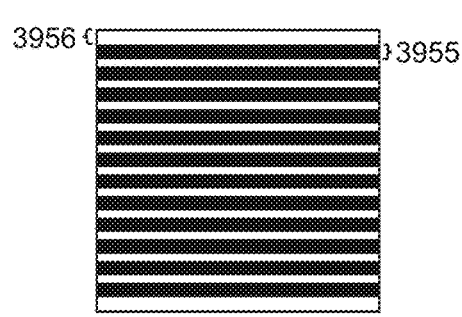
FIGS. 39A-39F show ECD substrate structures having one or more regions comprising surface features.
Figure 39B:
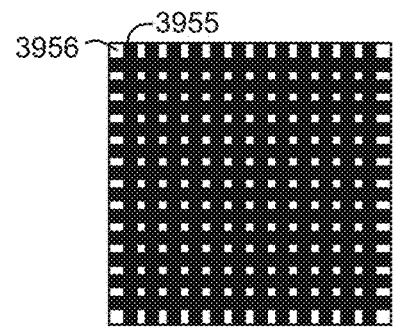
Figure 39C:
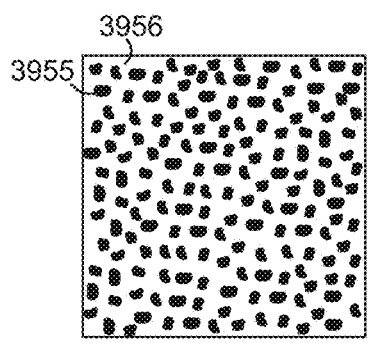
Figure 39D:
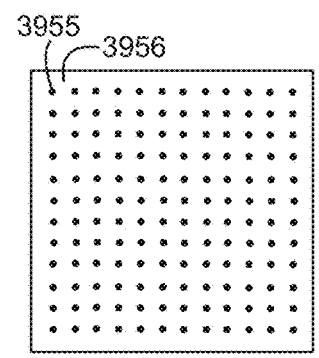
Figure 39E:
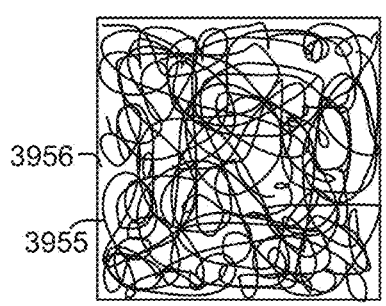
Figure 39F:
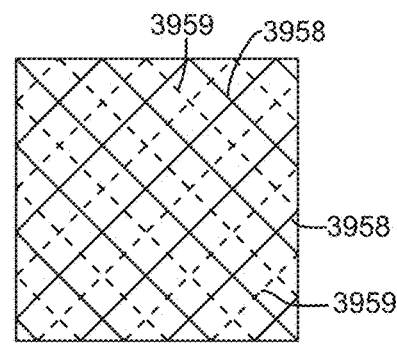
Figure 40A:
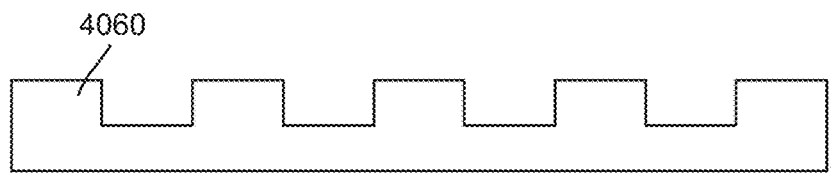
FIGS. 40A-40G, 41A-41I, and 42A-42C show substrate structures comprising various surface features with discrete active material nanostructures formed thereon.
Figure 40B:
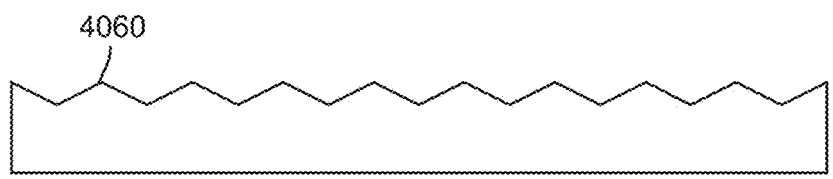
Figure 40C:
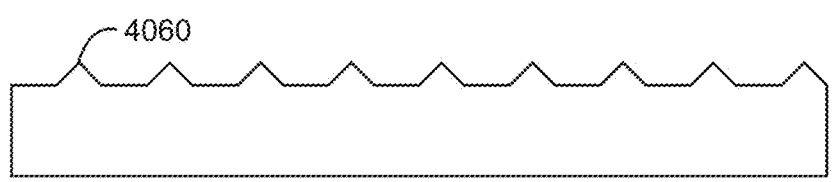
Figure 40D:
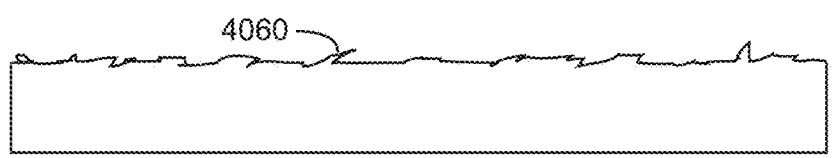
Figure 40E:
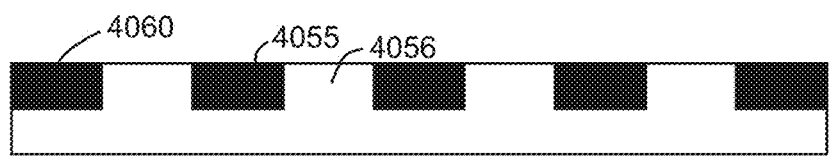
Figure 40F:
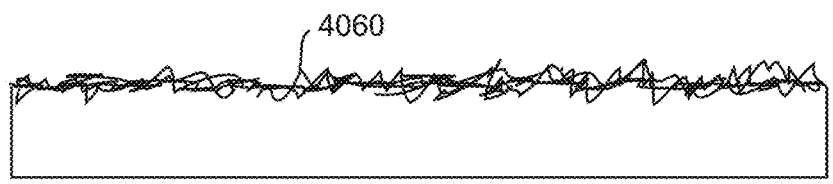
Figure 40G:
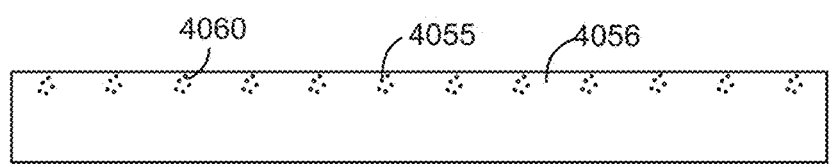

As shown in the example embodiments of FIGS. 39A-39F, showing top views of example substrate surfaces, and FIGS. 40A-E, showing cross-sectional views of various example substrate surfaces, the ECD substrate surface can include one or more first regions 3955 comprising at least one surface modification, e.g., protrusions or other surface features or modifications, and one or more second regions 3956, wherein the one or more second regions 3956 do not include the surface features or include the surface features to a lesser extent than the one or more first regions 3955. Substrate surfaces having more than two classes of surface modification regions are also included in the present invention. As shown in FIGS. 39A, 39B, 39E, and 40A-40C, the first regions 3955 and second regions 3956 are formed by one or more notches or trenches. The notches or trenches can have any shape or pattern, including a rectangular shape as shown in FIGS. 39A, 39B, and 40A, or a prism, angled, or v-shape as shown in FIGS. 39E, 40B, and 40C. As shown in FIG. 39F, the protrusions 3960 are high points on the substrate surface formed by v-shaped trenches comprising peaks 3958 and valleys 3959. The surface features or protrusions can have any suitable shape, including domes, humps, rounded features, spikes, wires, pyramids, cones, v-shaped features, or square- or rectangular-shaped features, as well as combinations thereof. As shown in the example embodiments of FIGS. 39D and 39E, the first and second surface regions can be formed by a scratching, etching, or roughening substrate surface. As shown in the example embodiments of FIGS. 39C, 39E, 40D, and 40F, the first and second regions can have a random pattern on the substrate surface. As shown in the example embodiments of FIGS. 39A, 39C, 39D, 39F, 40A-C, 40F, and 40G, the first and second regions can have an orderly or repeating pattern on the substrate surface. In certain embodiments, e.g., as shown in FIGS. 40E and 40G, the first and regions can be defined by a difference in the chemical composition or other surface material properties. For example, the discrete surface features 4060 can be formed by doping, heat treating, chemical treating, or otherwise modifying the substrate material in discrete locations on the substrate surface. As will be understood by persons of ordinary skill in the art, the size, shape, morphology, pattern, and other characteristics of the discrete substrate surface protrusions can be adjusted to control the size, shape, morphology, and other characteristics of the nanostructures formed on the substrate surface.

In one example embodiment, one or more active materials, one or more inactive materials, and/or one or more conductive materials can be formed or deposited on the substrate via any suitable methods available in the art, e.g., by coating, chemical binding, adsorption, adhesion, binder material adhesion, lithography, sputtering, ECD, CVD, evaporation, electroless deposition, or other material deposition techniques available in the art or mentioned herein, or a combinations thereof.

Figure 41A:
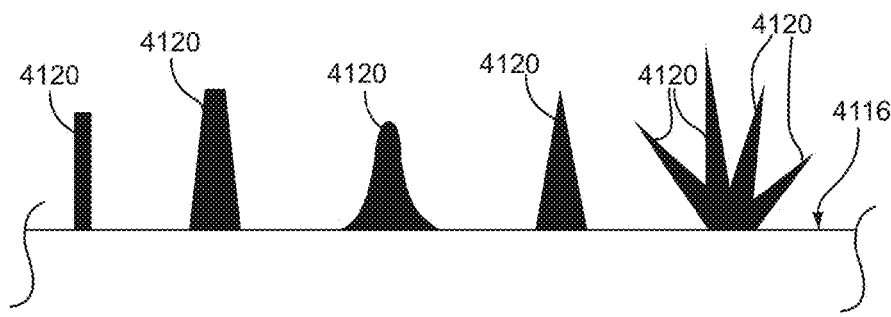
Figure 41B:
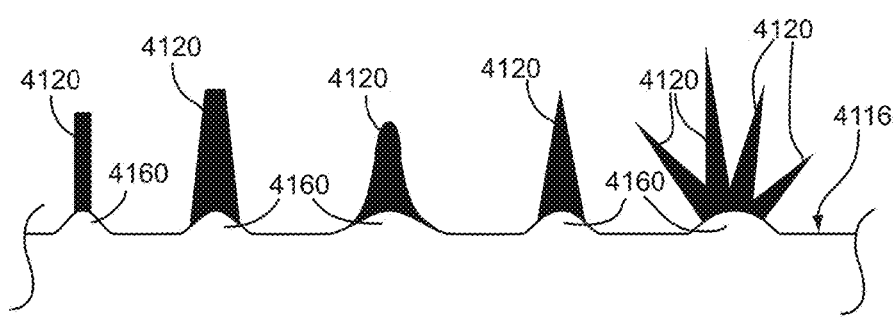
Figure 41C:
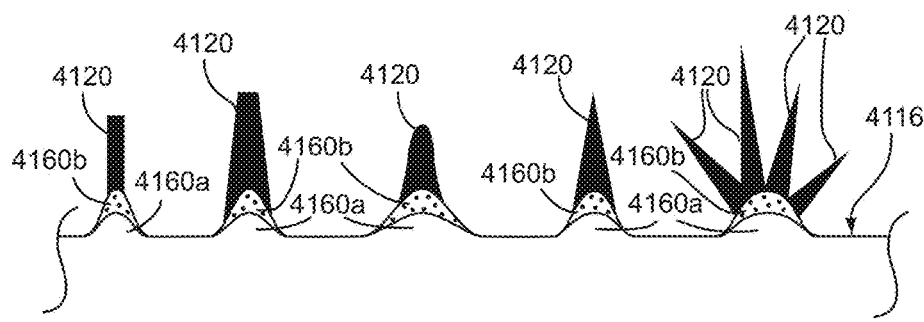

The nanostructures comprising at least one active material are directly deposited via ECD onto at least one surface of the ECD substrate surface 4116. In certain embodiments, as shown in the example embodiment of FIG. 41A, the ECD substrate surface can comprise a smooth surface, whereby the nanostructures 4120 (e.g., nanowires, tapered nanowires, dome-shaped or hump-shaped nanostructures, nanospikes, or clusters of nanospikes) are formed on the smooth substrate surface 4116. In preferred embodiments, the ECD substrate surface is a rough surface rather than a smooth surface. In preferred embodiments, the one or more ECD substrate structures comprises at least one surface having one or more surface features or protrusions. As shown in the example embodiment of FIG. 41B, the substrate comprises one or more surface features or protrusions 4160, and the nanostructures 4120 are formed directly on the surface features 4160. Preferably, at least a portion of the nanostructures are formed on protrusions or surface features. More than one nanostructure can be formed on each surface feature or protrusion. The surface protrusions 4160 can comprise the same material or structure as the substrate. Additionally or alternatively, the substrate can comprise a first material, and the surface protrusions 4160 can comprise a second material which is different from the first material. In another example embodiment, shown in FIG. 41C, the substrate includes first surface features or protrusions 4160a comprising the substrate material and second surface features or protrusions 4160b comprising a second material which is different than the substrate material. At least a portion of the second surface features or protrusions 4160 are formed directly over the first protrusions 4160a, thereby forming surface protrusion 4160 having an increased size or height compared to either the first or second features alone. The nanostructures 4120 are formed directly on or over at least a portion of the stacked first and second surface protrusions 4160b.

Figure 41D:
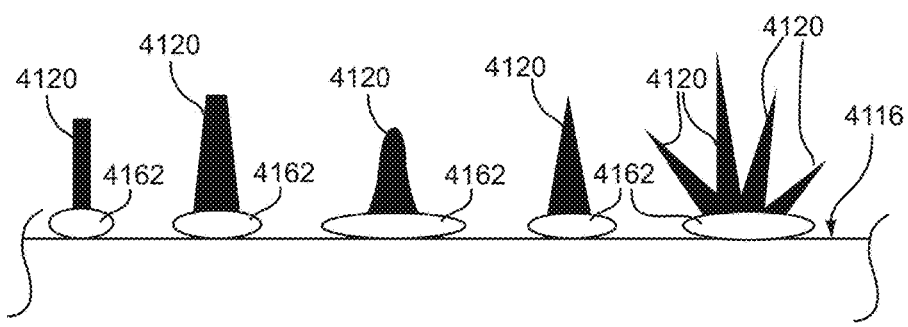
Figure 41E:
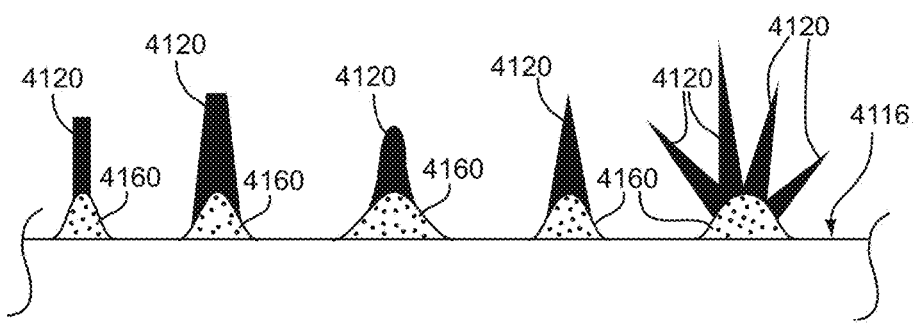
Figure 41F:
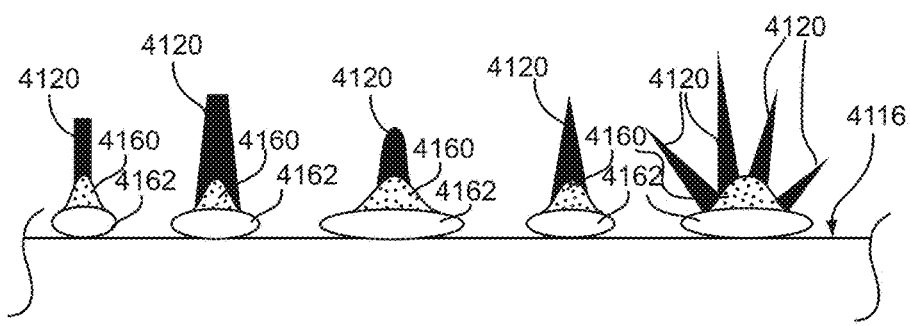
Figure 41G:
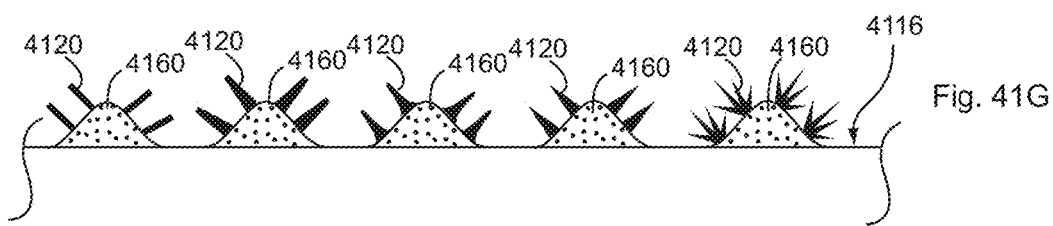
Figure 41H:
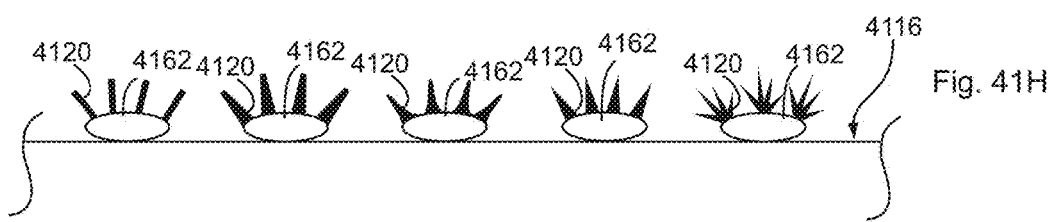

As shown in the example embodiments of FIGS. 41E-41F, the surface features can comprise at least a second material which is different than a first substrate material. These embodiments are preferred where the underlying substrate surface is relatively smooth. The surface features or protrusions comprising the second material can provide increased roughness of the substrate surface, increased conductivity at the surface feature locations, or other characteristics which will be appreciated by persons of ordinary skill in the art. As shown in FIG. 41D, the surface features include particles 4162 formed on the underlying substrate surface 4116, whereby one or more nanostructures 4120 are formed on the surface feature particles 4162. In one embodiment, the surface features comprise graphite particles are formed on the substrate surface 4116. The particles can include other materials, e.g., conductive materials, copper particles, or carbon particles. As shown in FIG. 41E, the surface features include one or more dome-shaped or hump-shaped features 4060, whereby one or more nanostructures 4120 are formed on the surface humps or domes 4160. Additional surface feature shapes are included in the invention, e.g., spikes, rounded features, wire-like features, spheres, or other feature shapes. In one embodiment, the surface features comprise copper formed on the substrate surface 4116. In one example embodiment, Cu is electrochemically deposited onto the underlying substrate surface to form the features 4160. Additional material deposition or formation techniques can be used, including techniques described herein. The features 4160 can include other materials, e.g., one or more conductive materials, one or more metals, metal alloys, conductive polymers, one or more binder materials, or other materials. In yet another example embodiment, as depicted in FIG. 41F, the surface features or protrusions include one or more particles 4162 comprising a first material deposited on the substrate surface 4116 and one or more protrusions 4160 including a second material formed on the particles 4162. The one or more nanostructures 4120 are formed on the second material. In one example embodiment, graphite particles are deposited on the substrate surface 4116, and protrusions comprising a conductive material, e.g., Cu, are formed on the graphite particles. In another embodiment (not shown), the particles can be formed on the protrusions formed on the substrate surface. As shown in the example embodiments of FIGS.

Figure 41I:
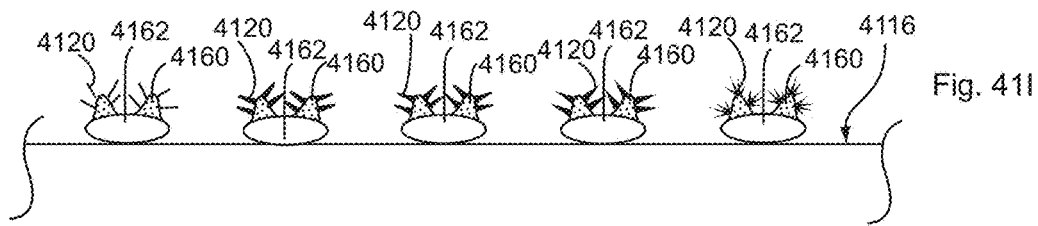

41G-41I, multiple nanostructures 4120 can be formed on each surface feature 4160. As shown in FIG. 41I, multiple protrusions 4160 can be formed on each particle 4162 which is deposited on the substrate surface 4116, and multiple nanostructures 4120 can be formed on the multiple protrusions 4160. In another embodiment (not shown), multiple particles can be formed on each protrusion formed on the substrate surface.

Figure 42A:
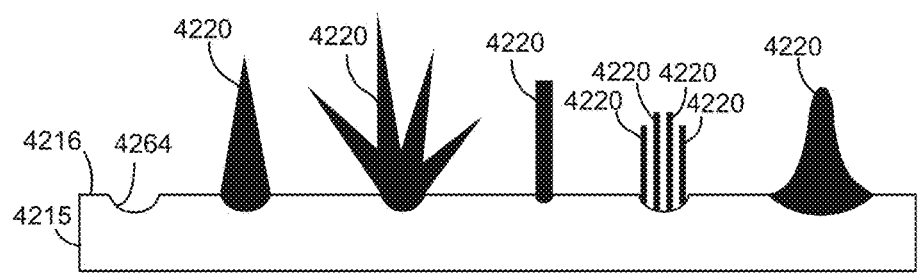
Figure 42B:
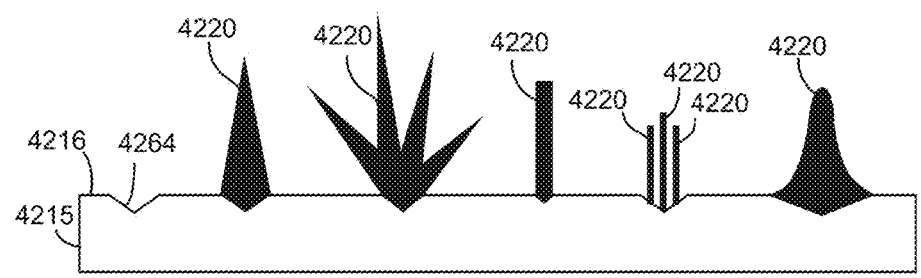
Figure 42C:
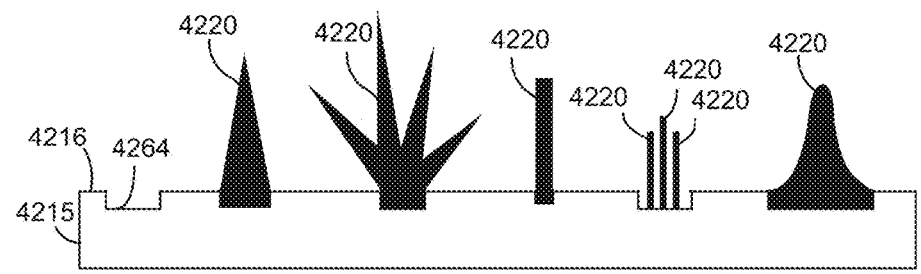

In another general class of embodiments, as shown in FIGS. 42A-42C, the substrate surface features can include trenches or indentations 4264 having one or more nanostructures 4220 formed therein. The distinct regions of the substrate surface are defined by the indentations 4264 which can include a variety of shapes, as shown in FIGS. 42A-42C. The nanostructures 4220 comprising at least one active material are formed directly in or over the trenches/indentations 4264.

Figure 43A:
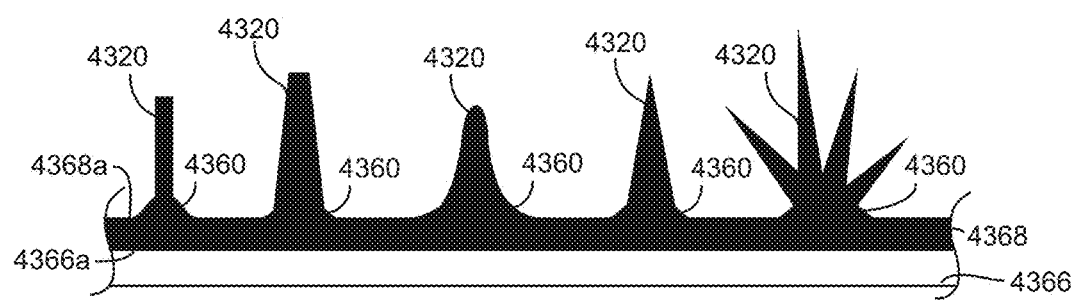
FIGS. 43A-43F show various multi-layer substrates comprising surface features and discrete active material nanostructures formed thereon.
Figure 43B:
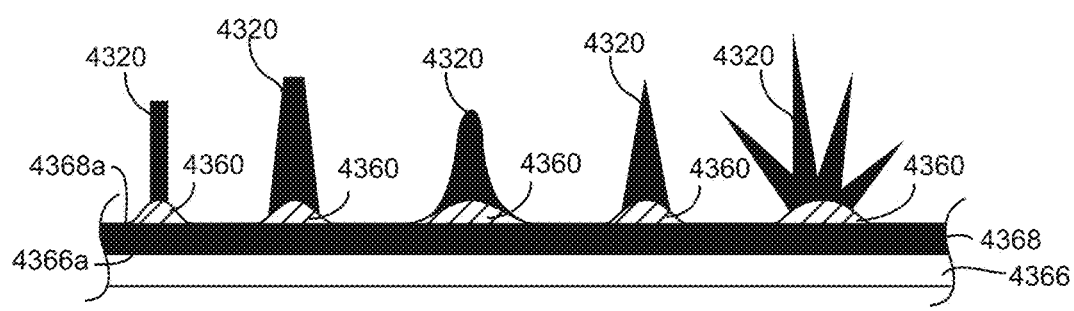
Figure 43C:
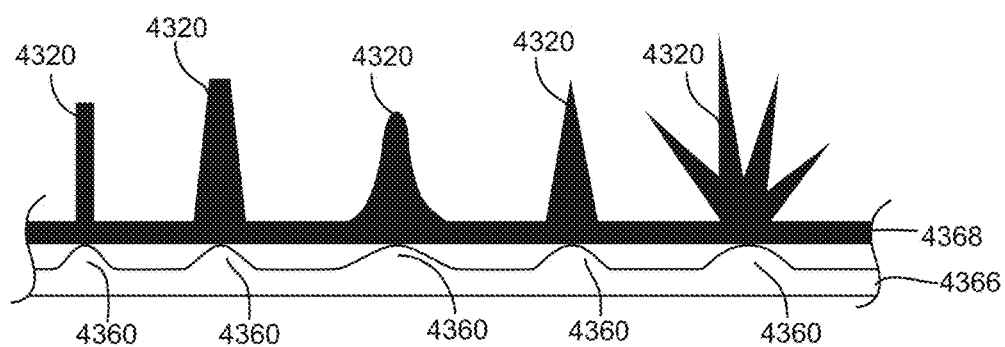
Figure 43D:
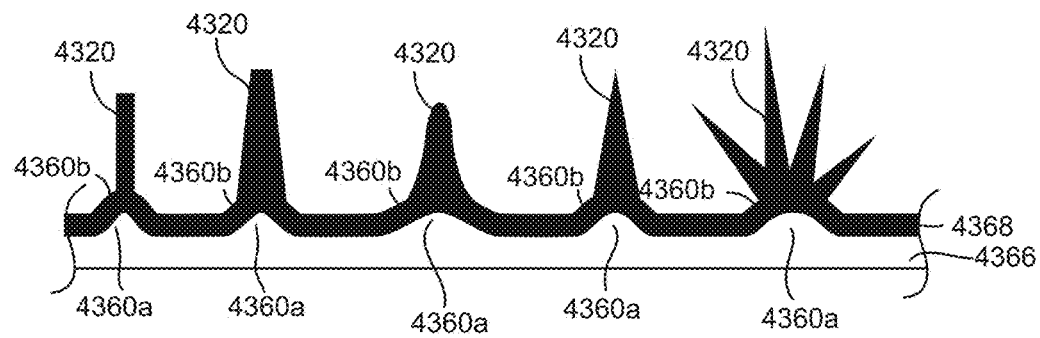
Figure 43E:
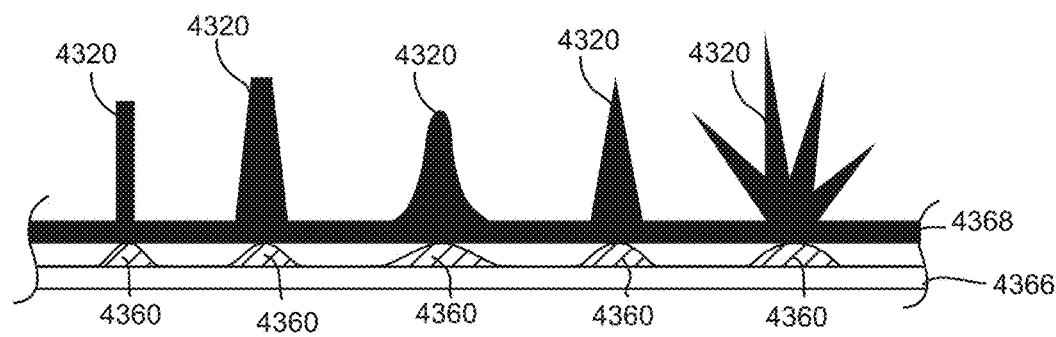
Figure 43F:
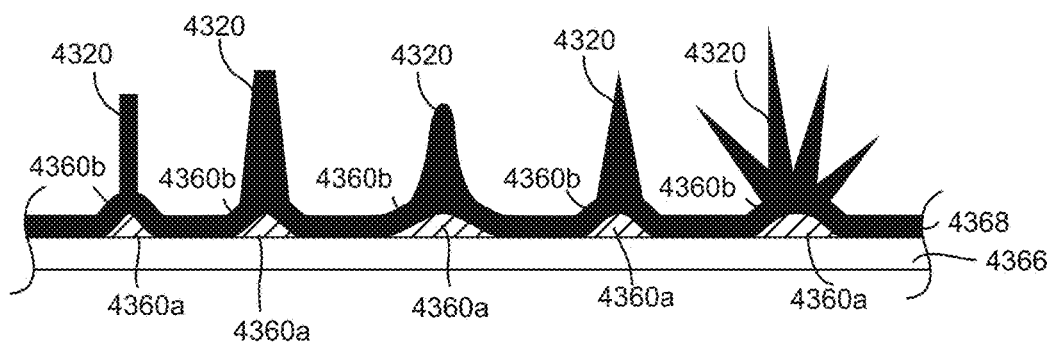

In another general class of embodiments, the substrate includes multiple layers, wherein one or more of the substrate layers comprises discrete surface features, e.g., protrusions, as shown in FIGS. 43A-G. As shown in the figures, each LIB composite anode structure includes a first substrate layer 4366, at least a second substrate layer 4368, surface protrusions 4160 on the first layer 4366 and/or the second layer 4368, and at least one active material nanostructure 4320 formed over the protrusions 4160. Two or more of the substrate layers can comprise different materials or include other distinguishing characteristics. In certain embodiments, as shown in FIGS. 43A, 43C, and 43D, the protrusions or other surface features are formed by the substrate layer itself—i.e., the substrate layer and the protrusions are integral features of the same material structure or layer. In other embodiments, as shown in FIGS. 43B, 43E, and 43F, the protrusions or other surface features are formed on one or more of the layers by depositing or physically associating one or more structures with the substrate layer to form the protrusions, wherein the structures are distinct from the substrate layer. Preferably, the structures comprise a material which is different than the substrate material of the substrate on which the structures are formed. As shown in FIGS. 43A-43G, the substrate can comprise a first layer 4366 comprising a first material and at least a second layer 4368 comprising a second material formed over the first layer 4366 on the top surface of the first layer 4366. The first and second materials can be the same material or different materials. Preferably, the first and second materials comprise different materials, different morphologies, or at least one distinguishing characteristic.

As shown in FIG. 43A, the top surface 4366a of the first layer 4366 is substantially smooth or flat, the second layer 4368 comprises protrusions 4360 on the top surface 4368a of the second layer 4368, wherein the protrusions 4160 are an integral part of the second layer 4368, and the active material nanostructures 4320 are formed on the protrusions 4360 by direct ECD, whereby the nanostructures 4320 are in direct physical contact with the protrusions 4360 and extend outward from the second layer 4368 and the protrusions 4360. As shown in FIG. 43B, the top surface 4366a of the first layer 4366 and the top surface 4368a of the second layer 4368 are substantially smooth or flat, the second layer 4368 comprises protrusions 4360 formed on the top surface 4366a of the second layer 4368, and the active material nanostructures 4320 are formed on the protrusions 4360 by direct ECD, whereby the nanostructures 4320 are in direct physical contact with the protrusions 4360 and extend outward from the protrusions 4360 and the second layer 4368. As shown in FIG. 43C, the top surface 4366a of the first layer 4366 comprises protrusions 4360 which are an integral part of the first layer 4366, the top surface 4368a of the second layer 4368 is substantially smooth or flat, and the active material nanostructures 4320 are formed via direct ECD on the top surface 4368a of the second layer 4368 directly above the protrusions 4360, whereby the nanostructures 4320 are in physically separated from the protrusions 4360 by the second substrate 4368, and the nanostructures 4320 extend outward from the top surface 4368a of the second substrate layer 4368. In the embodiment shown in FIG. 43D, the LIB anode structure is substantially the same as the embodiment shown in FIG. 43C, except that the second substrate 4368 conforms to the shape of the first substrate 4366 including the protrusions 4360a, whereby the second substrate 4368 consequently comprises protrusions 4360b which are an integral part of the second substrate 4368, and the nanostructures are formed over the first protrusions 4360a and the second protrusions 4360b. In the embodiment shown in FIG. 43E, the LIB anode structure is substantially the same as the embodiment shown in FIG. 43C, except that the protrusions 4360 are distinct structures from the first substrate 4366 rather than being formed from the first substrate structure itself. In the embodiment shown in FIG. 43F, the LIB anode structure is substantially the same as the embodiment shown in FIG. 43F, except that the protrusions 4360 are distinct structures from the first substrate 215 rather than being formed from the first substrate structure itself In preferred embodiments, the one or more surface features comprise at least one conductive material and/or at least one active material. For example, the surface features can include a current collector material such as Cu and/or an active material such as graphite. As will be understood by persons of ordinary skill in the art, the size, shape, morphology, materials, pattern, and other characteristics of the surface features can be adjusted to control the size, shape, morphology, and other characteristics of the nanostructures formed thereon. The surface features or protrusions can have any suitable shape, including domes, humps, rounded features, spikes, wires, pyramids, cones, angled features, v-shaped features, or square- or rectangular-shaped features, as well as combinations thereof. In preferred embodiments, the discrete surface protrusions have a height and/or width of 1 µm or less; more preferably 500 nm or less, 400 nm or less, or 300 nm or less; more preferably 250 nm or less, 200 nm or less, or 150 nm or less; most preferably 100 nm or less, 75 nm or less, 50 nm or less, 25 nm or less, 20 nm or less, 15 nm or less, or 10 nm or less. Preferably, the discrete surface protrusions having modified surface characteristics are separated from one another by a distance of at least 10 nm and less than 1 µm, e.g., the surface regions can be 10-750 nm apart, 10-500 nm apart, 10-250 nm apart, 10-100 nm apart, 10-75 nm apart, 10-50 nm apart, 10-20 nm apart, 20-750 nm apart, 20-500 nm apart, 20-250 nm apart, 20-100 nm apart, 20-75 nm apart, 20-50 nm apart, 50-750 nm apart, 50-500 nm apart, 50-250 nm apart, 50-200 nm apart, 50-150 nm apart, 50-100 nm apart, 75-250 nm apart, 75-200 nm apart, 75-150 nm apart, 75-100 nm apart, 100-500 nm apart, 100-250 nm apart, 100-200 nm apart, 150-250 nm apart, 150-200 nm apart, more preferably about 100 nm apart, about 75 nm apart, about 50 nm apart, about 25 nm apart, or about 20 nm apart. Most preferably, the distance between the peaks or high points of each protrusion is about two times the width of the discrete surface protrusions.

Alternatively, or in addition to the substrate surface modifications described above, one or more characteristics of the ECD substrate surface can be controlled or modified using one or more ECD process parameters or techniques of the present invention. For example, ECD process parameters such as the current, temperature, fluid motion, precursor concentration, or solution interaction with the substrate surface could be adjusted to have different values at the different regions of the substrate surface. These process conditions are explained in further detail below.

In preferred embodiments, the nanostructures comprising at least one LIB active material and the one or more substrate materials are formed into a LIB anode structure comprising the substrate-nanostructure composite. Using techniques available to those of ordinary skill in the art, including those mentioned herein or incorporated by reference herein, the substrate and the active material nanostructures formed thereon can be formed into a LIB anode, and the LIB anode can be formed into a LIB full cell or half cell for use as a rechargeable or single-use energy source.

In preferred embodiments, the anode composite structure includes a porous composite comprising one or more substrate materials and a plurality of nanostructures formed therein using one or more of the ECD methods described herein. Preferably, the substrate-active material nanostructure composite is a porous structure having a porosity of about 10-70%, 10-50%, 20-40%, or about 30%. Preferably, the anode current collector and active material composite is a planar structure. Preferably, the current collector and active material composite has a thickness of about 100 μm or less, preferably 100 μm or less, and most preferably less than 100 μm. In certain embodiments, the composite anode structure can have one or more properties which vary over different spatial regions of the composite. For example, the porosity, composition, or one or more other characteristics can very over different spatial regions of the composite anode structure.

Binders, Electrolytes, Electrolyte Additives, and Solid Electrolyte Interfaces

Due to the inherent differences between the material characteristics of standard LIB active materials and high capacity materials and nanostructures such as Si nanostructures, traditional LIB materials are not ideal for use with LIBs incorporating unconventional, high-capacity active materials such as Si. The present invention includes novel LIB materials including binder materials, electrolyte materials, electrolyte additive materials, and solid electrolyte interface (SEI) materials or layers formed on one or more battery components, as well as components, devices, and methods of manufacturing related thereto.

Binders

One aspect of the present invention relates to LIB materials including binders, as well as components, devices, and methods of manufacturing related thereto. Particularly, the present invention includes LIB electrolytes and LIB electrolyte additives suitable for use with LIBs comprising Si active materials or Si and graphite active materials, as well as related components, devices, and methods. In preferred embodiments, the present invention includes a LIB anode comprising one or more binder materials selected from the group consisting of carboxylmethyl cellulose (CMC), polyvinylidene fluoride (PVDF), poly(acrylamide-co-diallyldimethylammonium) (PAADAA), and polyacrylic acid (PAA), and styrene butadiene rubber (SBR).

In preferred embodiments, a LIB anode comprises Si nanostructures (e.g., Si nanowires) and at least one binder material comprising CMC, PVDF, PAADAA, PAA, SBR, or a combination thereof. In another preferred class of embodiments, a LIB anode comprises one or more graphite structures (e.g., graphite foil or graphite particles), a plurality of Si nanostructures formed on the one or more graphite structures (e.g., Si nanowires formed on graphite particles), and at least one binder material comprising CMC, PVDF, PAADAA, PAA, SBR, or a combination thereof.

In preferred embodiments, the binder is combined with a plurality of graphite particles to form a slurry, then the slurry is coated onto a substrate structure (e.g., graphite foil, carbon film, or porous carbon mesh), e.g., using traditional battery slurry coating methods. After evaporation of the slurry solvent, a plurality of discrete Si nanostructures are formed on the graphite particles using one or more ECD methods of the present invention.

In certain embodiments, a layer of one or more binder materials (e.g., CMC, PVDF, PAADAA, PAA, SBR, or a combination thereof) is added directly on a current collector substrate, and a binder-graphite particle composite or a binder-graphite particle-Si nanostructure composite is coated on the current collector substrate. For example, the composite can be coated on a Cu film or graphite foil current collector substrate.

In another class of embodiments, Si nanostructures are first formed on a substrate comprising a plurality of graphite particles, then the Si-graphite particle composite is combined with one or more binder materials including CMC, PVDF, PAADAA, PAA, SBR, or a combination thereof, to form a LIB anode. The graphite-Si-binder composite can be formed into a LIB anode, e.g., using traditional battery slurry coating techniques. In certain embodiments, the graphite-Si-binder composite is coated in a LIB current collector substrate (e.g., a Cu film or graphite foil structure) to form a LIB anode component.

The LIB anodes and LIBs of the present invention preferably include one or more binder materials including one or more of CMC, PVDF, PAA, SBR, and PAADAA. In preferred embodiments, the binder includes CMC, PAADAA, SBR, and/or PAA. For example, the LIB anode structure can include a plurality of graphite particles having Si nanostructures formed thereon, wherein the graphite particles are bound together using a CMC, PAADAA, SBR, and/or PAA binder material. Additionally, the graphite-Si-CMC binder composite can be formed on a current collector substrate (e.g., a planar Cu substrate) using one or more binder materials such as PAA. In one embodiment, the graphite-Si composite material is formed on a current collector, wherein one or more of a CMC, PVDF, PAA, and PAADAA binder material is disposed between the current collector structure and the graphite-Si active material composite, thereby improving the bond strength between the current collector and the graphite-Si composite material.

In preferred embodiments, PAA is disposed between a LIB current collector structure and the graphite powder-Si composite material, and the same binder material or one or more different binder materials is used to bind the graphite powder particles together. For example, CMC and/or PAADAA can be used to bind the graphite particles together in the Si-graphite powder composite structure, and PAA can be used as an interface binder material between the graphite powder-Si composite and the current collector.

In certain embodiments, the binder composition, binder concentration, or concentration of different binder materials can be varied over different spatial regions of the LIB anode or the LIB anode active material composite. For example, a first binder material (e.g., PAA) can have a higher concentration than a second binder material (e.g., CMC) at an interface between the LIB anode current collector structure (e.g., Cu film) and an active material composite structure (e.g., graphite powder-Si nanostructure composite), and the concentration of the first binder material can be lower at a distance away from the interface. For example, the first binder material can have a gradient concentration which decreases in a direction away from the interface.

The ratio of binder materials to conductive and active materials in the LIB anode will vary depending on the composition of the respective components. The LIB anode active material composite can comprise a binder material, wherein the active material composite consists of less than 10% of the binder material, less than 5% of the binder material, less than 4% of the binder material, or about 3-4% of the binder material. In preferred embodiments, the LIB anode includes less than 10% binder material. Most preferably, the binder concentration is less than about 5%, less than 5%, less than about 4%, less than 4%, less than about 3%, or less than 3%. The LIB anode can include any suitable binder materials, including CMC, PVDF, PAA, SBR, or PAADAA, or combinations thereof, including CMC and PAA, CMC and PAADAA, or CMC, PAA, and PAADAA.

In certain embodiments, the LIB anode can be formed without using any binder materials. For example, no binder material is required when active material nanostructures are formed directly on a LIB anode current collector structure such as Cu film or graphite foil. Advantageously, these embodiments reduce the overall weight of the anode structure and reduce the number of different materials and impurities in the LIB anode.

Electrolytes, Electrolyte Additives, and SEIs

One aspect of the present invention relates to LIB materials including electrolytes and electrolyte additives, as well as components, devices, and methods of manufacturing related thereto. Particularly, the present invention includes LIB electrolytes and LIB electrolyte additives suitable for use with LIBs comprising Si active materials or Si and graphite active materials, as well as related components, devices, and methods. In preferred embodiments, the electrolyte is a liquid polymer electrolyte. In one embodiment, the present invention includes a LIB anode comprising one or more electrolyte materials comprising at least one liquid polymer solvent selected from the group consisting of diethyl carbonate (DEC), ethylene carbonate (EC), or ethyl methyl carbonate (EMC); and at least one polymer additive selected from the group consisting of fluorinated ethylene carbonate (FEC), diallyl pyrocarbonate (DAPC), diethyl pyrocarbonate (DEPC), diallyl carbonate (DAC), diallyl succinate (DAS), tris(pentafluorophenyl) bora (TPFPB), tris (2,2,2-trifluoroethyl) posphite (TTFP), N,N'-dicyclohexyl-carbodiimide (DCC), methoxy trimethyl silane (MOTS), dimethoxydimethylsilane (DMOS), trimethoxy methyl silane (TMOS), maleic anhydride (MA), succinimide (SI), n-(benzyloxycaronyloxy)succinimide (NBSI), vinylene carbonate (VC), vinyl ethylene carbonate (VEC), 1,3-propanesultone (PS), polydimethylsiloxane (PDMS), maleic anhydride (MA), and succinic anhydride (SA). In preferred embodiments, the LIB anode active material includes Si nanostructures or a combination of Si nanostructures and graphite (e.g., graphite foil or powder).

Advantageously, the electrolytes and electrolyte additives of the present invention provide an appropriate SEI on the Si and graphite structure surfaces that can also be self-healed during battery charge and discharge cycling. Without changing the Si structure, the SEI minimizes the side reactions between Si or graphite and the electrolyte while allowing for sufficient diffusion of Li ions through the SEI layer, allowing penetration of Li ions from the electrolyte solution to the Si or Si and graphite active materials.

In one preferred class of embodiments, a LIB anode comprises Si and graphite active materials and an electrolyte comprising EC and DEC; or EC, DEC, and EMC. Preferably, the electrolyte further comprises an additive comprising FEC. Most preferably, the LIB comprises Si and graphite active materials and an electrolyte comprising about 90% of a solvent mixture comprising equal parts of DEC:EC:EMC and about 10% of an additive comprising one or more materials selected from the group consisting of FEC, SA, and DAPC. Most preferably, the electrolyte comprises DEC, EC, EMC, and FEC. For example, the electrolyte can comprise an electrolyte comprising about 90% of a solvent mixture comprising equal parts of DEC:EC:EMC and about 10% of an additive comprising FEC, FEC and DAPC, or FEC and SA.

In preferred embodiments, the LIB comprises Si or Si and graphite active materials and an electrolyte. Preferably, the electrolyte comprises one or more additive materials which provides a self-healing SEI layer on the Si or Si and graphite active materials during LIB charge and discharge cycling. In preferred embodiments, the self-healing SEI layer is formed via reduction of one or more electrolyte additive materials onto the active material surface during LIB charge cycling, wherein the electrolyte additive material comprises FEC, DAPC, MA, SI, NBSI, SA, or a combination thereof. Most preferably, the electrolyte additive comprises FEC.

In preferred embodiments, the SEI layer can be formed as an artificial SEI layer. The artificial SEI layer can be formed in an electrolytic cell prior to formation of the LIB anode. For example, the LIB anode active material nanostructures can be formed using one or more ECD methods of the present invention, and the SEI layer can be formed on the active material nanostructures in the same electrolytic cell or a different electrolytic cell by adding one or more SEI precursors to form the SEI layer via ECD directly on the active material surface.

In preferred embodiments, the LIB anode active material composite comprises about 65-95% graphite active material, about 5-45% Si active material, and about 3-6% binder material. In certain embodiments, no binder material is required.

ECD Processes

As described above, the present invention includes novel, cost-effective methods for producing high-quality, high-capacity active material nanostructures for use in LIB components and devices, including silicon-based or tin-based nanostructures for use as LIB anode active materials. Particularly, the present invention allows for low-temperature, catalyst-free, template-free ECD processes for producing discrete active material nanostructures, eliminating the need for removal of catalyst materials, template materials, or impurities introduced by catalyst or template materials. The ECD processes of the present invention provide methods for controlling the physical and chemical characteristics of the active material nanostructures to meet specific requirements consistently over multiple process runs, thereby providing an effective process solution for mass-production of high-quality and high-capacity LIB anode active materials. For example, the ECD methods of the present invention allow for formation of highly crystalline active material nanostructures at low temperatures (e.g., room temperature) immediately upon deposition onto the desired substrate without the need for subsequent annealing to achieve crystallinity. In preferred methods, active material nanostructures are electrochemically deposited directly onto one or more substrates comprising at least one LIB anode active material (e.g., graphite) and/or LIB anode current collector structure (e.g., a copper, graphite, or nickel electrode) to form a LIB anode component, thereby improving adhesion between the nanostructures and the substrate as well as eliminating the need to remove the nanostructures from the ECD growth substrate for inclusion in the LIB anode. Using techniques available to those of ordinary skill in the art, the substrate and the active material nanostructures formed thereon can be formed into a LIB anode, and the LIB anode can be formed into a LIB full cell or half cell for use as a rechargeable or single-use energy source. Furthermore, the high quality of the LIB active materials produced by the ECD processes of the present invention provide consistency and predictability of battery system performance and allow for control over changes to these materials and related battery devices throughout the multiple charge cycles and various conditions to which they are subjected. These high-quality materials eliminate the irreversible, undesired side effects which contribute to unpredictable and detrimental changes in LIBs and cause large hysteresis in the operation characteristics of LIBs.

It is to be understood that any of the materials described herein can be used in the processes of the present invention, including, but not limited to, active material nanostructures, substrate materials, current collector materials, current collector substrate materials, active materials, substrates comprising active materials, binder materials, electrolytes, electrolyte component materials, electrolyte additive materials, SEI materials, LIB anode materials, or other LIB component materials described herein. For the sake of brevity, these materials may not be independently described in connection with the description of the methods and processes of the present invention. However, it is to be understood that all such materials mentioned herein and their various combinations can be used as materials in the methods and processes of the present invention.

Figure 44:
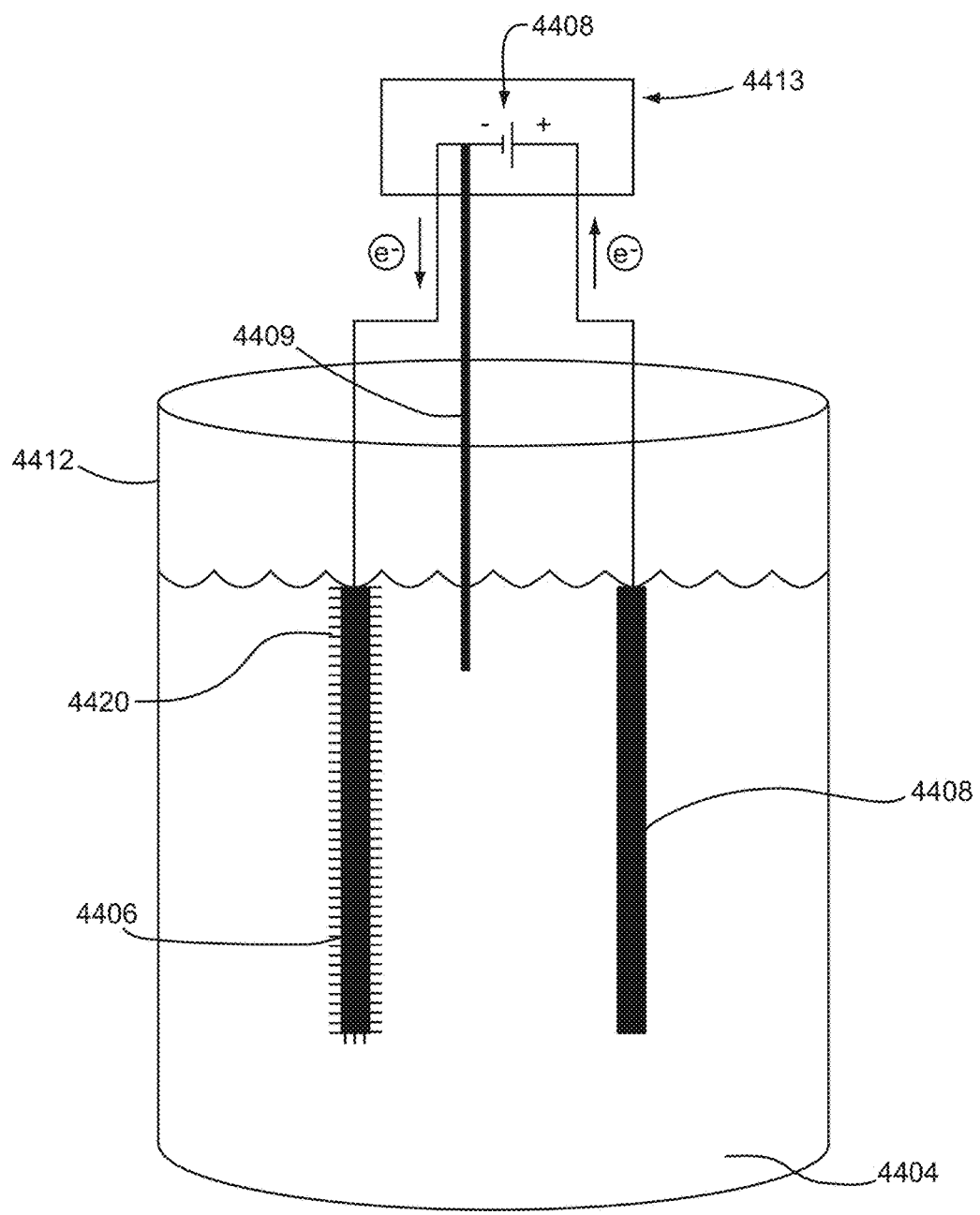
FIG. 44 shows an electrolytic cell for one or more ECD processes of the present invention.

In general, preferred ECD processes of the present invention include an electrolytic cell (EC) for ECD, wherein the EC is similar to the example EC shown in FIG. 44. The EC includes a container 4412, an electrically conductive working electrode (i.e., EC cathode) 4406, an electrochemically stable current electrode (i.e., EC anode) 4407, a reference electrode 4409, a potential voltage source 4408 providing direct current 4411 through the EC, a potentiostat 4413, and an electroactive supporting electrolyte solution 4404 comprising one or more precursor materials dissolved in one or more solvent materials. The electrochemical reaction results in the nanostructures 4420 comprising one or more active materials are formed directly on one or more surfaces of the working electrode 4406.

The reference electrode 4409 preferably includes a platinum reference electrode, e.g., a Pt wire.

The current electrode 4407 can include Pt, C, Cu, graphite, another conductive material, or any combination of these and other conductive materials. For example, the current electrode can include a carbon sheet, carbon foil, carbon paper, Cu foil, Cu foam, Cu sponge, graphite foil, another conductive substrate structure, one or more of these substrate structures, or any combination of these or other conductive substrate structures. In preferred embodiments, the current electrode comprises carbon paper. In certain embodiments, the counter electrode/current electrode 4408 can include a noble metal material to provide a stable counter electrode.

In preferred embodiments, the working electrode 4406 and the current electrode 4408 are separated in the electrolytic cell by a distance of about 2 cm. As will be understood by persons of ordinary skill in the art, the voltage can be fixed during the ECD process while the current flow can be varied as the distance between the working and counter electrodes changes.

The working electrode 4406 can include any of the ECD substrate materials and structures mentioned herein. The working electrode can include one or more conductive substrate materials or a combination of one or more conductive substrate materials and one or more semiconductor, insulator, and/or non-substrate conductive materials. The working electrode can comprise one or more metals, Cu, C, graphite, Ni, steel, Al, Pt, Au, Sn, one or more conductive polymers, other conductive materials, one or more binder materials such as CMC, PVDF, PAA, or PAADAA, as well as any composition, mixture, alloy, or combination thereof. In certain embodiments, the working electrode comprises multiple materials, e.g., Cu and graphite, non-graphitic C and graphite, Ni and graphite, steel and graphite, Al and graphite, Pt and graphite, Cu and C, Cu and Sn, C and Sn, multiple forms of graphite, multiple forms of C; Cu, non-graphitic C, and graphite; graphite and one or more binder materials, or any composition, mixture, alloy, or combination thereof. In preferred embodiments, the working electrode includes one or more LIB active materials or structures and/or one or more LIB current collector materials or structures. Exemplary working electrode structures include one or more of the following: graphite foil or plate, polished graphite foil or plate, graphite flakes or particles, graphite flakes or particles and one or more binder materials such as CMC, PVDF, PAA, or PAADAA, graphite flakes or particles combined with one or more binder materials and coated on graphite foil or plate, Cu-coated graphite foil, Cu-coated graphite foil coated with graphite flakes or particles, graphite flakes or particles combined with one or more binder materials and coated on a Cu-coated graphite foil or plate, Cu-coated graphite foil or plate subjected to gas treatment, porous Cu mesh or foam, Cu wires, Cu fibers, Ni-coated Cu wires or fibers, patterned Cu wires, Ni-coated patterned Cu wires, carbon sheet, heat-treated carbon sheet, Cu foil or plate coated with graphite flakes or particles, graphite flakes or particles combined with one or more binder materials and coated on a Cu foil or plate, graphite flakes or particles disposed between or pocketed by porous Cu mesh sheets, graphite flakes or particles combined with one or more binder materials and disposed between or pocketed by porous Cu mesh sheets, one or more binder materials such as CMC, PVDF, PAA, or PAADAA, and combinations thereof.

In one class of embodiments, the working electrode 4406 comprises Cu-coated graphite foil or a Cu-coated carbon sheet. Cu is electrochemically deposited onto a carbon sheet or graphite foil substrate to form a working electrode and ECD substrate comprising Cu-coated graphite foil. For example, an EC similar to the one shown in FIG. 1A can be used to coat the Cu onto the carbon sheet or graphite foil substrate. The Cu coating can comprise a complete layer of Cu or one or more surface features comprising Cu formed on the underlying substrate. At least one Cu precursor is dissolved in at least one solvent to form the electrolyte solution for deposition of Cu onto the graphite foil or carbon sheet substrate. For example, the solution 104 can comprise a cupric sulfate ($CuSO_4$) precursor dissolved in an ionic liquid solvent comprising non-aqueous non-aqueous n-methyl-n-butyl pyrrolidinium bis(trifluoromethanesulfonyl)imide ($P_{1,4}TFSI$) or distilled ionized water (DI $H_2O$). [Does DI $H_2O$ mean distilled ionized water, deionized water, distilled water, or something else?] For example, the solution can comprise less than about 0.03M $CuSO_4$ in $P_{1,4}TFSI$ (e.g., about 0.002-0.02M $CuSO_4$ in $P_{1,4}TFSI$) or less than about 0.15M $CuSO_4$ in DI $H_2O$ (e.g., about 0.5-0.1M $CuSO_4$ in DI $H_2O$).

The EC electrolyte solution 104 comprises at least one active material precursor dissolved in at least one solvent. Suitable electrolytes for ECD of Si nanostructures include organic solutions; high-, middle-, and low-temperature molten salts; or room-temperature ionic liquids. Preferred solutions have a wide electrochemical potential window, sufficient conductivity, negligible vapor pressure, and immiscibility with water. As will be understood by persons of ordinary skill in the art, the reduction potential of the material to be deposited is preferably lower than the reduction potential of the solvent or other materials in the ionic solution in order to avoid reduction of the solvent or other materials before reduction of the desired material to be deposited. In preferred embodiments, the solvent includes $P_{1,4}TFSI$. In other embodiments, the solvent can include distilled or deionized water (DI $H_2O$), acetonitrile (ACN), or propylene carbonate (PC).

In preferred embodiments, the EC solution 104 comprises a Si precursor including trichlorosilane ($SiHCl_3$) and/or silicon tetrachloride ($SiCl_4$). In preferred embodiments, a Si precursor (e.g., $SiHCl_3$ or $SiCl_4$) is dissolved in an ionic liquid solvent comprising $P_{1,4}TFSI$ or DI $H_2O$. For example, the ECD methods of the present invention can include ECD of Si nanostructures onto a working electrode substrate 215 comprising graphite and/or copper, a Si precursor (e.g., $SiHCl_3$ or $SiCl_4$) is dissolved in an electrolyte solvent (e.g., $P_{1,4}TFSI$), the Si and chlorine (Cl) precursor ions, or the Si, Cl, and hydrogen (H) precursor atoms, are separated by the redox reaction, and Si atoms are deposited onto the working electrode as discrete nanostructures. During this ECD process, discrete Si nanostructures such as Si nanowires form on the Cu and/or graphite working electrode substrate. The amount or concentration of $SiHCl_3$ silicon precursor can be about 0.1M to about 1M, preferably 0.5M to about 1M, about 0.5M to about 0.9M, 0.5M to 1M, or 0.5M to 0.9M. The amount or concentration of $SiCl_4$ silicon precursor can be about 0.05M to about 0.5M, preferably 0.05M to 0.5M, about 0.05 to about 0.04M, or 0.05M to 0.04M. Most preferably, the active material comprises Si and the precursor comprises $SiHCl_3$; most preferably, the solution 104 comprises $SiHCl_3$ dissolved in $P_{1,4}TFSI$ solvent. Most preferably, the solution 104 comprises about 0.6M $SiHCl_3$ dissolved in $P_{1,4}TFSI$.

While Si is the preferred active material for ECD, other materials can also be used, including those mentioned herein. ECD of most metals can be achieved using a metallic salt precursor dissolved in a suitable solvent material. For example, discrete Sn nanostructures can be formed via ECD using a tin chloride ($SnCl_2$) precursor dissolved in an appropriate solvent material.

In certain embodiments, the EC can include multiple working electrodes and/or multiple precursor materials. In one example embodiment, Si and Cu are co-deposited via ECD onto a graphite foil substrate, wherein the EC solution comprises a Cu precursor and at least one Si precursor dissolved in a solvent, e.g., $CuSO_4$ and $SiHCl_3$ dissolved in $P_{1,4}TFSI$.

Important factors for controlling the deposition and morphology during ECD of active material nanostructures include: deposition voltage, precursor composition, precursor concentration, electrolyte composition, current density, ECD process temperature, and deposition time.

As illustrated by the different Si nanostructures shown in FIGS. 6-22, the precursor material and concentration affect Si growth and morphology.

Figure 9A:
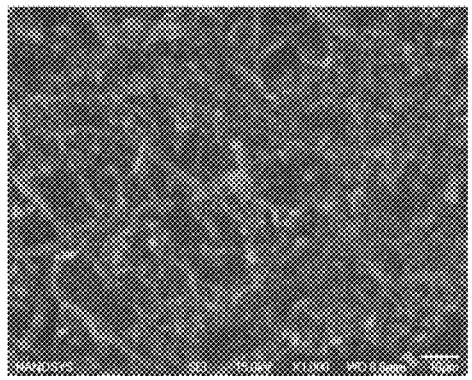
Figure 9B:
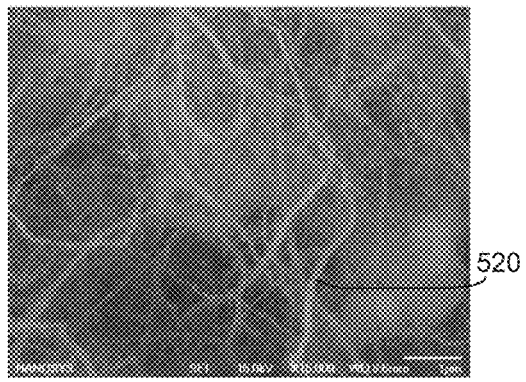
Figure 10A:
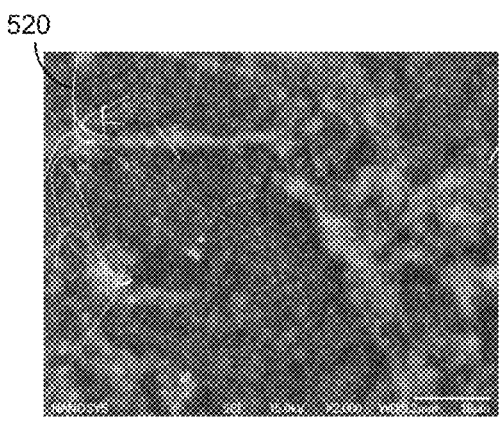
Figure 10B:
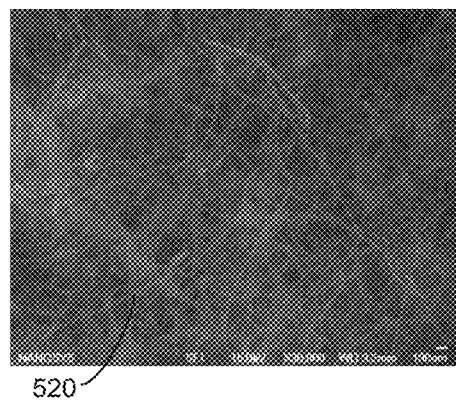
Figure 11A:
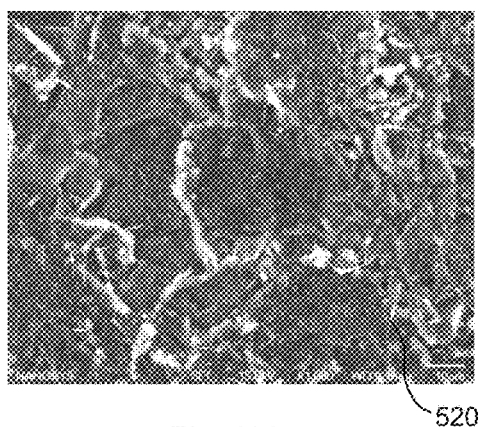
Figure 11B:
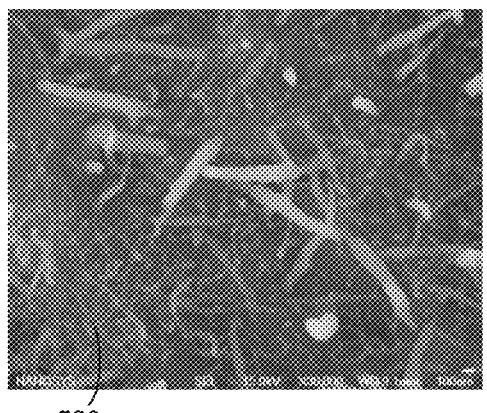
Figure 13A:
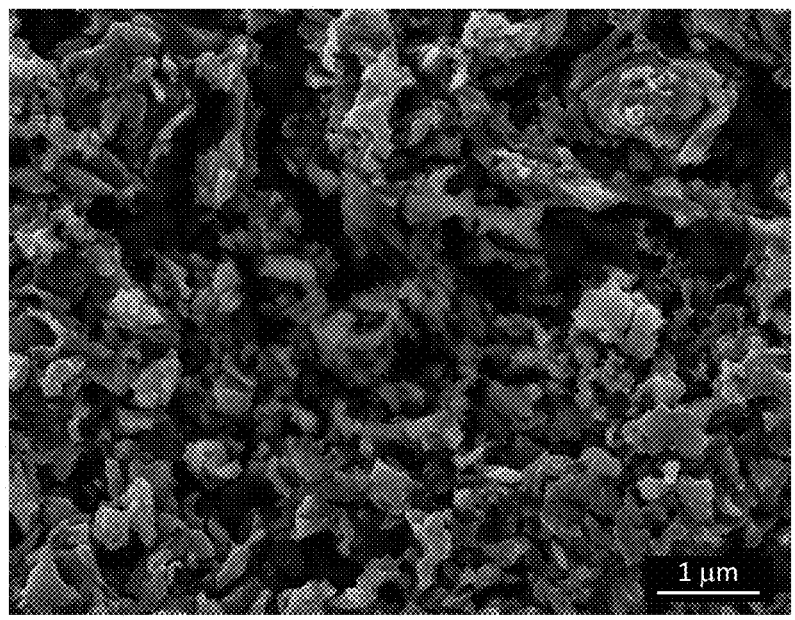
Figure 13B:
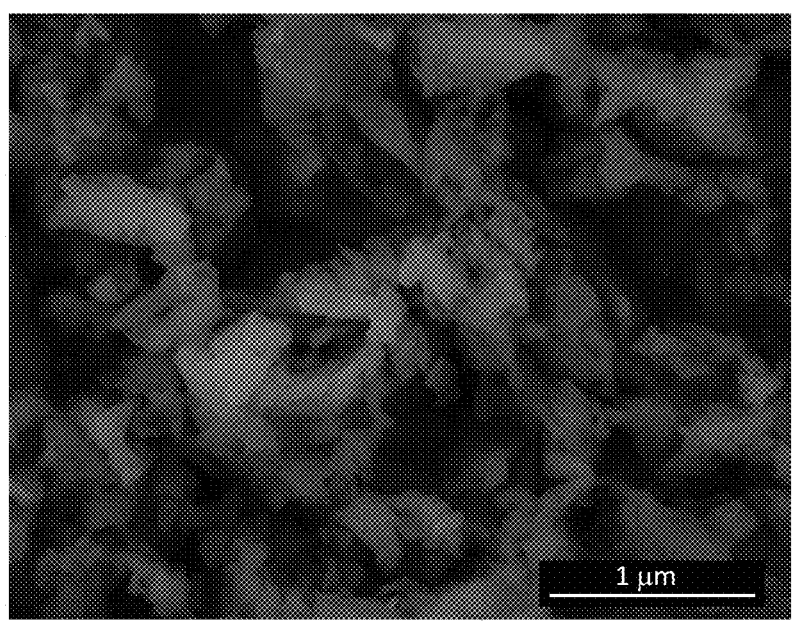
Figure 14A:
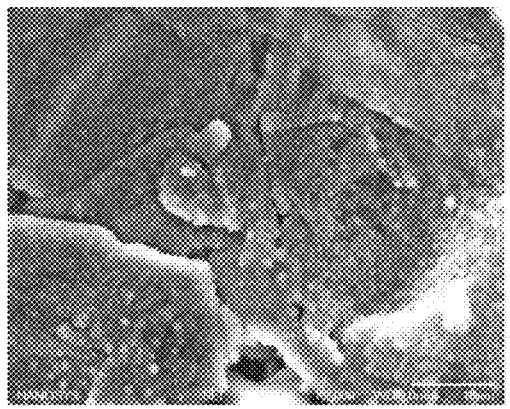
Figure 14B:
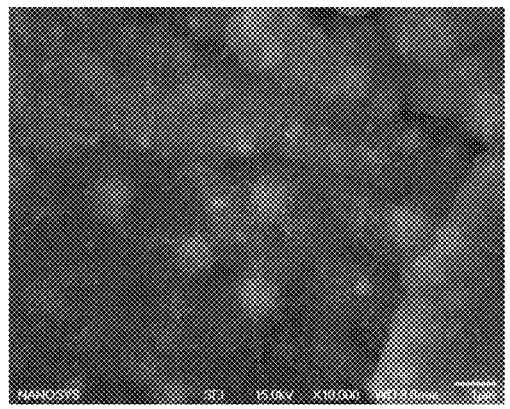
Figure 14C:
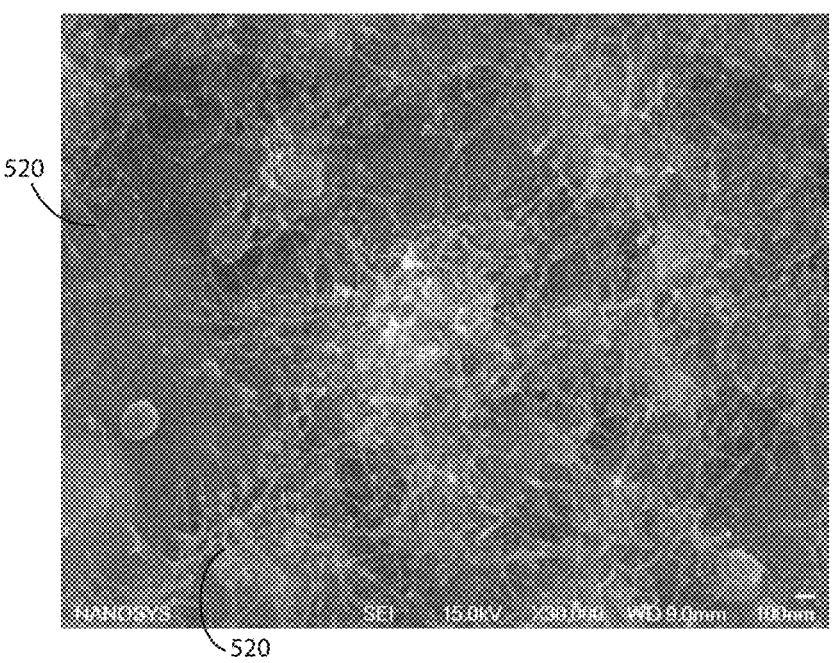
Figure 15A:
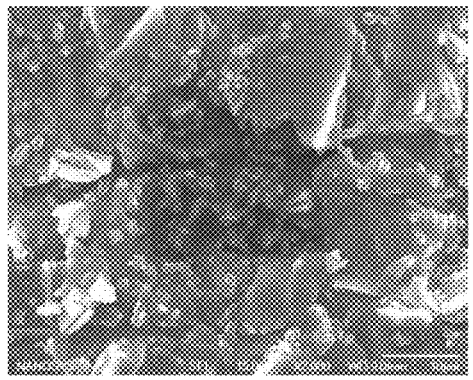
Figure 15B:
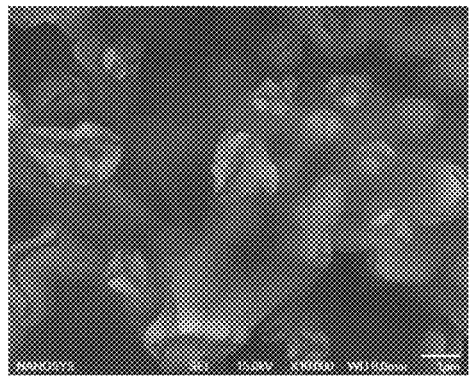
Figure 16A:
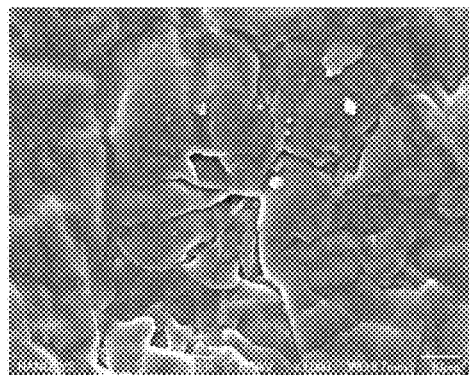
Figure 16B:
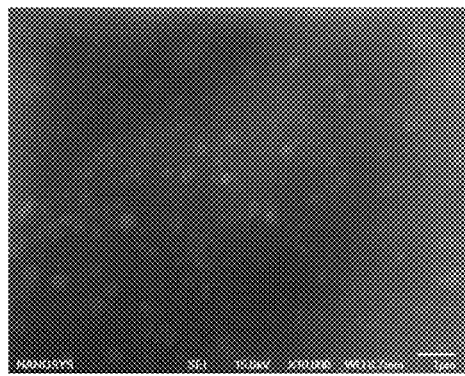

FIGS. 6A-6B show the resulting Si nanostructures formed on a graphite foil substrate using an EC solution comprising 1M $SiHCl_3$ in $P_{1,4}TFSI$, with an applied voltage of -2.9V vs. the Pt reference electrode. FIGS. 7A-7B show the resulting Si nanostructures formed on a graphite foil substrate using an EC solution comprising 1M $SiHCl_3$ in $P_{1,4}TFSI$, with an applied voltage of applied voltage of -2.7V vs. the Pt reference electrode. FIGS. 8A-8B show the resulting Si nanostructures formed on a graphite foil substrate using an EC solution comprising 0.9M $SiHCl_3$ in $P_{1,4}TFSI$, with an applied voltage of -3V vs. the Pt reference electrode. FIGS. 9A-9B show the resulting Si nanostructures formed on a graphite foil substrate using an EC solution comprising 0.7M $SiHCl_3$ in $P_{1,4}TFSI$, with an applied voltage of -3V vs. the Pt reference electrode. FIGS. 10A-10B show the resulting Si nanostructures formed on a graphite foil substrate using an EC solution comprising 0.6M $SiHCl_3$ in $P_{1,4}TFSI$, with an applied voltage of -3V vs. the Pt reference electrode. FIGS. 11A-11B show the resulting Si nanostructures formed on a graphite foil substrate using an EC solution comprising 0.4M $SiHCl_3$ in $P_{1,4}TFSI$, with an applied voltage of -3V vs. the Pt reference electrode. FIGS. 12A-12C show the resulting Si nanostructures formed on a graphite foil substrate using an EC solution comprising 0.2M $SiHCl_3$ in $P_{1,4}TFSI$, with an applied voltage of applied voltage of -3V vs. the Pt reference electrode. FIGS. 13A-13B show the resulting Si nanostructures formed on a graphite foil substrate using an EC solution comprising 0.2M $SiHCl_3$ in $P_{1,4}TFSI$, with an applied voltage of -2.8V vs. the Pt reference electrode. FIGS. 14A-14C show the resulting Si nanostructures formed on a graphite foil substrate using an EC solution comprising 0.1M $SiHCl_3$ in $P_{1,4}TFSI$, with an applied voltage of -2.5V vs. the Pt reference electrode. FIGS. 15A-15B show the resulting Si nanostructures formed on a graphite foil substrate using an EC solution comprising 0.05M $SiHCl_3$ in $P_{1,4}TFSI$, with an applied voltage of -3V vs. the Pt reference electrode. FIGS. 16A-16B show the resulting Si nanostructures formed on a graphite foil substrate using an EC solution comprising 0.05M $SiHCl_3$ in $P_{1,4}TFSI$, with an applied voltage of -2.5V vs. the Pt reference electrode.

Figure 17A:
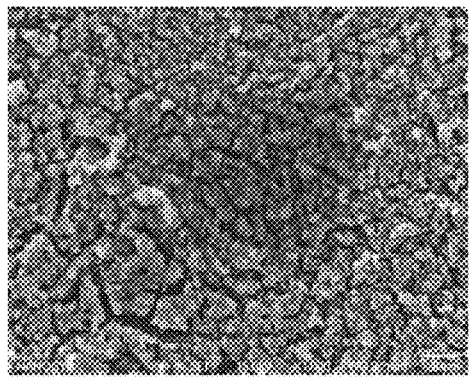
Figure 17B:
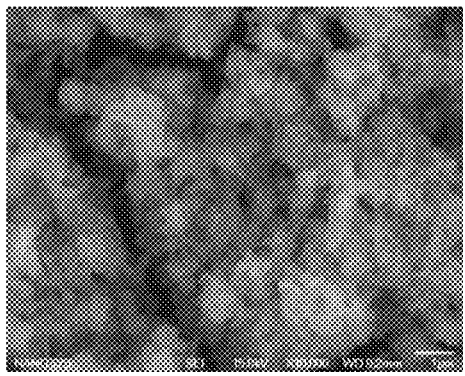
Figure 18A:
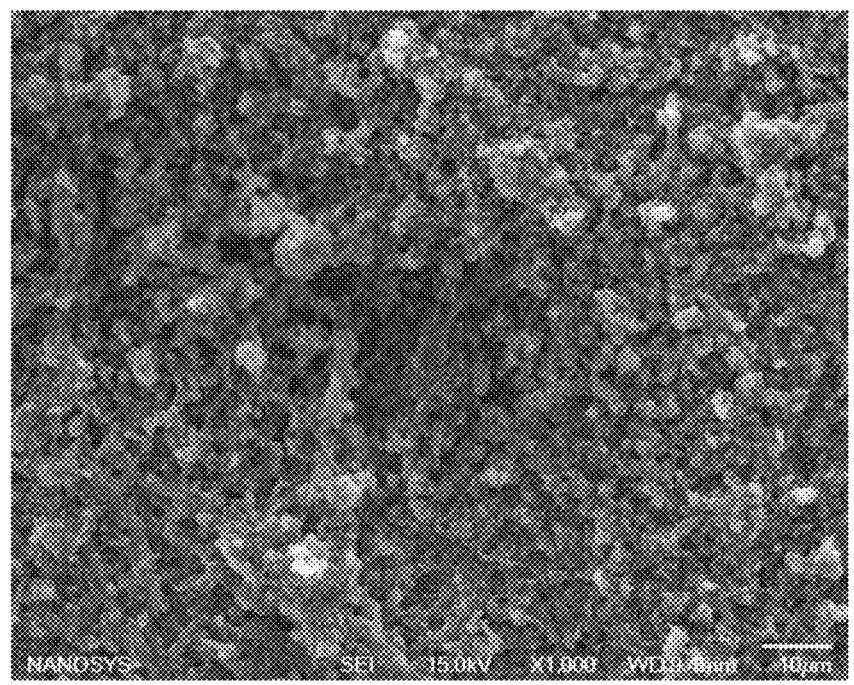
Figure 18B:
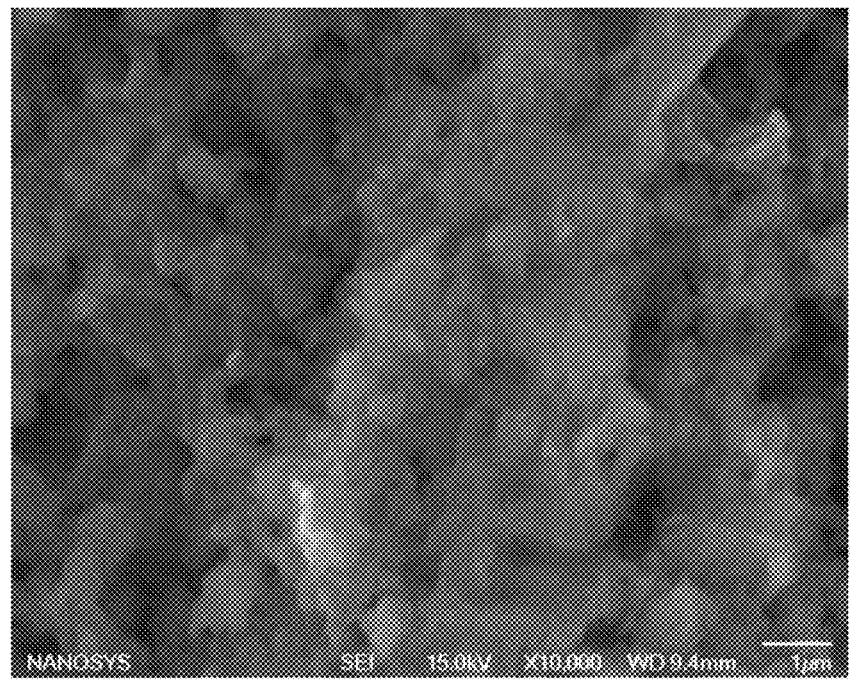

FIGS. 17A-17B show the resulting Si nanostructures formed on a graphite foil substrate using an EC solution comprising 0.4M $SiCl_4$ in $P_{1,4}TFSI$, with an applied voltage of -3V vs. the Pt reference electrode. FIGS. 18A-18B show the resulting Si nanostructures formed on a graphite foil substrate using an EC solution comprising 0.4M $SiCl_4$ in $P_{1,4}TFSI$, with an applied voltage of -3V vs. the Pt reference electrode. FIGS. 19A-19C show the resulting Si nanostructures formed on a graphite foil substrate using an EC solution comprising 0.1M $SiCl_4$ in $P_{1,4}TFSI$, with an applied voltage of -3V vs. the Pt reference electrode. FIGS. 20A-20B show the resulting Si nanostructures formed on a graphite foil substrate using an EC solution comprising 0.1M $SiCl_4$ in $P_{1,4}TFSI$, with an applied voltage of -3.2V vs. the Pt reference electrode. FIGS. 21A-21B show the resulting Si nanostructures formed on a graphite foil substrate using an EC solution comprising 0.05M $SiCl_4$ in $P_{1,4}TFSI$, with an applied voltage of -3.1V vs. the Pt reference electrode. FIGS. 22A-22B show the resulting Si nanostructures formed on a graphite foil substrate using an EC solution comprising 0.05M $SiCl_4$ in $P_{1,4}TFSI$, with an applied voltage of -3V vs. the Pt reference electrode. Due to the fact that the SiCl$_4$ precursor makes Si deposition more difficult to control, a SiHCl$_3$ precursor is preferred over SiCl$_4$.

As will be appreciated by persons of ordinary skill in the art, variations in the precursor composition or concentration may result in changes to the pH of the solution and/or the miscibility of the precursor with the solvent, thereby affecting the mobility of the ions of the material to be deposited, and thus changing the characteristics of the electrochemically deposited material. As explained above, the precursor composition or concentration can be varied to control the size, shape, morphology, or other characteristics of the electrochemically deposited nanostructures.

In preferred embodiments, a constant potential voltage is applied to the EC during the ECD process. The constant potential voltage applied can be about −2V to about −3V vs. a Pt reference electrode. Preferably, a constant potential voltage is applied at about −2.4V to about −2.8V compared to a Pt reference electrode. These voltage and current ranges have been optimized for the specific process embodiments mentioned herein. In preferred embodiments, a constant direct current of about 1 mA/cm$^2$ to about 8 mA/cm$^2$ is applied to the EC during the ECD process. Preferably, a constant direct current is applied at about 0.5 mA/cm$^2$ to about 1.5 mA/cm$^2$. In preferred embodiments, the reaction is stopped when the measured current falls below about 100 mA. In certain embodiments, the structure and size of the Si deposit can be adjusted by changing the deposition potential/current. However, as will be understood by persons of ordinary skill in the art, the applied voltage and current can be varied with the selection of substrate materials, precursors, electrolytic cell electrolytes, etc. Such variations are included in the present invention.

Figure 45A:
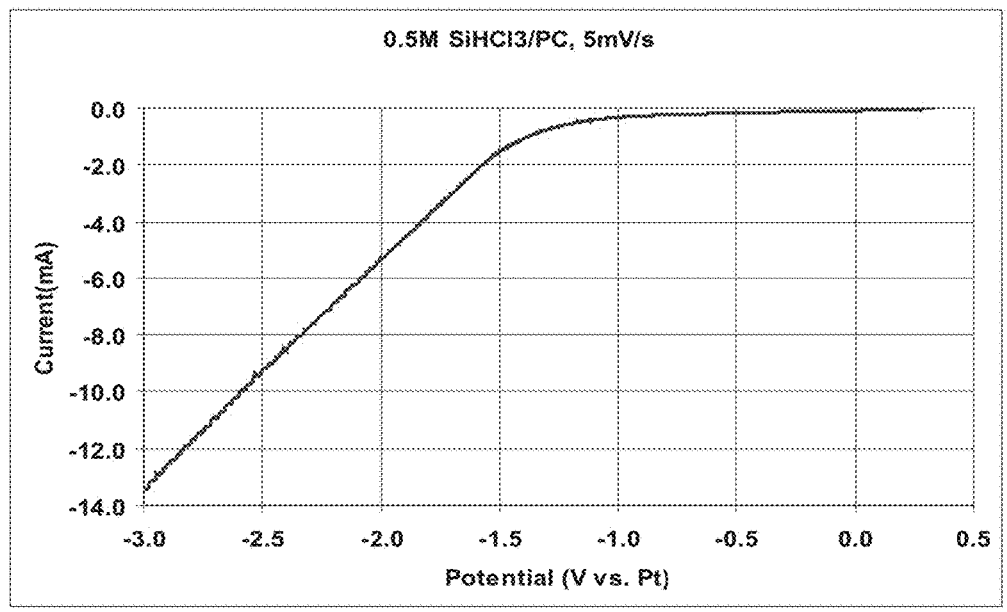
FIG. 45A-45B show current-voltage profiles for various Si precursor materials used in various ECD processes of the present invention.
Figure 45B:
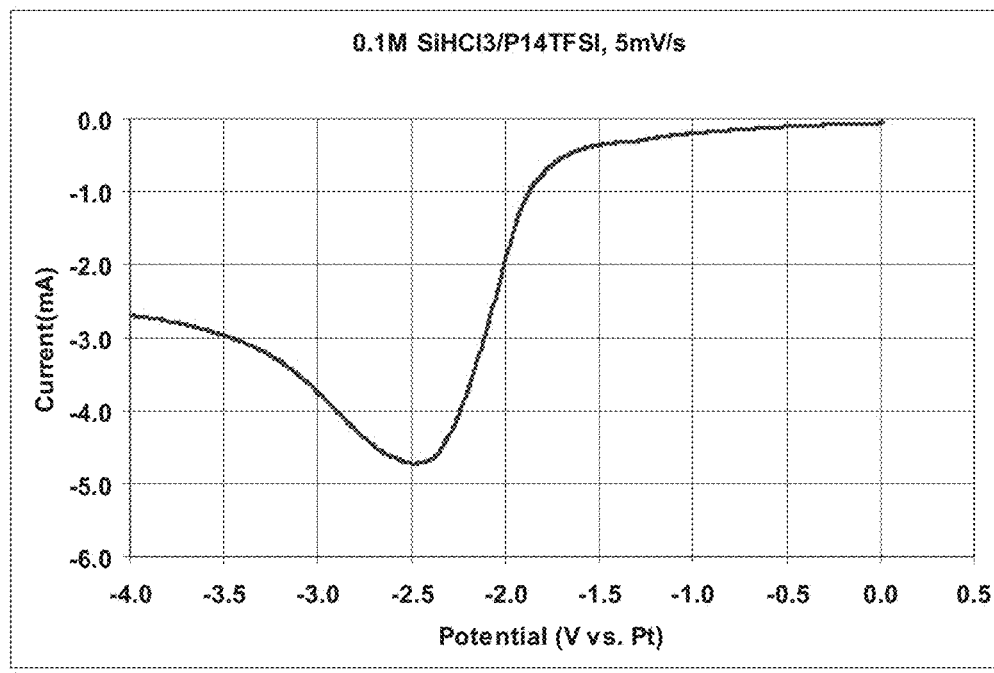
Figure 46:
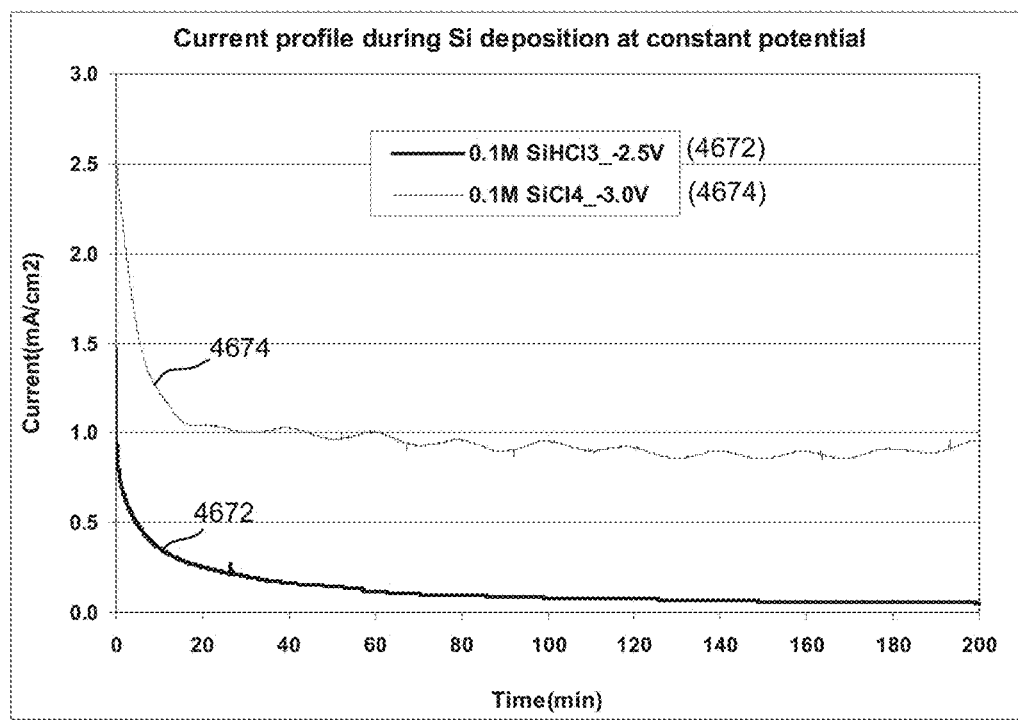
FIG. 46 shows the current profile during Si deposition according to one or more ECD embodiments of the present invention.

The voltage and current profiles are important for controlling Si morphology during the ECD project. In preferred embodiments, the ECD process includes applying a constant potential of about −2.5V to about −3V for about three hours at room temperature. In one example embodiment, the applied potential for ECD of Si can be determined from the reduction peak of Si attained using linear sweep voltammetry at sweep rate of 5 mV/s. FIG. 45A shows the current and voltage profile for 0.5M SiHCl$_3$ dissolved in a PC solvent at a sweep rate of 5 mV/s, and FIG. 45B shows the current and voltage profile for 0.5M SiCl$_4$ dissolved in a P$_{1,4}$TFSI solvent with a constant applied voltage of 5 mV/s. The Si reduction potential can be determined from the graphs of FIGS. 45A and 45B. FIG. 46 shows the current profiles for ECD of 0.1M SiHCl$_3$ 4672 dissolved in a P$_{1,4}$TFSI solvent with a constant potential of −2.5V and 0.1M SiCl$_4$ 4674 dissolved in a P$_{1,4}$TFSI solvent with a constant potential of −3V.

The ECD methods of the present invention can be performed at low temperatures such as room temperature. In preferred embodiments, the ECD of nanostructures comprising at least one active material is performed at about 80° C. or less, about 70° C. or less, about 60° C. or less, about 50° C. or less, about room temperature, or room temperature.

In certain embodiments, the ECD process includes controlling one or more of the potential voltage, the current, and the concentration of the precursor and electrolyte, and the temperature to control the size and/or structure of the electrochemically deposited active materials.

As will be understood by persons of ordinary skill in the art, the structure and size of the active material nanostructures can be adjusted by changing the operating temperature of the ECD process. In preferred embodiments, the ECD process is performed at room temperature. In preferred embodiments, the ECD process is performed at atmospheric pressure and ambient temperature.

In preferred embodiments, the reaction is stopped when the measured current falls below about 100 mA. The ECD reaction time can be performed over a period of about 1-3 hours, most preferably about 2-3 hours.

Figure 47:
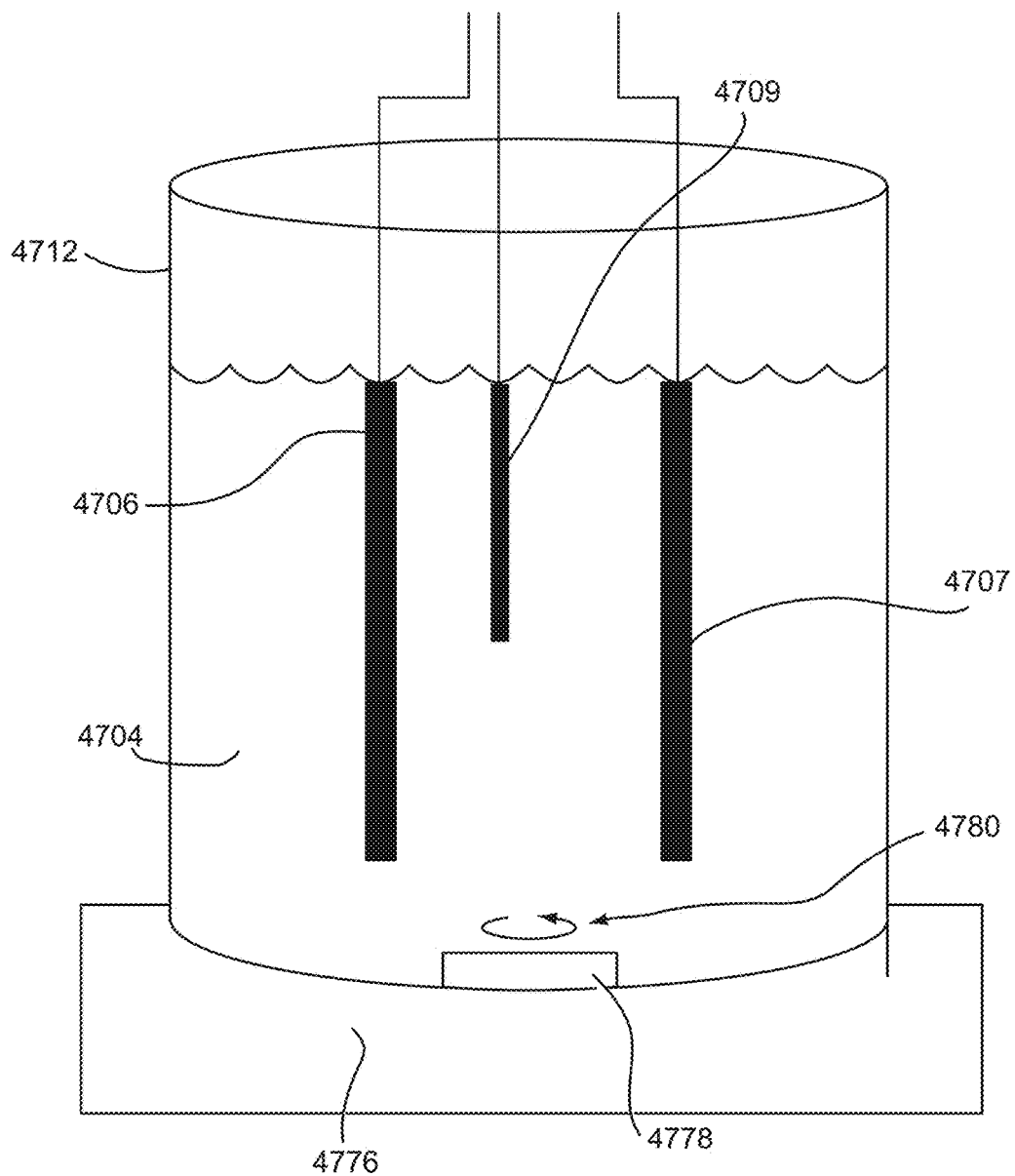
FIG. 47 shows an electrolytic cell including a magnetic stir plate for fluid motion in the electrolytic cell, according to one or more embodiments of the present invention.

In preferred embodiments, the EC solution 4704 is subjected to one or more forces resulting in fluid motion during the ECD process. For example, as shown in FIG. 47, the EC solution 4704 can be stirred, e.g., using a magnetic stir plate 4776 and a magnet 4778 inside the electrolytic cell. In certain embodiments, the fluid motion 4780 of the solution 4704 in the EC provides uniform dispersion of the Si precursor in the solution.

In other embodiments, the fluid motion is varied in different regions of the working electrode, resulting in varied Si concentration or varied Si deposition on the working electrode substrate. For example, different flow rates can be applied to the solution at different regions of the substrate. In still other embodiments, the fluid flow can be pulsed to provide time-dependent changes in the fluid flow rate in the electrolytic solution. In another class of embodiments (not shown in the figures), the electrolytic cell can include a flow channel so that fluid enters the EC container at one location and exits the container a different location, whereby the fluid flows past the working electrode substrate.

Figure 48:
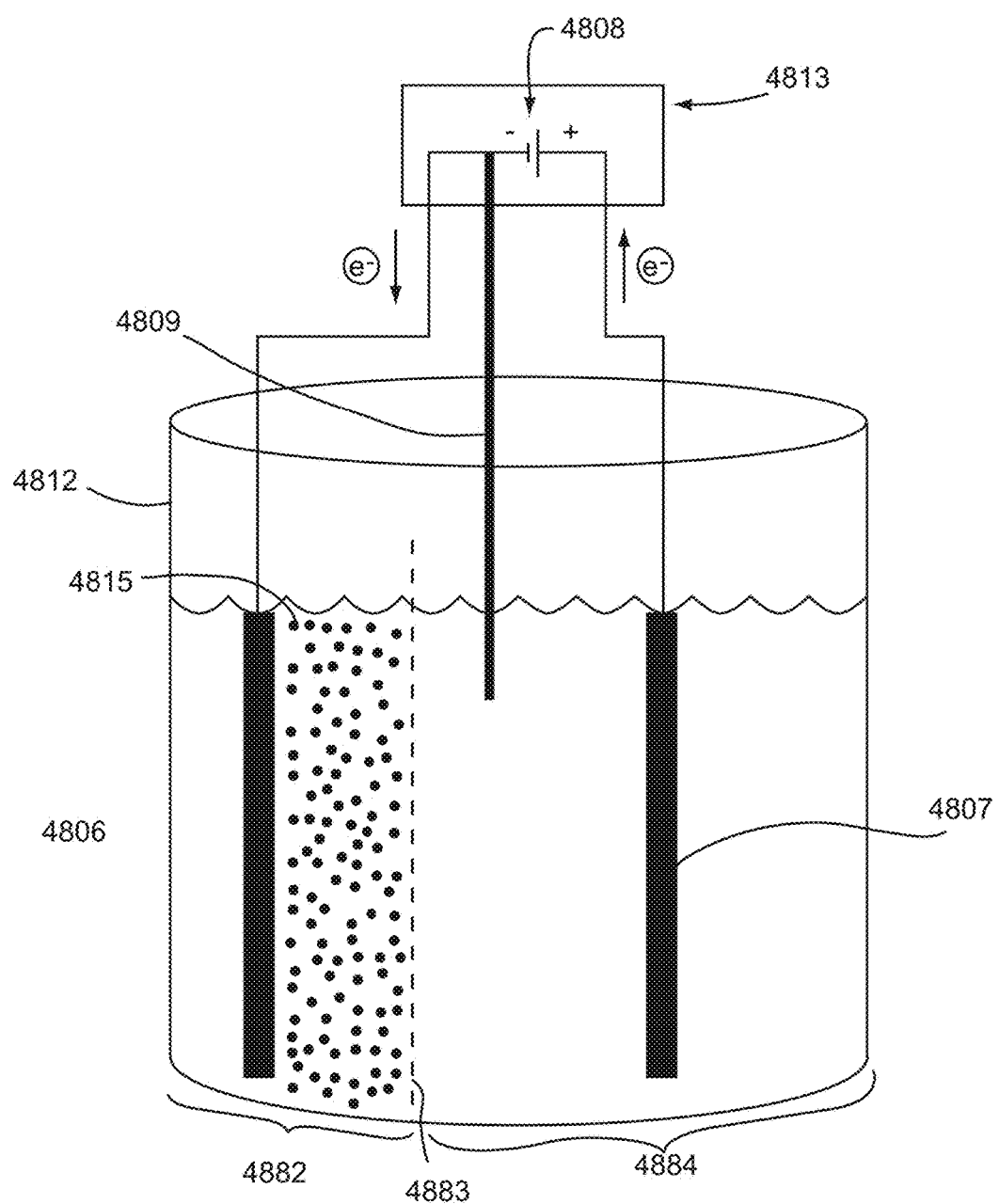
FIG. 48 shows an electrolytic cell for ECD of discrete active material nanostructures on a particulate substrate.

In one class of embodiments, as shown in FIG. 48, the electrolytic cell comprises a first region 4882 and a second region 4884, wherein the first and second regions are separated by a porous separator 4883. The precursor solution 4804 flows freely through the separator 4883 to allow for deposition of one or more active materials on the particulate substrate 4815 (e.g., graphite powder). The separator 4883 can include an insulator material such as a porous ceramic or polymeric insulator, or the separator 4883 can include a metallic material such as a porous Cu separator.

Figure 49:
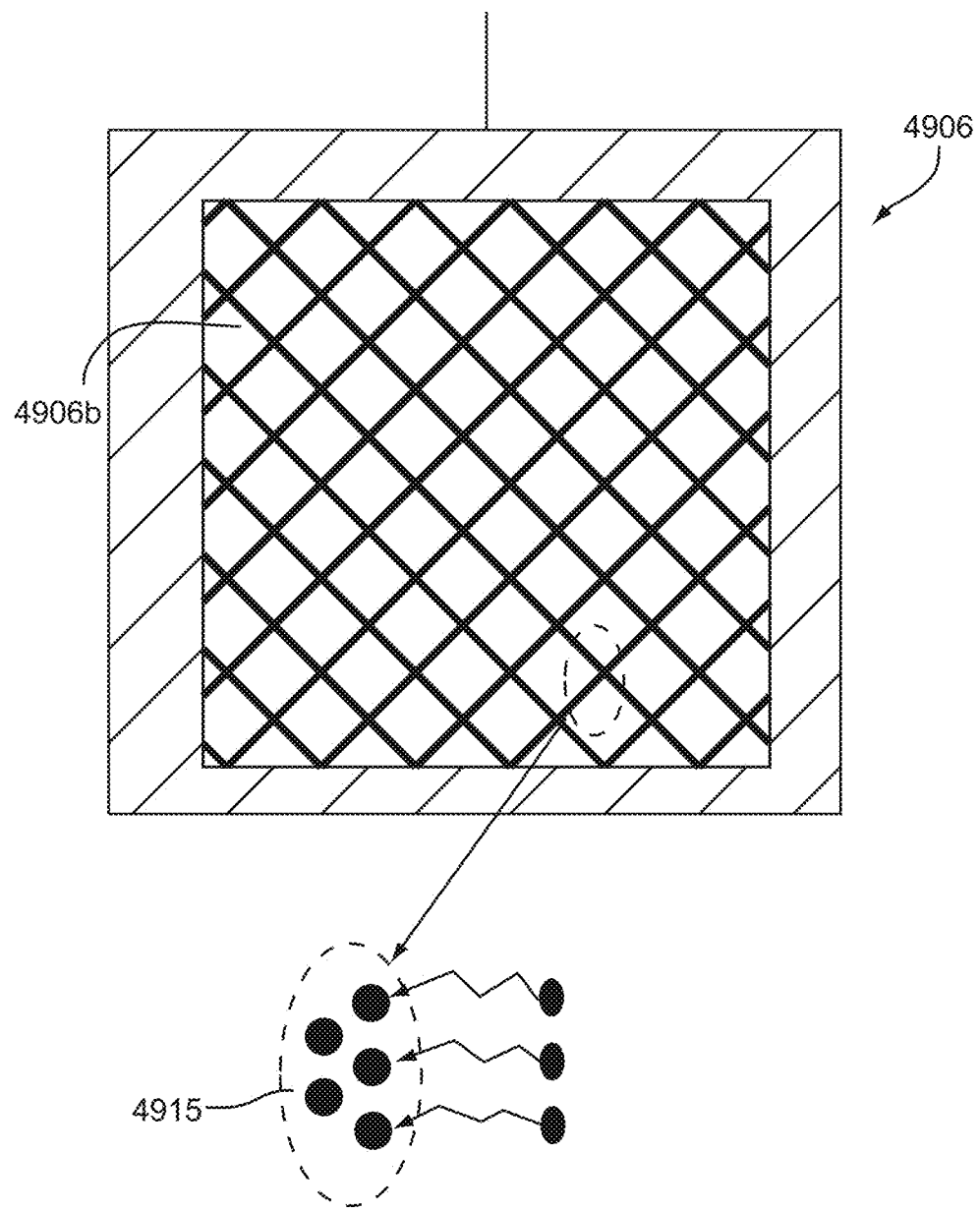
FIG. 49 shows a porous working electrode having ECD substrate particles contained therein.

In another class of embodiments, as shown in FIG. 49, a particulate substrate 4915 is disposed within a porous working electrode 4906. For example, a substrate material comprising graphite powder can be disposed within a pocket 4906b of the porous Cu mesh working electrode 4906. The solvated active material ions (e.g, Si ions) can flow freely through the porous working electrode 4906. For example, this embodiment can be used to form the anode structures described above in FIGS. 26A-27B and 30A-31D.

In another general class of embodiments, the ECD of one or more active material nanostructures on a current collector or active material substrate can be controlled by adjusting the temperature or electrical current of the solution, the substrate, and/or the working electrode over different regions of the ECD substrate.

In another general class of embodiments, the active material nanostructures are subjected to one or more pre-lithiation or pre-lithiation and delithiation procedures prior to forming the LIB anode. Preferably, such pre-lithiation or pre-lithiation and delithiation can be performed in an electrolytic cell, including the same EC used to deposit the active material nanostructures using ECD or a different EC from the active material deposition EC. In preferred embodiments, the ECD process further comprises lithiating the electrochemically deposited nanostructures after the ECD process. In one example embodiment, this process includes providing a solution comprising a lithium precursor dissolved in at least one solvent in the electrolytic cell and applying a potential voltage to the electrolytic cell to reduce the lithium, wherein lithium atoms alloy with the active material nanostructures (e.g., Si nanostructures), resulting in lithiation of the nanostructures. Subsequently, the nanostructures and the substrate materials can be formed into a LIB anode comprising pre-lithiated (or pre-lithiated and delithiated) active material nanostructures. The lithium precursor solution can comprise at least one lithium salt precursor material including lithium hexafluorophosphate (LiPF$_6$) and/or lithium bis(oxatlato)borate (LiBOB).

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention. While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A method of forming a lithium-ion battery (LIB) component, comprising:
   providing at least one substrate structure;
   electrochemically depositing a plurality of nanostructures directly onto one or more surfaces of the at least one substrate structure, wherein the nanostructures are formed via electrochemical deposition without a growth template, and the nanostructures are comprised of crystalline Si and are substantially free of amorphous Si or polycrystalline Si upon formation; and
   pre-lithiating the electrochemically deposited nanostructures.

2. The method of claim 1, wherein the LIB component is a LIB anode component.

3. The method of claim 1, wherein the plurality of nanostructures form at least one LIB anode active material.

4. The method of claim 3, wherein the nanostructures further comprise one or more intermetallic compounds and/or alloys of Si or tin (Sn),
   wherein the one or more intermetallic compounds of Si are a silicon-copper (Si—Cu) intermetallic compound, a silicon-nickel (Si—Ni) intermetallic compound, or any combination thereof; and
   wherein the one or more intermetallic compounds of Sn are a tin-copper (Sn—Cu) intermetallic compound, a tin-nickel (Sn—Ni) intermetallic compound, a tin-manganese (Sn—Mn) intermetallic compound intermetallic compound, or any combination thereof.

5. The method of claim 1, wherein the substrate structure comprises at least one current collector structure.

6. The method of claim 5, wherein the at least one current collector structure comprises at least one copper (Cu) structure and/or at least one graphite structure and/or at least one carbon structure.

7. The method of claim 5, wherein the at least one current collector structure comprises one or more of a Cu film, Cu foil, a Cu mesh structure, and a Cu sponge structure.

8. The method of claim 5, wherein the at least one current collector structure comprises one or more of a graphite film, carbon paper, a graphite foil structure, graphite powder composite, and carbon powder composite.

9. The method of claim 1, wherein the substrate structure comprises at least one active material structure.

10. The method of claim 9, wherein the at least one active material substrate structure comprises graphite, wherein the at least one active substrate structure comprises graphite, wherein the graphite active material substrate structure comprises graphite powder having a plurality of graphite flakes or particles, and wherein the graphite powder is combined with one or more binder materials to adhere the graphite particles or flakes together.

11. The method of claim 10, wherein the one or more binder materials include one or more of carboxylmethyl cellulose (CMC), polyvinylidene fluoride (PVDF), styrene butadiene rubber (SBR), or polyacrylic acid (PAA).

12. The method of claim 10, wherein the combining is performed prior to electrochemically depositing the plurality of nanostructures on one or more surfaces of the graphite powder.

13. The method of claim 10, wherein the plurality of nanostructures are electrochemically deposited on one or more surfaces of the graphite powder prior to combining the graphite powder with one or more binder materials to adhere the graphite particles or flakes together.

14. The method of claim 1, wherein the providing at least one substrate structure comprises coating graphite powder onto a graphite foil structure or a porous Cu structure.

15. The method of claim 14, wherein the coating comprises coating a graphite powder and one or more binder materials onto the graphite foil or porous Cu structure.

16. The method of claim 1, wherein the providing at least one substrate structure comprises disposing graphite powder comprising a plurality of graphite particles or graphite flakes between two or more porous Cu structures.

17. The method of claim 16, wherein the providing further comprises combining the graphite powder with at least one binder material prior to disposing the graphite powder between the two or more porous Cu structures.

18. The method of claim 1, wherein the plurality of nanostructures are electrochemically deposited directly onto the one or more surfaces of the at least one substrate structure, wherein the nanostructures are in direct physical contact with the one or more surfaces of the at least one substrate structure.

19. The method of claim 1, wherein no further processing is required to achieve the crystalline structure of the nanostructure.

20. The method of claim 1, wherein the nanostructures comprise monocrystalline Si.

21. The method of claim 1, wherein the nanostructures comprise elongated nanostructures, Si nanowires, Si nanospikes, clusters of Si nanospikes, or clusters of Si nanowires, wherein the elongated nanostructures comprises nanowires, tapered nanowires, nanospikes, clusters of nanospikes, or clusters of nanowires.

22. The method of claim 1, wherein at least one substrate structure comprises at least one substrate structure comprising plurality of surface features formed on at least one surface of the substrate structure, wherein the depositing comprises forming the one or more nanostructures directly on the one or more surface features.

23. The method of claim 22, wherein the surface features comprise a plurality of protrusions formed on at least one surface of the one or more substrate structures.

24. The method of claim 22, wherein the surface features comprise a plurality of indentations or trenches formed on at least one surface of the one or more substrate structures.

25. The method of claim 1, wherein the electrochemical deposition is performed at about 80° C. or less.

26. The method of claim 1, further comprising forming a pre-lithiated LIB anode component comprising the at least one substrate structure and the plurality of lithiated nanostructures formed thereon.

27. The method of claim 26, wherein the at least one substrate structure comprises graphite powder and the lithiated nanostructures comprise Si nanostructures electrochemically deposited on the graphite powder, wherein the pre-lithiated LIB anode composite comprises a porous active material composite including the graphite powder and Si nanostructures.

28. The method of claim 27, wherein the active material composite has a porosity of about 1-50%.

29. The method of claim 28, wherein the active material composite comprises a binder material, wherein the active material composite consists of less than 10 wt. % of the binder material.

30. The method of claim 29, wherein the binder material comprises carboxylmethyl cellulose (CMC), SBR, PVDF, or PAA.

31. The method of claim 1, wherein the step of lithiating the electrochemically deposited nanostructures further comprises:
providing a solution comprising a lithium precursor dissolved in at least one solvent in an electrolytic cell; and
applying an electrochemical potential to the electrolytic cell.

32. The method of claim 31, wherein the lithium precursor is comprised of at least one lithium salt precursor material.

33. The method of claim 31, wherein the at least one lithium salt precursor material is comprised of: hexafluorophosphate, lithium bis(oxatlato)borate, or mixtures thereof.

34. The method of claim 1, wherein the electrochemical deposition is performed at about room temperature.

35. A method of forming a lithium-ion battery (LIB) component, comprising:
providing at least one substrate structure;
electrochemically depositing a plurality of nanostructures directly onto one or more surfaces of the at least one substrate structure, wherein the nanostructures are nanocrystals comprising at least one active material, wherein the nanocrystals are formed as crystalline nanocrystals and are substantially free of amorphous or polycrystalline nanocrystals immediately upon formation via electrochemical deposition such that no further processing is required after electrochemical deposition to achieve the crystalline structure of the nanocrystals; and
lithiating the electrochemically deposited nanostructures to form a LIB anode with pre-lithiated active nanostructures.

36. A method of forming a lithium-ion battery (LIB) component, comprising:
providing at least one substrate structure comprising graphite;
electrochemically depositing a plurality of nanostructures directly onto one or more surfaces of the at least one graphite substrate structure, and wherein the nanostructures are comprised of crystalline Si and are substantially free of amorphous Si or polycrystalline Si upon formation; and
pre-lithiating the electrochemically deposited nanostructures.

37. A method of forming a lithium-ion battery (LIB) component, comprising:
providing an electrolytic cell comprising a working electrode, wherein the working electrode comprises at least one substrate structure comprising one or more current collector structures and/or one or more LIB active material structures; and
electrochemically depositing a plurality of Si nanostructures directly onto one or more surfaces of the at least one substrate structure, and wherein the Si nanostructures are comprised of crystalline Si and are substantially free of amorphous Si or polycrystalline Si upon formation; and
pre-lithiating the working electrode containing the plurality of Si nanostructures in the electrolytic cell using electrolyte solutions containing one or more lithium salts.

* * * * *